United States Patent
Xi et al.

(10) Patent No.: US 10,951,291 B2
(45) Date of Patent: Mar. 16, 2021

(54) SYSTEMS AND METHODS FOR BEAM MANAGEMENT

(71) Applicant: IDAC Holdings, Inc., Wilmington, DE (US)

(72) Inventors: Fengjun Xi, San Diego, CA (US); Chunxuan Ye, San Diego, CA (US); Kyle Jung-Lin Pan, Saint James, NY (US); Yuan Sheng Jin, Santa Clara, CA (US)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/336,983

(22) PCT Filed: Sep. 28, 2017

(86) PCT No.: PCT/US2017/054002
§ 371 (c)(1),
(2) Date: Mar. 27, 2019

(87) PCT Pub. No.: WO2018/064327
PCT Pub. Date: Apr. 5, 2018

(65) Prior Publication Data
US 2019/0222279 A1     Jul. 18, 2019

Related U.S. Application Data

(60) Provisional application No. 62/500,782, filed on May 3, 2017, provisional application No. 62/475,089, filed on (Continued)

(51) Int. Cl.
*H04W 72/04* (2009.01)
*H04B 7/06* (2006.01)
(Continued)

(52) U.S. Cl.
CPC .............. *H04B 7/063* (2013.01); *H04B 7/024* (2013.01); *H04B 7/0408* (2013.01);
(Continued)

(58) Field of Classification Search
CPC . H04B 7/06; H04B 7/08; H04B 7/024; H04B 7/063; H04B 7/0408; H04B 7/0417;
(Continued)

(56) References Cited

U.S. PATENT DOCUMENTS

2010/0303004 A1   12/2010 Mueck et al.
2013/0223251 A1   8/2013 Li et al.
(Continued)

OTHER PUBLICATIONS

3rd Generation Partnership Project(3GPP), TR 38.913 V0.3.0, "Technical Specification Group Radio Access Network, Study on Scenarios and Requirements for Next Generation Access Technologies (Release 14)", Mar. 2016, 30 pages.
(Continued)

*Primary Examiner* — Shawkat M Ali
(74) *Attorney, Agent, or Firm* — Condo Roccia Koptiw LLP

(57) ABSTRACT

Systems, methods, and devices are disclosed for determining a beam modulation mode and/or a carrier modulation mode. A beamformed reference signal may be transmitted to a wireless transmit/receive unit (WTRU). A beam measurement report may be received from the WTRU. The beam measurement report may include a beam modulation mode recommendation and/or a carrier modulation mode recommendation. A beam modulation mode and/or a carrier modulation mode may be determined based on a mode recommendation. A beam modulation mode and/or a carrier modulation mode may indicate a manner of transmitting same information on multiple beams.

15 Claims, 21 Drawing Sheets

Related U.S. Application Data on Mar. 22, 2017, provisional application No. 62/443,392, filed on Jan. 6, 2017, provisional application No. 62/401,128, filed on Sep. 28, 2016.

(51) Int. Cl.
| | |
|---|---|
| *H04B 7/0408* | (2017.01) |
| *H04W 72/00* | (2009.01) |
| *H04B 7/0417* | (2017.01) |
| *H04B 7/08* | (2006.01) |
| *H04B 7/0491* | (2017.01) |
| *H04B 7/024* | (2017.01) |

(52) U.S. Cl.
CPC ......... *H04B 7/0417* (2013.01); *H04B 7/0491* (2013.01); *H04B 7/0617* (2013.01); *H04B 7/0689* (2013.01); *H04B 7/0695* (2013.01); *H04B 7/088* (2013.01); *H04W 72/00* (2013.01); *H04W 72/042* (2013.01); *H04W 72/046* (2013.01)

(58) Field of Classification Search
CPC ....... H04B 7/0491; H04B 7/0617; H04L 5/00; H04L 25/02; H04W 4/00; H04W 16/28; H04W 24/10; H04W 28/02; H04W 36/30; H04W 72/04; H04W 72/12; H04W 72/042; H04W 74/08
USPC ........ 370/252, 280, 329, 336; 375/219, 260, 375/267, 295, 316
See application file for complete search history.

(56) References Cited

U.S. PATENT DOCUMENTS

| | | | |
|---|---|---|---|
| 2013/0286960 A1* | 10/2013 | Li | ....................... H04W 72/042 370/329 |
| 2014/0050280 A1 | 2/2014 | Stirling-Gallacher et al. | |
| 2018/0041936 A1* | 2/2018 | Kim | ..................... H04W 48/12 |

OTHER PUBLICATIONS

Alkhateeb et al., "MIMO Precoding and Combining Solutions for Millimeter-Wave Systems", IEEE Communications Magazine, vol. 52, No. 12, Dec. 2014, pp. 122-131.

* cited by examiner

SYSTEMS AND METHODS FOR BEAM MANAGEMENT

CROSS-REFERENCE TO RELATED APPLICATIONS

This application is the National Stage entry under 35 U.S.C. § 371 of Patent Cooperation Treaty Application PCT/US2017/054002, filed Sep. 28, 2017, which claims priority to U.S. Provisional Patent Application Ser. No. 62/401,128, filed Sep. 28, 2016, U.S. Provisional Patent Application Ser. No. 62/443,392, filed Jan. 6, 2017, U.S. Provisional Patent Application Ser. No. 62/475,089, filed Mar. 22, 2017, and U.S. Provisional Patent Application Ser. No. 62/500,782, filed May 3, 2017, each of which is entitled "BEAM MANAGEMENT," and each of which is incorporated herein by reference in its entirety Mobile communications continue to evolve. A fifth generation of mobile communications technologies may be referred to as 5G. A previous (legacy) generation of mobile communication may include, for example, fourth generation (4G) long term evolution (LTE). Mobile wireless communications may implement a variety of radio access technologies (RATs), including New Radio (NR). Use cases for NR may include, for example, extreme Mobile Broadband (eMBB), Ultra High Reliability and Low Latency Communications (URLLC), and massive Machine Type Communications (mMTC).

SUMMARY

Systems, methods, and devices are disclosed for determining a beam modulation mode and/or a carrier modulation mode. A beamformed reference signal may be transmitted to a wireless transmit/receive unit (WTRU). A beam measurement report may be received from the WTRU. The beam measurement report may include a beam modulation mode recommendation and/or a carrier modulation mode recommendation. A beam modulation mode and/or a carrier modulation mode may be determined based on a mode recommendation. A beam modulation mode and/or a carrier modulation mode may indicate a manner of transmitting same information on multiple beams.

BRIEF DESCRIPTION OF THE DRAWINGS

The following detailed description is provided with reference to the appended drawings. For the purposes of illustration, the drawings show various examples. The contemplated subject matter is not limited to the specific elements and/or instrumentalities described or illustrated. Absent specific notation to the contrary, no subject matter is contemplated as necessary and/or essential. In addition, the described examples may be employed in any combination, in whole or in part. Furthermore, like reference numerals in the figures indicate like elements, and wherein.

DETAILED DESCRIPTION

Figure 1A:
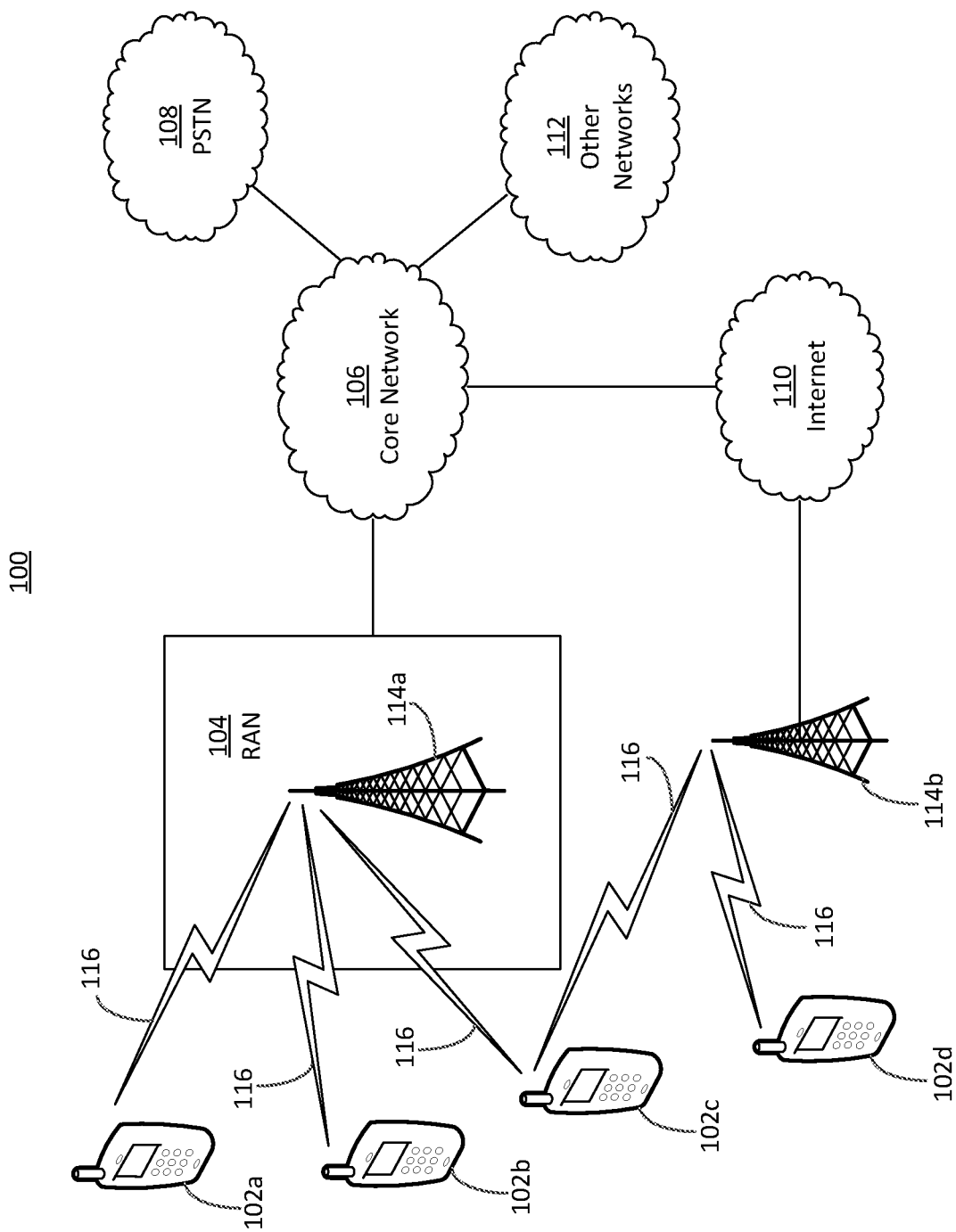
FIG. 1A illustrates a system diagram of an example communications system in which one or more disclosed examples may be implemented.

FIG. 1A is a diagram illustrating an example communications system 100 in which one or more disclosed examples may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed examples contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one example, the base station 114a may include three transceivers, e.g., one for each sector of the cell. In an example, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an example, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an example, the base station 114a and the WTRUs 102a, 102b, 102c may implement a radio technology such as NR Radio Access, which may establish the air interface 116 using New Radio (NR).

In an example, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other examples, the base station 114a and the WTRUs 102a, 102b, 102c may implement radio technologies such as IEEE 802.11 (e.g., Wireless Fidelity (WiFi), IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one example, the base station 114b and the WTRUs 102c, 102d may implement a radio technology such as IEEE 802.11 to establish a wireless local area network (WLAN). In an example, the base station 114b and the WTRUs 102c, 102d may implement a radio technology such as IEEE 802.15 to establish a wireless personal area network (WPAN). In yet another example, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
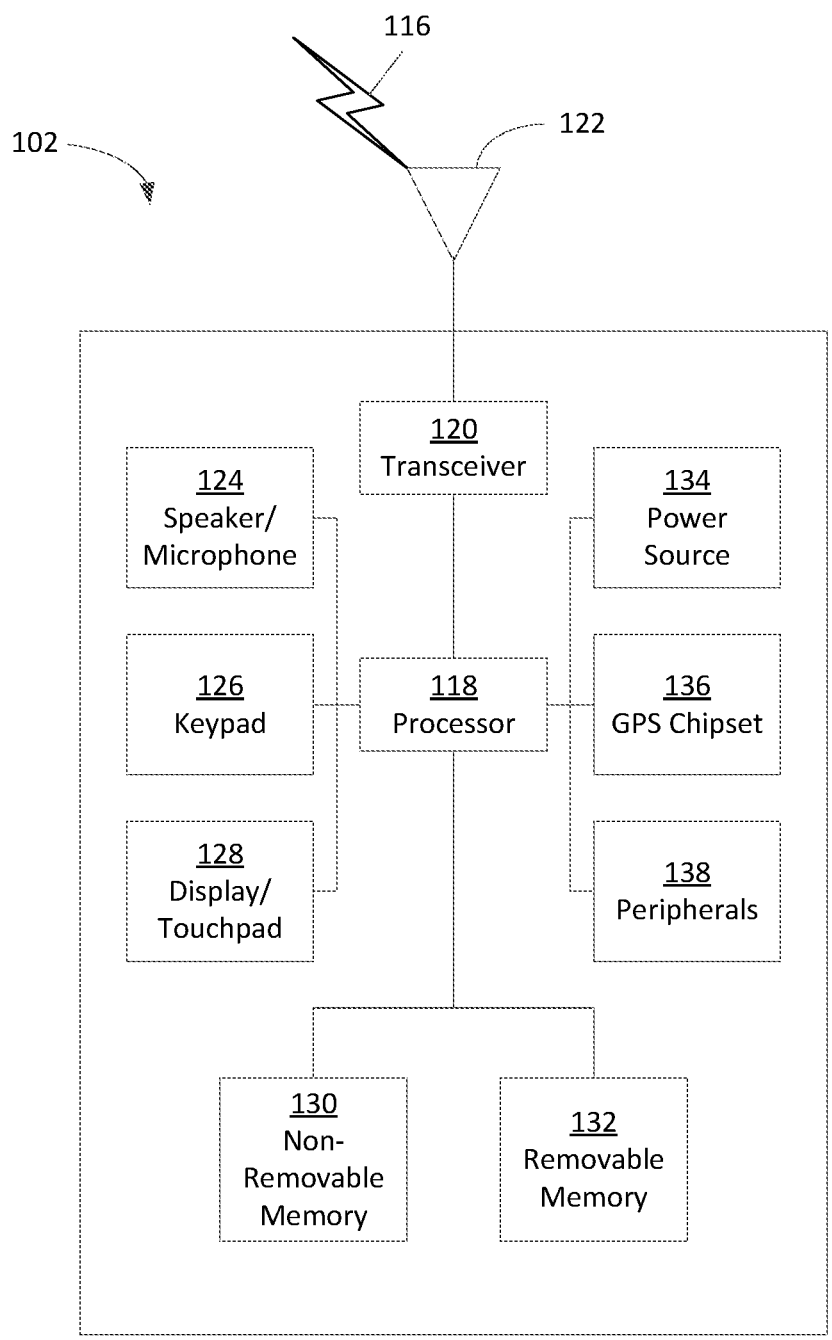
FIG. 1B illustrates a system diagram of an example wireless transmit/receive unit (WTRU) that may be used within the communications system illustrated in FIG. 1A according to an example.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an example.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in an example, the transmit/receive element 122 may be an antenna configured to transmit and/or receive RF signals. In an example, the transmit/receive element 122 may be an emitter/detector configured to transmit and/or receive IR, UV, or visible light signals, for example. In yet another example, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one example, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other examples, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an example.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an example, the WRTU 102 may include a half-duplex radio for which transmission and reception of some or all of the signals (e.g., associated with particular subframes for either the UL (e.g., for transmission) or the downlink (e.g., for reception)).

Figure 1C:
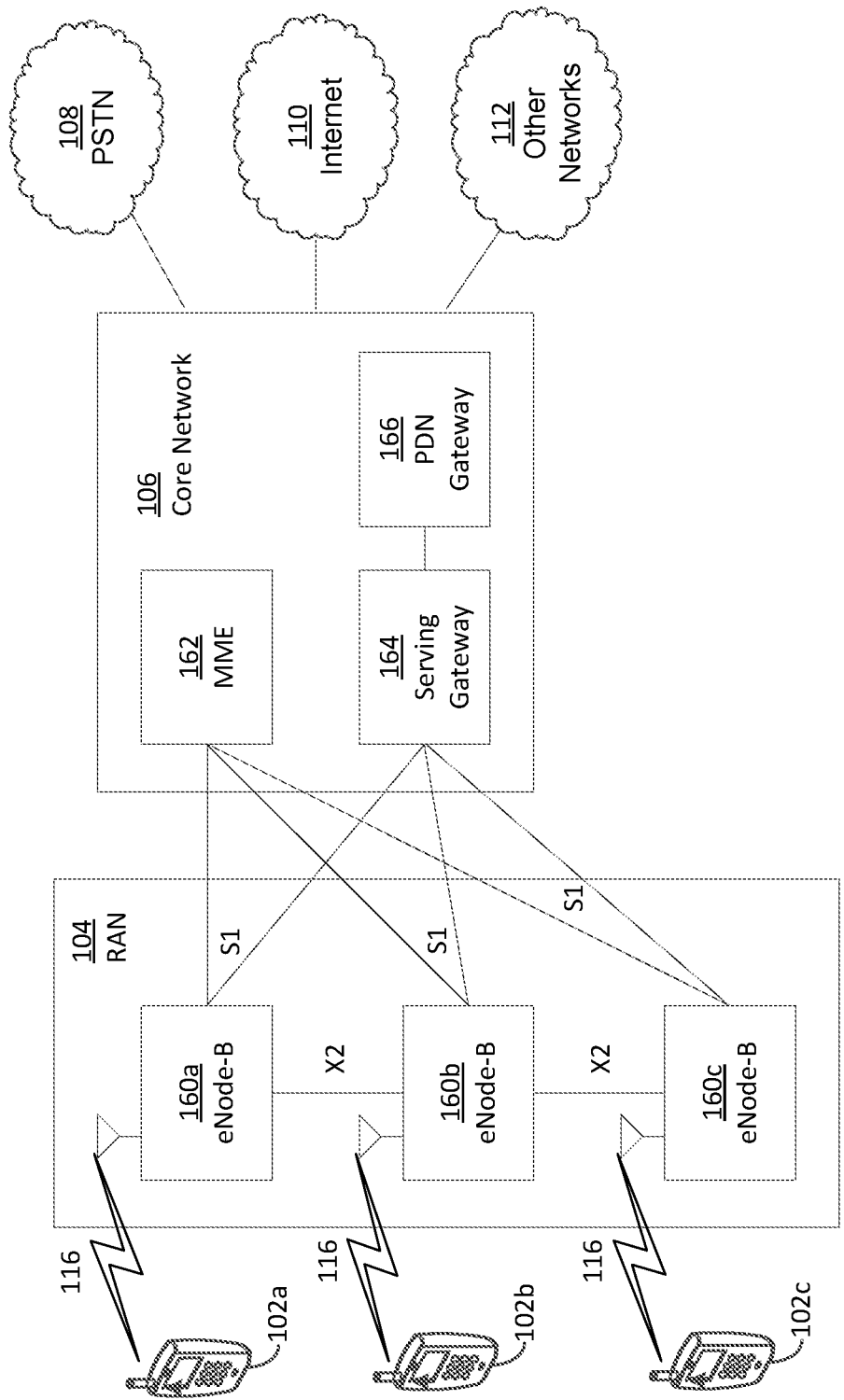
FIG. 1C illustrates a system diagram illustrating an example radio access network (RAN) and an example core network (CN) that may be used within the communications system illustrated in FIG. 1A according to an example.

FIG. 1C is a system diagram illustrating the RAN 104 and the CN 106 according to an example. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an example. The eNode-Bs 160a, 160b, 160c may each include one or more transceivers for communicating with the WTRUs 102a, 102b, 102c over the air interface 116. In one example, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative examples that such a terminal may use (e.g., temporarily or permanently) wired communication interfaces with the communication network.

In representative examples, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative examples, the DLS may use an 802.11e DLS or an 802.11z tunneled DLS (TDLS). A WLAN using an Independent BSS (IBSS) mode may not have an AP, and the STAs (e.g., some or all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative examples, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative example, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth that may be supported by some or all STAs in the BSS. The bandwidth of the primary channel may be set and/or limited by a STA, from among some or all STAs in operating in a BSS, which supports the smallest bandwidth operating mode. In the example of 802.11 ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
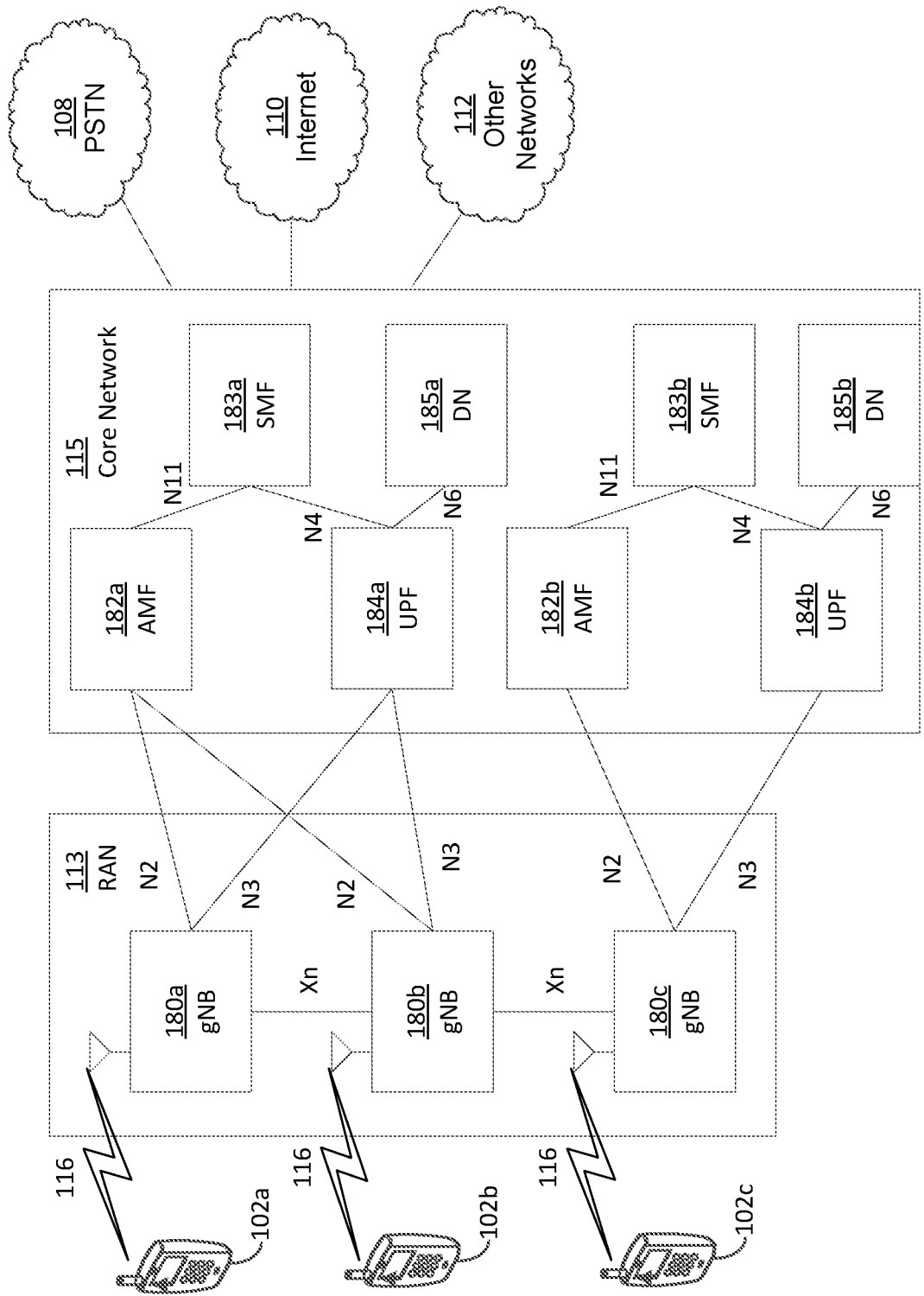
FIG. 1D illustrates a system diagram illustrating a further example RAN and a further example CN that may be used within the communications system illustrated in FIG. 1A according to an example.

FIG. 1D is a system diagram illustrating the RAN 113 and the CN 115 according to an example. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an example. The gNBs 180a, 180b, 180c may each include one or more transceivers for communicating with the WTRUs 102a, 102b, 102c over the air interface 116. In one example, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an example, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an example, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one example, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Next generation mobile communications may support applications such as enhanced mobile broadband (eMBB), massive Machine Type Communications (mMTC), and/or Ultra-Reliable Low Latency Communications (URLLC). Such applications may be supported for use with a wide range of licensed and/or unlicensed spectrum bands (e.g., bands ranging from 700 MHz to 80 GHz) and/or for use in a variety of deployment scenarios.

Multiple antenna transmission and beamforming capabilities may be provided. Multiple antenna techniques, such as Multiple Input Multiple Output (MIMO) communications and variations thereof (e.g., Single Input Multiple Output (SIMO), Multiple Input Single Output (MISO)), may be used (e.g., for sub-6 GHz transmission). Different MIMO techniques may provide different benefits such as diversity gain, multiplexing gain, beamforming, array gain, etc. User Terminals (UTs) in cellular communication may communicate with a central node. MU-MIMO may increase system throughput, for example, by facilitating the transmission of multiple data streams to multiple UTs at a same time on a same and/or overlapping set of resources in time and/or frequency. A central node implementing SU-MIMO may transmit multiple data streams to a same UT, for example, as compared to transmitting multiple data streams to multiple UTs as may be performed in MU-MIMO.

Transmission by multiple antennas using millimeter wave (mmW) frequencies may differ similar transmission using sub-6 GHz multiple antenna techniques. This may be due to different propagation characteristics at mmW frequencies as compared to, e.g., sub-6 GHz frequencies. A BTS and/or WTRU may have a limited number of RF chains as compared to antenna elements.

Figure 2:
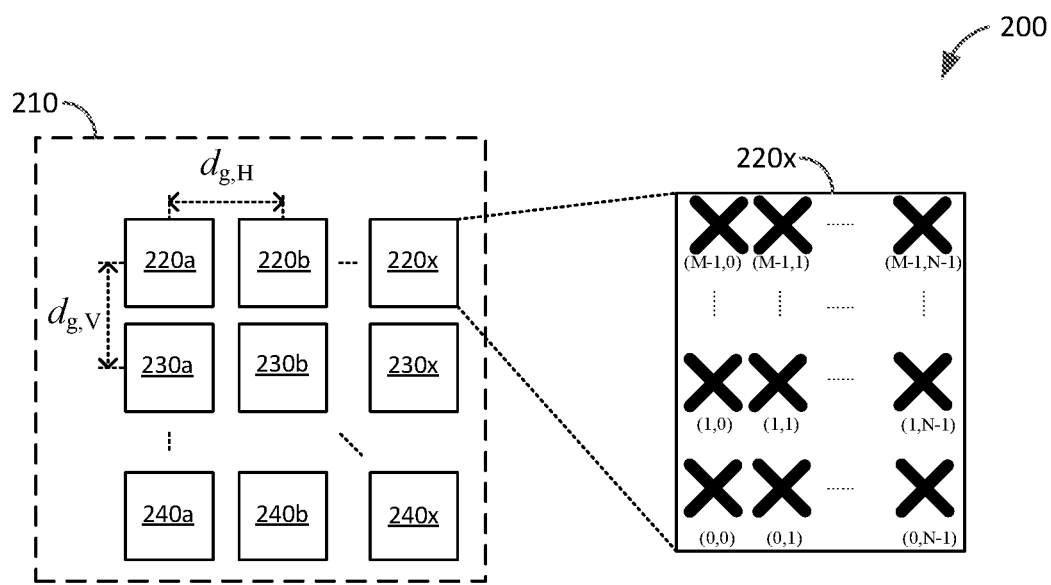
FIG. 2 illustrates an exemplary antenna model according to an example.

FIG. 2 illustrates block diagram 200 representing an exemplary Transmission/Reception Point (TRP) and Wireless Transmit/Receive Unit (WTRU) antenna model. The terms "transmission and reception point" and "TRP" may be used interchangeably with the term "eNodeB" herein.

Exemplary TRP 210 may include one or more antenna panels 220, 230, 240. A massive antenna model may be configured, e.g., as Mg antenna panels per vertical dimension and Ng antenna panels per horizontal dimension. An antenna panel, such as each of antenna panels 220, 230, 240 shown in FIG. 2, may be configured with N columns and M rows of antenna elements, for example, as illustrated by expanded antenna panel 220x shown in FIG. 2. Such antenna panels may be configured with or without polarization.

Timing and/or phase may not be calibrated across antenna panels. Multiple panels may be configured in a same eNodeB. A baseline massive antenna configuration may be based, at least in part, on an operating frequency band. Table 1 illustrates exemplary configuration parameters that may be based on various operating frequency bands. The examples provided in Table 1 may be exemplary baseline massive antenna configurations, e.g., for dense urban and/or urban macro configurations.

TABLE 1

| Example baseline massive antenna configuration (e.g., for dense urban and/or urban macro) | | |
|---|---|---|
| At 4 GHz | At 30 GHz | At 70 GHz |
| Dense urban and urban macro: (M, N, P, Mg, Ng) = (8, 8, 2, 1, 1), (dV, dH) = (0.8, 0.5)λ | Dense urban and urban macro: (M, N, P, Mg, Ng) = (4, 8, 2, 2, 2), $(d_V, d_H)$ = (0.5, 0.5)λ, $(d_{g,V}, d_{g,H})$ = (2.0, 4.0)λ | Dense urban: Baseline: (M, N, P, Mg, Ng) = (8, 16, 2, 2, 2), $(d_V, d_H)$ = (0.5, 0.5)λ, $(d_{g,V}, d_{g,H})$ = (4.0, 8.0) λ |
| A single panel 64 elements per Pol. Total 128 elements | 4 panels 32 elements per Pol. Total 256 elements | 4 panels 128 elements per polarization (pol) Total 1024 elements |

Digital precoding, analog precoding, and/or hybrid digital and analog precoding may be used for mmW frequencies. Digital precoding may be combined with equalization. Digital precoding may enable single user (SU), multi-user (MU), and/or multi-cell precoding. Digital precoding may be similar to precoding that may be used in sub-6 GHz frequencies, such as IEEE 802.11 implementations and/or in 3GPP implementations.

A presence of a limited number of RF chains compared to antenna elements and/or a sparse nature of a channel may complicate use of digital beamforming (e.g., in mmW frequencies). Use of analog beamforming may overcome issues that may arise using a limited number of RF chains, for example, by using analog phase shifters on each antenna element. Analog beamforming may be used in IEEE 802.11 implementations, for example, during sector level sweep (e.g., to identify a preferred sector), beam refinement (e.g., to refine a sector to an antenna beam), and/or beam tracking (e.g., to adjust one or more sub-beams over time to account for a change in a channel) operations.

Hybrid beamforming may divide a precoder between an analog domain and a digital domain. Each such domain may have one or more precoding matrices and/or combining matrices that may each have different structural constraints (e.g., a constant modulus constraint) for combining matrices in the analog domain. Such an implementation may represent a compromise between hardware complexity and system performance. Hybrid beamforming may achieve digital precoding performance, for example, due to a sparse nature of channels and/or support for multi-user and/or multi-stream multiplexing. Hybrid beamforming may be limited by a number of RF chains. The impact of such a limitation may be reduced or eliminated where mmW channels may be sparse in an angular domain.

Beam management may be used, e.g., for new radio (NR) implementations. Use of one or more higher band frequencies may influence a system design, for example, because of propagation characteristics of such frequencies. A channel may experience higher path losses and/or more abrupt changes as the frequency it may use increases, e.g., because transmission through objects may be reduced, reflections may be amplified, blockage may occur, and/or WTRU rotation and/or movement may occur.

One or more downlink (DL) beam management operations (e.g., one or more DL L1/L2 beam management operations) may be supported by one or more TRPs. A procedure (may be referred to as "P-1") may be used to enable WTRU measurement on one or more TRP Tx beams (e.g., different TRP Tx beams), for example, to support a selection of one or more TRP Tx beams and/or a selection of one or more WTRU Rx beams. Such a procedure may include an intra-TRP TX beam sweep and/or an inter-TRP Tx beam sweep of a set of one or more beams, e.g., for beamforming at a TRP. Such a procedure may also, or instead, include a WTRU Rx beam sweep of a set of one or more beams, e.g., for beamforming at a WTRU. A TRP Tx beam and a WTRU Rx beam may be determined jointly or sequentially.

A procedure (may be referred to as "P-2") may be used to enable WTRU measurement on one or more TRP Tx beams (e.g., different TRP Tx beams), for example, to change one or more inter-TRP beams and/or one or more intra-TRP Tx beams. For example, such a procedure may be used to change from a smaller set of beams (e.g., such as a set of beams that may have been selected using procedure P-1) for beam refinement. Such a procedure may be considered a variation of procedure of P-1.

A procedure (may be referred to as "P-3") may be used to enable WTRU measurement on a same TRP Tx beam to change a WTRU Rx beam, for example, when a WTRU may be using beamforming.

Intra-TRP and inter-TRP beam management may use one or more same and/or similar operations, for example, to facilitate examples where a WTRU may not be aware of whether a beam is an intra-TRP beam or an inter-TRP beam.

Operations P-2 and/or P-3, and/or any other operations disclosed herein and/or used with any disclosed examples, may be performed jointly and/or may be performed multiple times, for example, to achieve a concurrent and/or a simultaneous TRP Tx and WTRU Rx beam change.

Support may be provided to facilitate management of multiple Tx and/or Rx beam pairs or beam pair links for a WTRU. Information from a carrier different than that in which a TRP and/or a WTRU may be configured may be used in beam management. A procedure may be used with any frequency band. A procedure may be used with a single beam and/or multiple beams per TRP. Single beam-based and/or multiple beam-based initial access and/or mobility may be supported.

One or more operations are contemplated that may provide for WTRU movement, WTRU rotation, channel blockage, and/or beam blockage. One or more operations are contemplated that may provide for WTRU and/or TRP beam change(s) and/or a channel state information (CSI) mismatch from, e.g., a CSI reporting instance to a data transmission instance. One or more operations are contemplated that may provide for beam management of WTRU and/or TRP Tx and/or Rx beams. One or more operations are contemplated that may provide transmission and/or reception methods that may provide increased robustness (e.g., semi-open loop (OL) MIMO transmission, beam cycling, beam broadening).

Robust and efficient beam management (e.g., for one or more TRPs) may be facilitated by the implementations set forth herein. Disclosed implementations may facilitate addressing transmission of one or more beams from a TRP that may be degraded and/or a loss of tracking of such one or more beams (e.g., abruptly) when, for example, blocking may occur. Disclosed implementations may facilitate addressing WTRU rotation and/or movement that may lead to performance degradation (e.g., due to beam misalignment). Disclosed implementations may facilitate addressing CSI feedback that may not capture effects of WTRU rotation, movement, and/or blockage (e.g., because such CSI feedback may not be provided quickly enough to capture such effects). Disclosed implementations may include one or more semi open-loop MIMO schemes that may not include WTRU feedback.

Directional antennas may be used (e.g., with one or more beamforming techniques), for example, in a mmW frequency domain. Use of such directional antennas may facilitate compensation for path loss and/or may facilitate providing a desired coverage area and/or data throughput.

An example communication link that may use one or more directional antennas (e.g., as compared to an example communication link that may use one or more omni-directional antennas) may experience blockage (e.g., greater blockage than that that may be experienced with use of one or more omni-directional antennas). In such directional antenna examples, path loss may increase, for example, when one or more objects may be in a pathway of one or more beamforms transmitted between an eNodeB and a WTRU. At higher frequencies, path loss may further increase. For example, penetration loss and/or diffraction loss may increase as frequency increases. An example knife edge diffraction model may be provided by equation 1 below.

$$F_{A_1|A_2|Z_1|Z_2} = \frac{\tan^{-1}\left(\pm\frac{\pi}{2}\sqrt{\frac{\pi}{\lambda}r\left(\frac{1}{\cos(A_1|A_2|Z_1|Z_2)}-1\right)}\right)}{\pi} \quad \text{Eq. 1}$$

Attenuation may decrease with carrier wavelength and/or may increase with carrier frequency.

A blockage model may be used in a channel model that may be used for frequencies at and/or above 6 GHz. Such a blockage model may facilitate acquisition of information associated with one or more 6 GHz and/or above scenarios, for example, in a mmW frequency domain. Blockage in a channel model may be based on dynamic blockage (e.g., human and/or vehicular blocking). Dynamic blockage (e.g., where blockage may come and go or otherwise change over time) may have characteristics that differ from those associated with static and/or fixed blockage.

Blockage, WTRU rotation, and/or WTRU movement may be addressed with one or more of the examples set forth herein. A TPR may utilize one or more beams. A WTRU may utilize one or more beams. Beam management for a single TRP may be referred to herein as intra-TRP beam management. Beam management for multiple TRPs may be referred to herein as inter-TPR beam management.

One or more beam management techniques may improve the robustness of data transmission (e.g., due to spatial diversity) and may (e.g., also) facilitate more efficient maintenance of a radio link, for example, when blockage may occur for one or more beams or beam pair links and/or for a part of one or more beams or beam pair links. Such beam management techniques may include multi-beam modulation-based beam management.

Multi-beam modulation (MBM) may be used, for example, to modulate and/or map a same set of information bits and/or a same set of coded bits to multiple constellation symbols that may be transmitted over multiple beams or multiple beams or beam pair links (BPLs). Such multiple beams may be spatially separated e.g., to exploit spatial diversity gain and/or beam diversity gain. Multiple beams or beam pair links may be set up between one or more TRPs and one or more WTRUs. A WTRU may be able to detect information bits after receiving either of these two symbols, for example, due to symbol level redundancy (e.g., in cases of dynamic blockage, WTRU rotation, and/or WTRU movement). When both such symbols may be received, the symbols may be combined at a receiver side for more robust communication. Such increased diversity may increase robustness of a radio link.

Dual-beam modulation (DBM) may be used, for example, to modulate and/or map a same set of information bits and/or a same set of coded bits to multiple constellation symbols that may be transmitted over a pair of beams or two beam pair links. Such a pair of beams or beam pair links may be spatially separated e.g., to exploit spatial diversity gain and/or beam diversity gain. DBM may modulate N bits to two symbols based on, for example, two same or different mappings of $2^N$ constellation points. In an example of DBM where N=4, four bits may be mapped into two 16QAM symbols, for example, based on two different 16QAM constellation mappings. Such two 16QAM different symbols may be allocated to different beams where each of such different beams may have a different angle of departure (AOD). Two beam pair links may be set up between one or two TRPs and a WTRU. Such a WTRU may be able to detect and decode information bits after receiving either of these two symbols, for example, due to symbol level redundancy (e.g., in cases of dynamic blockage, WTRU rotation, and/or WTRU movement). When both of such two symbols may be received, such symbols may be combined at a receiver side, which may increase robustness of such a communication.

Note that multiple-beam modulation (MBM) may be used in any fashion described herein for DBM and applied to transmission of two or more beams, pairs of beams, and/or beam pair links. All such examples are contemplated herein.

Figure 3:
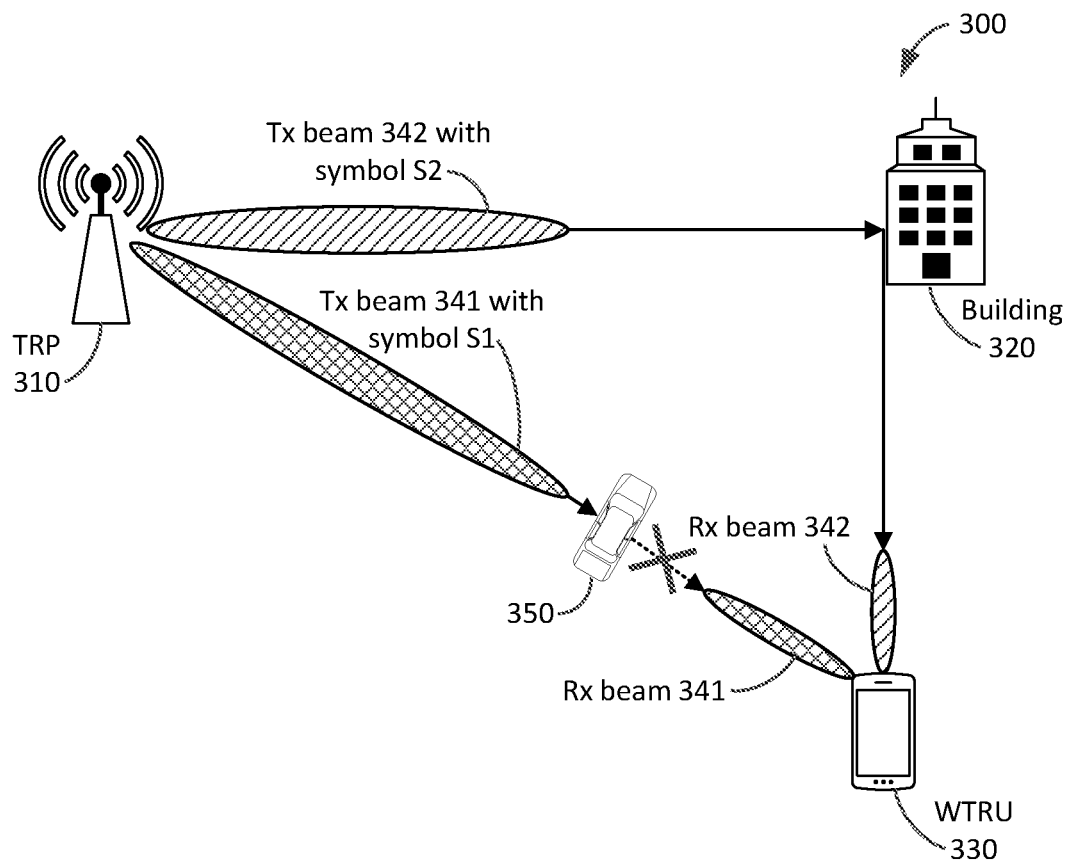
FIG. 3 illustrates an exemplary scenario in which beam management for blockage may be used according to an example.

FIG. 3 illustrates example scenario 300 in which dual-beam modulation-based beam management for blockage may be used. TRP/eNodeB 310 may modulate source information (e.g., the same source information) to symbols S1 and S2. Symbol S1 may be sent through beam 341 while symbol S2 may be sent through beam 342. Beam 341 may be distinct and/or spatially uncorrelated from beam 342, for example, in an effort to increase robustness of transmission.

WTRU 330 may recover source information from beam 342, for example, when WTRU 330 may experience a disconnect with beam 341 due to a blockage, such as a blockage that may be caused by object 350 (illustrated as a car in FIG. 3). Duplicated symbols, or symbols otherwise including similar or identical content, (e.g., S1, S2) may be transmitted through one or more different or same RF chains for different beams (e.g., beam 341, beam 342). As shown in FIG. 3, WTRU 330 may recover source information from symbol S2 of beam 342 when symbol S1 of beam 341 may not be used to recover such information, for example, due to a blockage.

MBM and/or DBM may be combined with multi-carrier modulation (e.g., to further obtain frequency diversity gain), for example, by allocating a portion of one or more duplicated constellation symbols into a different sub-carrier.

An indication of a capability of transmitting and/or receiving MBM and/or DBM may be exchanged between a TRP and a WTRU through an RRC message. For example, a 1-bit flag associated with such capabilities may be indicated in a ueCapabilityInformation message. A maximum number of beams or beam pair links for MBM and/or DBM may depend on, for example, WTRU capabilities. When more than one TRP may be involved in MBM and/or DBM, such TRPs may coordinate with respect to a number of beam or BPLs that may be used for MBM and/or DBM by each TRP, such that a total number of beams or BPLs may not exceed a WTRU's capabilities.

Transmission and/or reception of MBM and/or DBM may be enabled, for example, when a receiver may be (e.g., unambiguously) aware of or provided an indication of one or more beam pairs or beam pair links that may be combined at such a receiver. MBM and/or DBM may be associated with one of multiple modulation modes that a transmitter may use. MBM and/or DBM modes may be signaled or otherwise indicated by a transmitter, for example, in a DCI field via PDCCH. Indices of beams that may carry MBM and/or DBM may be (e.g., explicitly or implicitly) signaled, for example, in a DCI field.

MBM and/or DBM based beam management may be performed using one or both of an open loop procedure or a closed loop procedure.

In an open loop procedure, a TRP may measure an uplink beam reference signal (e.g., a sounding reference signal) that may be received from a WTRU, for example, to evaluate angle of arrival (AOA) and/or angle of departure (AOD) for one or more beams or beam pair links. Beam pairs that may be separated (e.g., significantly separated) in a spatial domain may be selected (e.g., based on one or more estimated parameters) to carry MBM and/or DBM symbols with an appropriate MCS. A same or different MCSs may be used for different beams or BPLs. Indices associated with such selected beams or beam pair links and associated MCS may be signaled in a DCI field via NR-PDCCH. MBM and/or DBM symbols may be transmitted by the selected beam pairs or BPLs. An open loop procedure may be used for TDD deployment where reciprocity-based transmission may provide overhead savings in CSI feedback. Reciprocity-based coherent joint transmission (JT) may be also used with unlicensed and/or shared spectrum.

In a closed loop procedure, a TRP may transmit one or more beamformed CSI-RSs. A WTRU may measure channel state information (CSI) and/or channel direction information from such one or more beamformed CSI-RSs. Such channel direction information may include AOA and/or AOD. Using such AOA and/or AOD information, such a WTRU may identify one or more beams pairs or beam pair links (e.g., one or more preferred beam pairs, one or more optimal beam pairs, one or more recommended beam pairs) that may be used for MBM and/or DBM. Such a WTRU may provide feedback that may include beam indices for such one or more beam pairs/BPLs and/or one or more corresponding CSIs and/or channel quality indications (CQIs). Same or different CSIs and/or CQIs may be reported for different beams or BPLs.

A WTRU may request to use MBM and/or DBM with one or more parameters that a WTRU may have estimated, such as, but not limited to, any one or more parameters estimated according to examples set forth herein. When MBM and/or DBM is currently used in transmission, a WTRU may identify another (e.g., different) set of beams or beam pair links that may be reported back to a TRP.

A WTRU may determine (e.g., for a specific scenario) that a TRP may not use MBM and/or DBM, for example, while another beam is not available when blockage occurs. Such a WTRU may indicate such a determination in feedback. Such a TRP may fall back to a regular, normal, and/or default modulation scheme.

A TRP may configure MBM and/or DBM based on, for example, one or more beam indices and/or one or more corresponding CSIs and/or CQIs that may be recommended by a WTRU. Such a TRP may signal an MBM and/or DBM mode decision, a detailed modulation mapper index, and/or an associated beam index in a beam indication message. Such a beam indication message may be carried, for example, in a DCI field via NR-PDCCH.

Note that the disclosed example implementations may be applied to any system using MBM and/or DBM with a single or multiple TRPs.

Figure 4:
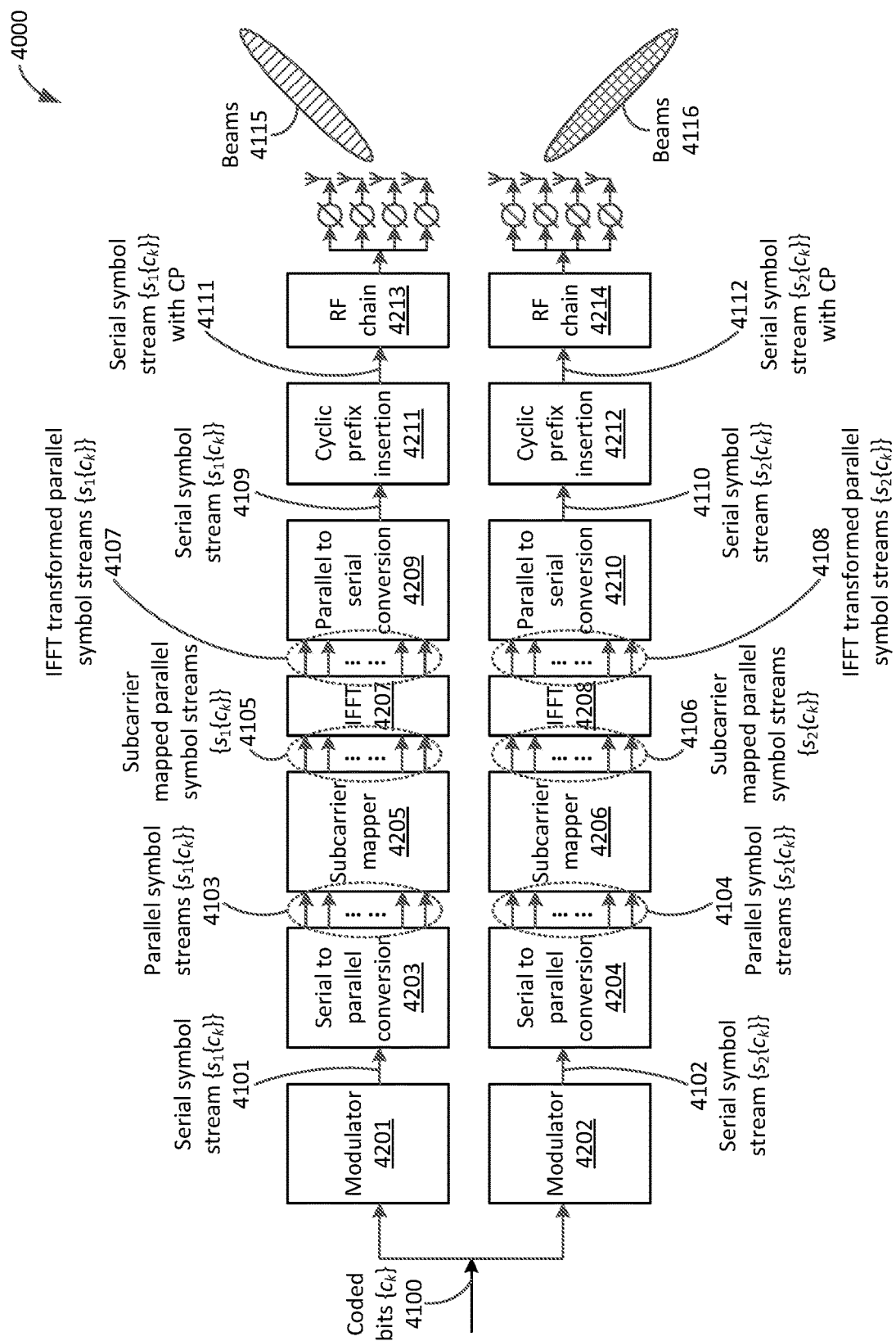
FIG. 4 illustrates an exemplary system that may employ beam management according to an example.

FIG. 4 illustrates exemplary system 4000 that may employ dual-beam modulation-based beam management, for example, in a system employing OFDM. A stream of information bits may be encoded by a channel code encoder. Such a channel code encoder may output a coded bit stream having coded bits $\{c_k\}$ 4100. Coded bits $\{c_k\}$ 4100 may be provided to modulators 4201 and 4202. Modulators 4201 and 4202 may generate modulated serial symbol stream $\{s_1\{c_k\}\}$ 4101 and modulated serial symbol stream $\{s_2\{c_k\}\}$ 4102, respectively.

Constellation mapping that may be used by modulator 4201 may differ from constellation mapping that may be used by modulator 4202, for example, where a modulation order used by modulator 4201 and modulator 4202 may be a same modulation order. In such examples, modulator 4201 may generate output serial symbol stream $\{s_1\{c_k\}\}$ 4101 and modulator 4202 may generate output serial symbol stream $\{s_2\{c_k\}\}$ 4102.

Serial symbol stream $\{s_1\{c_k\}\}$ 4101 may be transformed into parallel symbol streams $\{s_1\{c_k\}\}$ 4103 at serial to parallel conversion component or function 4203. Serial symbol stream $\{s_2\{c_k\}\}$ 4102 may be transformed into parallel symbol streams $\{s_2\{c_k\}\}$ 4104 at serial to parallel conversion component or function 4204. For example, for each such serial symbol streams 4101 and 4102, a value of $N_{FFT}$ (e.g., where $N_{FFT}$ may be an IFFT size) serial symbols may be transformed (e.g., at conversion components or functions 4203 and/or 4204) into parallel symbol streams.

Parallel symbols, such as those carried by parallel symbol streams $\{s_1\{c_k\}\}$ 4103 and parallel symbol streams $\{s_2\{c_k\}\}$ 4104, may each have a same or a different subcarrier mapping at their respective subcarrier mappers, such as subcarrier mapper 4205 and subcarrier mapper 4206, respectively.

Subcarrier mapping may be explicitly signaled in one or more DCI fields and/or pre-defined based on one or more rules and/or patterns. For example, one or more bits of a set of coded bits (e.g., a tuple of a set of coded bits) may be mapped to, for example, a modulated symbol $s_1(c_k)$ and/or may be mapped to an m1-th subcarrier at a subcarrier mapper e.g., such as subcarrier mapper 4205, to generate subcarrier mapped parallel symbol streams 4105. Also, or instead, one or more bits of a set of coded bits (e.g., a tuple of a set of coded bits) may be mapped to modulated symbol $s_2(c_k)$ and/or may be mapped to an m2-th subcarrier at a subcarrier mapper e.g., such as subcarrier mapper 4206 to generate subcarrier mapped parallel symbol streams 4106.

Exemplary subcarrier mapped parallel symbol streams 4105 and 4106 may be provided to IFFT components and/or operators 4207 and 4208, respectively. Resulting IFFT transformed parallel symbol streams $\{s_1\{c_k\}\}$ 4107 and/or resulting IFFT transformed parallel symbol streams $\{s_2\{c_k\}\}$ 4108 may be transformed to serial symbol streams $\{s_1\{c_k\}\}$ 4109 and $\{s_2\{c_k\}\}$ 4110, respectively, for example, by parallel to serial conversion component 4209 and/or serial conversion component 4210, respectively.

Exemplary serial symbol streams $\{s_1\{c_k\}\}$ 4109 and $\{s_2\{c_k\}\}$ 4110 may each have a cyclic prefix inserted by cyclic prefix insertion component 4211 and cyclic prefix insertion component 4212, respectively. Cyclic prefix insertion component 4211 and cyclic prefix insertion component 4212 may generate serial symbol stream $\{s_1\{c_k\}\}$ with CP 4111 and serial symbol stream $\{s_2\{c_k\}\}$ with CP 4112, respectively.

Each of serial symbol stream $\{s_1\{c_k\}\}$ with CP 4111 and serial symbol stream $\{s_2\{c_k\}\}$ with CP 4112 may be provided to RF chain component 4213 and RF chain component 4214, respectively. Each of RF chain component 4213 and RF chain component 4214 may be associated with different RF chains. The resulting output of RF chain component 4213 and RF chain component 4214 may be transmitted on different beams, such as beams 4115 and 4116, respectively.

Multi-beam transmission may be used for NR-PDCCH and/or NR-PUCCH to obtain beam diversity gain for increased control channel transmission robustness. For NR-PDCCH, same control information (e.g., scheduling information for a same PDSCH) may be transmitted with different beams. When such control information is blocked at a beam or part of a beam, backup control information may be obtained from beams that are not blocked.

Multi-beam based NR-PUCCH transmission may be used to obtain beam diversity gain for increased UL control channel transmission robustness. Multiple UL Tx beams may be located in one panel or multiple panels. For short duration PUCCH or long duration PUCCH, a resource may include time, frequency and/or code domain information that may be configured at a WTRU by RRC layer signaling and/or DCI signaling. To support multi-beam based PUCCH transmission, a configuration of beam information (e.g., including a beam number) may be jointly considered in a PUCCH resource configuration.

Enhanced multi-beam diversity operations may be implemented. A transmission may be interrupted and may be terminated, for example, when a line-of-sight (LOS) link may be blocked. A transmission may address a blockage, for example, by relying on one or more non-line-of-sight (NLOS) paths, where a signal strength of one or more such NLOS paths may be degraded due to reflection loss. Enhanced multi-beam diversity operations may improve an effective signal-to-noise ratio (SNR) on a receiver side, for example, to help maintain communication quality.

Enhanced multi-beam diversity implementations may be used, for example, after a beam pairing procedure. A TRP may have N antennas and a WTRU may have K antennas. N may be greater than K. A TRP and a WTRU may form N' beam pair links. Such a WTRU may use one or more beam selection criteria to select $n_r \leq N'$ beam pairs, for example, based on AOA and/or beam SNR. Such a WTRU may use any combination of selection criteria set forth herein.

Selection criteria that may be used by such a WTRU may include a minimum SNR that may be above a certain percentage of a highest beam pair link. Such a WTRU may choose one or more beam pair links that may have such a minimum SNR that may be above a certain percentage of a highest beam pair link.

Selection criterion may be implemented using an SNR estimation process that may be applied at each (e.g., existing) beam pair link. A determined highest SNR from among one or more (e.g., multiple, all) beam pair links may be determined to be $SNR_{max}$. A selection of one or more beam pair links may be based on one or more conditions. An exemplary condition may be represented by equation 2 below.

$$\Pi=\{i:SNR_i>\lambda SNR_{max}, 1\le i\le N'\} \quad \text{Eq. 2}$$

A combined minimum SNR and/or AOA beam selection criterion/criteria may be designed, for example, when a WTRU may infer prior information regarding one or more unintended angles. A WTRU may form C beams in $\pi$ radians. Such a WTRU may use a granularity factor M (e.g., where M≥1) to divide an angular range between 0 to $\pi$ into CM angular sections (e.g., where CM angular sections may be equally spaced). An angular width w of such sections (e.g., of each such section) may be $w=\pi/CM$.

A center angle $\omega_i$ of each such section i may be defined by equation 3 below.

$$\omega_i=(i+0.5)w \quad \text{Eq. 3}$$

In equation 3, i may have a value between 0 and (CM−1) (e.g., =0, 1, . . . , CM−1).

Unintended angles $\phi_1, \phi_2, \ldots, \phi_k \in [0,\pi]$ may be chosen based on a center angle of one of such angular sections. Exemplary rules may be defined (e.g., preconfigured, pre-defined), for example, for choosing one or more unintended angles.

Such rules may include a rule that one or more unintended angles may indicate one or more angles of potential blockage directions. Blockage direction measurement(s) and/or indication mechanism(s) may be triggered to gather blockage information.

Such rules may include a rule that multiple (e.g., greater than or equal to 2) clusters in each interval (e.g., each interval between $\phi_i$ and $\phi_{i+1}$) may be required. Such a rule may facilitate alignment of a reception beam with multiple clusters, for example, multiple clusters that may be angularly close to one another. Such alignment facilitation may be used where a beam width (e.g., an appropriate beam width) may be selected by a WTRU. Beam width selection may be performed based on channel state measurement and/or feedback (e.g., channel state measurement and/or feedback that may include channel angular responses at a WTRU).

Selection criterion may include a combination of minimum SNR and AOA. For example, a minimum SNR and AOAs of incoming beams may be considered. One or more undesired AOAs may be measured as conditions, which may be denoted as $\phi_1, \phi_2, \ldots, \phi_k$. An AOA of a specific beam may be denoted as $\theta_i, \phi_1, \phi_2, \ldots \phi_k \in [0,\pi]$ and $\theta \in [0, \pi]$. Such a criterion may be described, for example, by equation 4:

$$\Pi = \left\{ i: SNR_i \sin\left(\frac{|\theta_i-\varphi_1|}{2}\right) \times \cdots \times \sin\left(\frac{|\theta_i-\varphi_k|}{2}\right) > \lambda SNR_{max},\right. \quad \text{Eq. 4}$$
$$\left. 1 \le i \le N' \right\}$$

where $\Pi$ may be an index set of selected beam pair links and $0<\lambda\le 1$ may be a threshold used to select qualified beam pair links.

As noted, an index set of selected $n_t$ beam pairs may be denoted by $\Pi$ (e.g., where $n_t$ may represent a number of selected beam pairs). Such beam pairs may be selected by use of any one or more exemplary criteria set forth herein. Multiple beams used at a WTRU may be spread sufficiently apart such that blockage near a WTRU side may not block some or all such communication beams.

Enhanced multi-beam diversity implementations may use time reversal, e.g., to enhance an effective SNR of communication beam pairs, which may be suited to a time division duplex (TDD) mode. Multi-beam diversity may be implemented in multiple (e.g., two) phases, such as a measurement phase and a transmission phase. A measurement phase may be used by a TRP to collect a beam channel impulse response (CIR) on (e.g., all) selected beam pairs. In a transmission phase, a TRP may use CIR information (e.g., acquired in a measurement phase) to pre-filter a transmitting signal. Pre-filter operation may generate a waveform that may be time-reversed (TR) and conjugated (e.g., joined) to a beam channel CIR.

A WTRU may (e.g., in a measurement phase) transmit a beam reference signal (BRS) on multiple (e.g., all) selected beams. A TRP may receive a reference signal (e.g., an individual reference signal) on one or more (e.g., each) selected beams. A TRP may estimate a CIR for one or more such beams (e.g., for each such beam). A channel associated with an i-th beam pair may be represented by a time varying channel filter (e.g., by a linear time varying channel filter). An example linear time varying channel filter may be described by equation 5:

$$h_i(t,\tau)=\sum_{j=0}^{L_i-1} h_i(t,j)\delta(\tau-\tau_j) \quad \text{Eq. 5}$$

where $L_i$ may denote a total number of paths in a channel associated with the i-th beam pair, $h_i(t,j)$ and $T_j$ may respectively represent a complex channel gain and a time delay in samples of the j-th path, and $\delta(\cdot)$ may represent a delta function. $h_i(t,j)$ where $1\le I\le n_t$ and $i\in\Omega$, may vary with respect to time t.

A channel associated with an i-th beam pair may be static (e.g., the channel may be static for some or all time periods or for a certain time period), for example, when a TRP, a WTRU, and the environment with which the TRP and/or the WTRU may be associated may be stationary at a given moment. Channel gain $h_i(t,j)$ may not depend on time t (e.g., time index t may be dropped from applicable equations). A channel response may become a time-invariant filter (e.g., a linear time-invariant filter). An example linear time-invariant filter may be given by equation 6 below.

$$h_i(\tau)=\sum_{j=0}^{L_i-1} h_i(j)\delta(\tau-\tau_j) \quad \text{Eq. 6}$$

One or more CIR estimations in an uplink may be assumed to be the same as one or more CIR estimations in an associated downlink, for example, given reciprocity in a TDD mode and/or assuming that a Tx/Rx beam correspondence at a TRP may hold. Exemplary enhanced multi-beam diversity schemes (e.g., for static or slow fading channels) may be provided herein.

A TRP may (e.g., in a transmission phase) transmit a time domain signal s(n) through (e.g., all) selected beams. n may represent a time sample index. Time domain signal s(n) may be transformed from a frequency domain signal, for example, by performing IFFT and/or CP insertion. Time domain signal s(n) (e.g., for each beam used) may be pre-filtered by a filter $p_i(n)$, which may be represented by equation 7:

$$x_i(n)=s(n)\oplus p_i(n) \quad \text{Eq. 7}$$

where $\oplus$ may denote linear convolution. In a time reversal scenario, $p_i(n)$ may be represented by equation 8:

$$p_i(n) = \frac{h_i^*(L_i - 1 - n)}{\sqrt{P_{tx}}} \qquad \text{Eq. 8}$$

where ( )* may denote a complex conjugate (e.g., where a complex conjugate of a complex number may be a number with a real part and an imaginary part that may be equal in magnitude, but where the associated complex value may opposite in sign) and $L_i$ may be a length of the i-th CIR (e.g., $[h_i(0), h_i(1), \ldots, h_i(L_i-1)]$). $P_{tx}$ may be given by equation 9 below.

$$P_{tx} = \sum_{i=1}^{n_i} \sum_{j=0}^{L_i-1} |h_i(j)|^2 \qquad \text{Eq. 9}$$

$P_{tx}$ may be a transmit power normalization factor that may be used, for example, to ensure unit transmit energy per transmission. TR pre-filtering may be used to facilitate collection of beam channel energy and/or may provide a real valued peak in a composite channel impulse response, which may be described by equation 10 below.

$$c_i(n) = h_i(n) \oplus p_i(n), \qquad \text{Eq. 10}$$

A received signal (e.g., that may be received at a receiver of a WTRU) may be sampled at a time instant $nT_{sam}$. $T_{sam}$ may be derived, for example, as $T_{sam}=1/(\Delta f N_{FFT})$, where $\Delta f$ may represent OFDM subcarrier spacing. A received discrete time signal for a selected beam pair link (e.g., for each selected beam pair link) may be represented, for example, by equation 11:

$$r_i(n) = \sqrt{\rho}\, h_i(n) \otimes p_i(n) \otimes s(n) + w_i(n) \qquad \text{Eq. 11}$$
$$= \sqrt{\rho}\, c_i(n) \otimes s(n) + w_i(n)$$

where $\rho$ may be an SNR and $w_i(t)$ may represent additive white Gaussian noise (AWGN).

Streams of received spatial domain signals may be combined (e.g., upon reception $r_i(n)$, $1 \leq i \leq n_t$). Combining a same signal may boost an effective SNR and/or robustness of communication. Direct combining may be applied, where spatial streams of signals (e.g., some or all spatial streams of signals) may be summed (e.g., literally summed). Time delays of received spatial streams (e.g., of some or all received spatial streams) may be adjusted. In such a case, real valued peaks of such received spatial streams (e.g., of some or all received spatial streams) may be aligned at a same time and a single high value real peak may be obtained based on combining such received spatial streams by use of time delay adjustment.

In direct combining (may be referred to as a direct combining mode herein), received signals from multiple (e.g., all) selected beam pair links may be summed together to obtain an overall received signal, which may be represented by equation 12:

$$r(n) = \sqrt{\rho} \sum_{i=1}^{n_t} h_i(n) \otimes p_i(n) \otimes s(n) + w(n) \qquad \text{Eq. 12}$$
$$= \sqrt{\rho} \sum_{i=1}^{n_t} h_i(n) \otimes h_i^*(L_i - 1 - n) \otimes s(n) + w(n)$$

where w(n) may be defined as $w(n)=\sum_{i=1}^{n_t} w_i(n)$. Convolution of $h_i(n) \oplus p_i(n)$ may have a real valued peak at $n=L_i-1$ (e.g., due to TR pre-filtering at the transmitter), which may be represented by equation 13 below.

$$h_i(L_i - 1) \otimes p_i(L_i - 1) = \sum_{l=0}^{L-1} |h_i(l)|^2 / \sqrt{P_{tx}} \qquad \text{Eq. 13}$$

Peaks of a composite beam channel may be stronger, for example, due to a time focusing effect of a time reversal operation. An effective multipath channel $\sum_{i=1}^{n_t} h_i(n) \oplus h_i^*(L_i-1-n)$ may have improved gains, which may (e.g., equivalently) transform to an enhanced effective SNR at a receiver.

In combining implementations, a signal may be transformed into the time domain by an IFFT operation. In such a case, the signal may be spatially multiplexed to $n_t$ replicas and an i-th replica of a time domain signal may be cyclically shifted by $\Delta_i$ samples (e.g., i may be between 1 and $n_t$: $1 \leq i \leq n_t$). A cyclic shift of signal samples may be considered (e.g., equivalently considered) such that a signal may remain not shifted while a composite channel impulse response ci(n) may be cyclically shifted by $\Delta_i$ samples.

Cyclic shift parameters represented by $\Delta_i$ may be chosen such that real valued peaks (e.g., at a receiver side combiner) created by TR processing may overlap at a same time sample. Energy (e.g., some or all energy) from one or more (e.g., all) composite channel impulse responses may be collected at a single tap, which may increase an effective SNR at a receiver. Precise shifts at different transmitting branches may be performed, for example, to enable a combiner to produce a single high value peak for a combined channel response. Accurate channel estimation (e.g., on an uplink) at a TRP side may be used and may be based on a reference signal transmitted by a WTRU.

Figure 5:
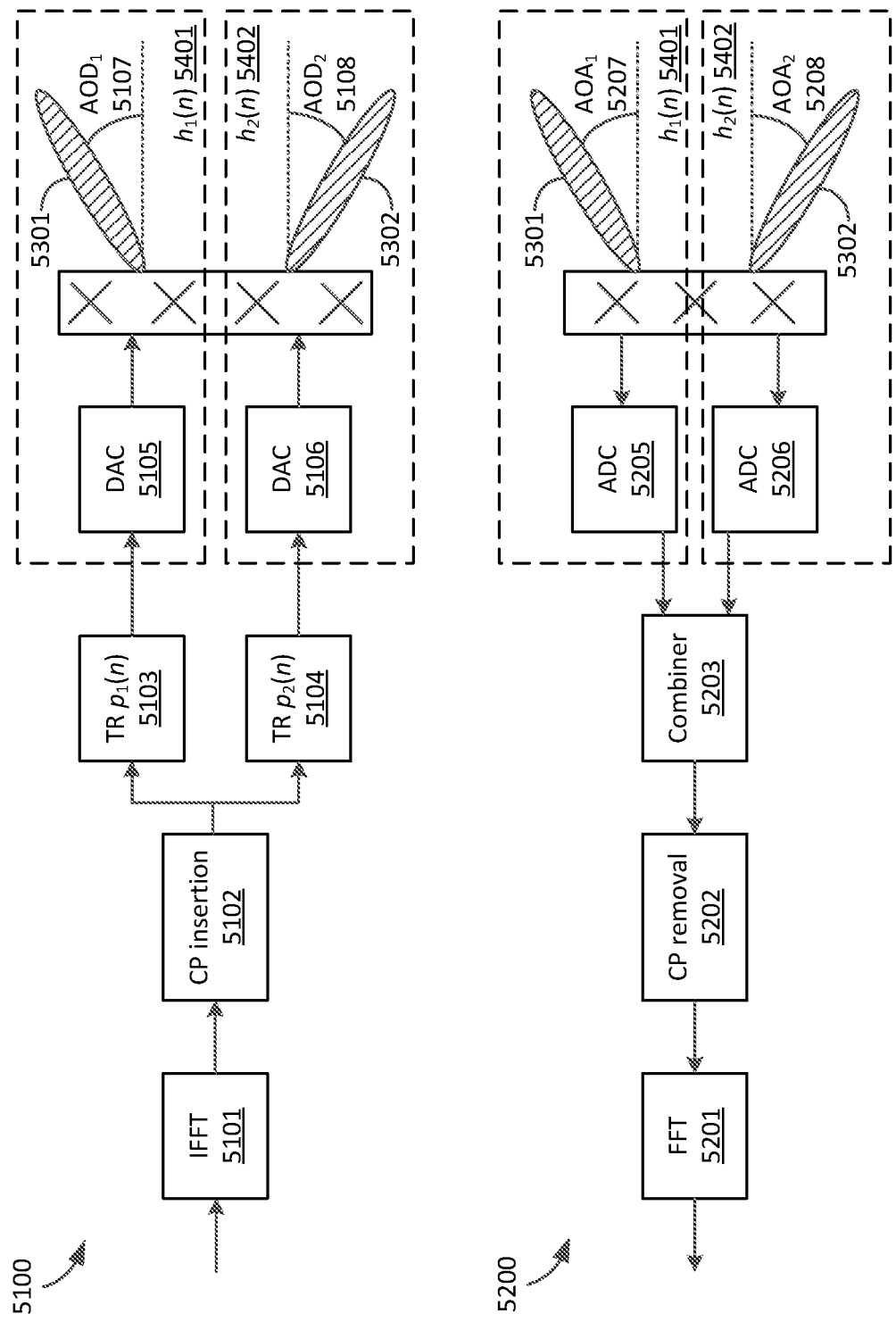
FIG. 5 illustrates an exemplary system that may employ beam management according to an example.

FIG. 5 illustrates an exemplary system architecture that may implement an enhanced multi-beam diversity scheme. The exemplary system architecture shown in FIG. 5 may include example transmitter system 5100 and example receiver system 5200. In such an exemplary system, multiple paths may be combined.

Transmitter system 5100 may receive a signal at IFFT component 5101, which may transform the signal and provide it to CP insertion component 5102. CP insertion component 5102 may add a CP to the signal and provide the resulting signal to time reversal components 5103 and 5104.

Example channel $h_1(n)$ 5401 and example channel $h_2(n)$ 5402 may be represented by dashed blocks in the exemplary diagrams of transmitter system 5100 and receiver system 5200. At transmitter system 5100, $p_1(n)$ may be time reversed at time reversal component 5103, provided to digital-to-analog conversion component 5105, and conjugated to $h_1(n)$ 5401. Further at transmitter system 5100, $p_2(n)$ may be time reversed at component 5104, provided to digital-to-analog conversion component 5106, and conjugated to $h_2(n)$ 5402.

At transmitter system 5100, two beam pairs 5301 and 5302 may be formed and transmitted. Beam pairs 5301 and 5302 may be received by receiver system 5200 (e.g., without considering transmitter cyclic shifts). Beam pair 5301 may have angle of departure AOD1 5107 at transmitter system 5100 and angle of arrival $AOA_1$ 5207 at receiver system 5200. Beam pair 5302 may have angle of departure $AOD_2$ 5108 at transmitter system 5100 and angle of arrival $AOA_2$ 5208 at receiver system 5200.

At receiver system 5200, the signal may be transformed to the digital domain at analog-to-digital conversion (ADC) components 5205 and 5206. The resulting digital signals may be combined at combiner component 5203. An effective multipath channel with two (e.g., strong) real valued paths may be provided by such combining. The combined signal may have CP removed by CP removal component 5202 and may be transformed at fast Fourier transform (FFT) component 5201.

Figure 6:
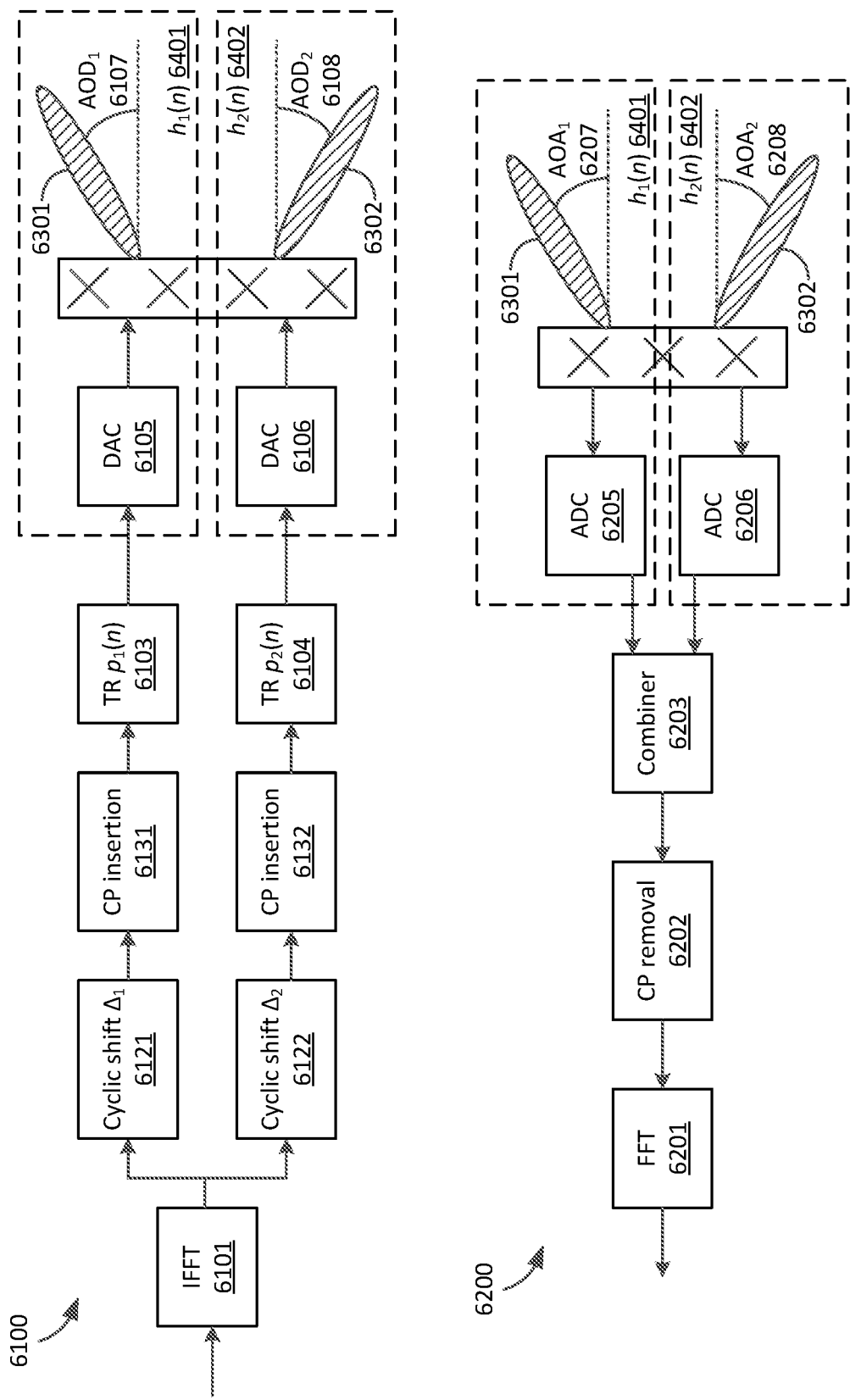
FIG. 6 illustrates an exemplary system that may employ beam management according to an example.

FIG. 6 illustrates an exemplary system architecture that may implement an enhanced multi-beam diversity scheme that may use or otherwise consider one or more cyclic shifts that may be performed at a transmitter. The exemplary system architecture shown in FIG. 6 may include example transmitter system 6100 and example receiver system 6200.

Transmitter system 6100 may receive a signal at IFFT component 6101, which may transform the signal and provide it to cyclic shift $\Delta_1$ component 6121 and cyclic shift $\Delta_2$ component 6122. Cyclically shifted signals generated by cyclic shift $\Delta_1$ component 6121 and cyclic shift $\Delta_2$ component 6122 may be provided to CP insertion component 6131 and CP insertion component 6132, respectively. CP insertion components 6131 and 6132 may add a CP to their respective received signals and may provide the resulting signals to time reversal components 6103 and 6104, respectively.

Example channel $h_1(n)$ 6401 and example channel $h_2(n)$ 6402 may be represented by dashed blocks in the exemplary diagrams of transmitter system 6100 and receiver system 6200. At transmitter system 6100, $p_1(n)$ may be time reversed at time reversal component 6103, provided to digital-to-analog conversion component 6105, and conjugated to $h_1(n)$ 6401. Further at transmitter system 6100, $p_2(n)$ may be time reversed at component 6104, provided to digital-to-analog conversion component 6106, and conjugated to $h_2(n)$ 6402.

At transmitter system 6100, two beam pairs 6301 and 6302 may be formed and transmitted. Beam pairs 6301 and 6302 may be received by receiver system 6200 (e.g., without considering transmitter cyclic shifts). Beam pair 6301 may have angle of departure $AOD_1$ 6107 at transmitter system 6100 and angle of arrival $AOA_1$ 6207 at receiver system 6200. Beam pair 6302 may have angle of departure $AOD_2$ 6108 at transmitter system 6100 and angle of arrival $AOA_2$ 6208 at receiver system 6200.

At receiver system 6200, the signal may be transformed to the digital domain at analog-to-digital conversion (ADC) components 6205 and 6206. The resulting digital signals may be combined at combiner component 6203. An effective multipath channel with two (e.g., strong) real valued paths may be provided by such combining. The combined signal may have CP removed by CP removal component 6202 and may be transformed at FFT component 6201.

Note that implementations described herein as addressing multiple beams from one TRP may be applicable to multi-beam diversity implementations that may address multiple beams from multiple TRPs. Note also that MBM and/or BM may be combined with the enhanced multi-beam diversity implementations set forth herein.

Fast beam adaptation and/or recovery implementations may be used to address radio link failure, for example, that may be due to blockage, WTRU rotation, and/or WTRU movement.

Figure 7:
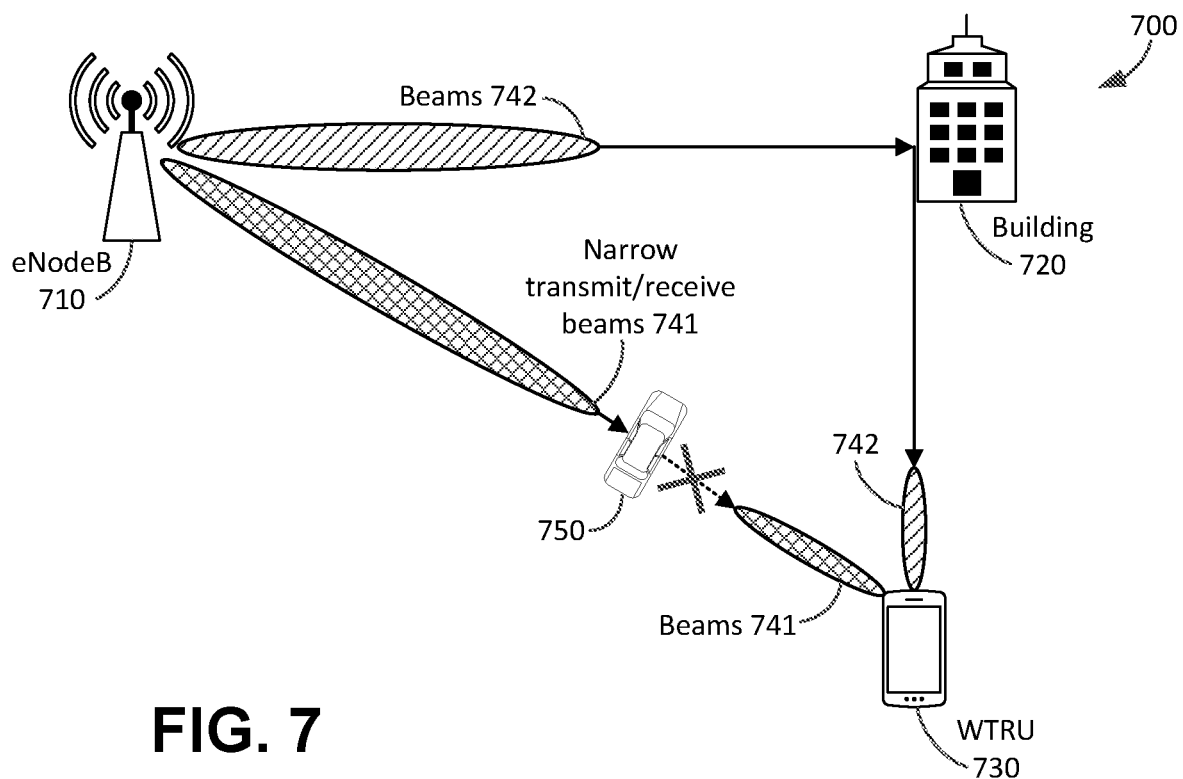
FIG. 7 illustrates a block diagram of an exemplary scenario in which dynamic blockage may occur and may be addressed by a beam direction switch according to an example.

FIG. 7 is a block diagram of exemplary scenario 700 that may illustrate an example of dynamic blockage, which may be addressed, for example, by beam direction switching. eNodeB 710 and WTRU 730 may be communicating using one or more narrow transmit and/or receive beams 741. Beams 741 may be blocked by object 750, which may be, for example, a passing vehicle. Such a dynamic blockage (e.g., a blockage that may be caused by object 750) may be addressed by a beam direction switch. Such a beam direction switch may occur when eNodeB 710 and WTRU 730 may tune their respective antennas to a different direction to achieve a better link.

Such a beam direction switch may make use of signaling between eNodeB 710 and WTRU 730, for example, to synchronize on a beam switch direction and/or timing. One or more delays may apply in such a beam direction switch process.

Upon a beam direction switch, beams 742 (e.g., that may be one or more narrow transmit and/or receive beams) may be used. Beams 742 may enable communication between eNodeB 710 and WTRU 730 that may have been prevented by blocking object 750 when eNodeB 710 and WTRU 730 were using beams 741. Beams 742 may employ reflection, such as reflection resulting from or otherwise provided by building 720. By using such a beam direction switch, a dynamic blocker, such as object 750, may cease to be a blocker within a short time period. Another beam direction switch process may be employed (e.g., when dynamic blocker 750 is no longer blocking beams 741), for example, to recover or return to an original beam direction (e.g., return to using beams 741) that may provide increased link quality.

A beam pair link (e.g., a "best" beam pair link) between TRP 710 and WTRU 730 may be determined, for example, by periodic and/or aperiodic and/or trigger-based beam measurement. Beam pair links (e.g., "better" beam pair links) between TRP 710 and WTRU 730 that may have better quality (e.g., better quality without blocking) may be determined, for example, by periodic and/or aperiodic and/or trigger-based beam measurement. Scanning and/or tracking of beam pair links, for example, for dynamic switching among multiple beam pairing links, may be used.

A beam direction switching process may be triggered by an event. Such an event may be pre-defined and/or specified. Such an event may include determining that a signal-to-interference-plus-noise ratio (SINR), a received signal strength indicator (RSSI), a reference signals received power (RSRP), a reference signal received quality (RSRQ), and/or a CQI of a serving beam pair link may be equal to or below a pre-defined and/or configured threshold.

Such an event may also, or instead, include determining that a SINR, RSSI, RSRP, RSRQ, and/or CQI of an alternate beam pair link may be equal to or above a pre-defined and/or configured threshold.

Such an event may also, or instead, include determining that a SINR, RSSI, RSRP, RSRQ, and/or CQI of an alternate beam pair link may be "better" than a serving beam pair link, for example, as compared to a pre-defined and/or configured offset.

Such an event may also, or instead, include determining that a number of negative acknowledgements (NACKs) that may be received may be equal to or above a pre-defined and/or configured threshold within a pre-defined and/or configured time window.

Such an event may also, or instead, include determining that a number of automatic repeat request (ARQ) NACKs that may be received at a radio link control (RLC) layer may be equal to or above a pre-defined and/or configured threshold.

Such an event may also, or instead, include determining that a number of OUT OF SYNC indications may be equal to or above a pre-defined and/or configured threshold within a pre-defined and/or configured time window.

Any such events, and any other events set forth herein, may be used individually or in combination to trigger a beam direction switching process.

Beam width adaptation and/or switching may be used to address dynamic blockage. An eNodeB and/or a WTRU may adjust (e.g., broaden) a beam width (e.g., instead of, or in addition to, adjusting a beam direction) for a transmit beam and/or a receive beam. Beam width may be adjusted by using, for example, an antenna array factor. An antenna array factor may indicate a number of antenna elements that may be used, a separation of antenna elements, an element pattern, etc. An antenna array factor may also, or instead, indicate an advanced beamforming codebook scheme.

A broadened beam may be (e.g., only) partially affected by a dynamic blocker, for example, when such a broadened beam may have a larger beam width than the blocked angle that may be caused by a dynamic blocker. Signals may be transmitted through remaining unblocked angles, for example, as shown in example scenario 800 illustrated in FIG. 8.

Figure 8:
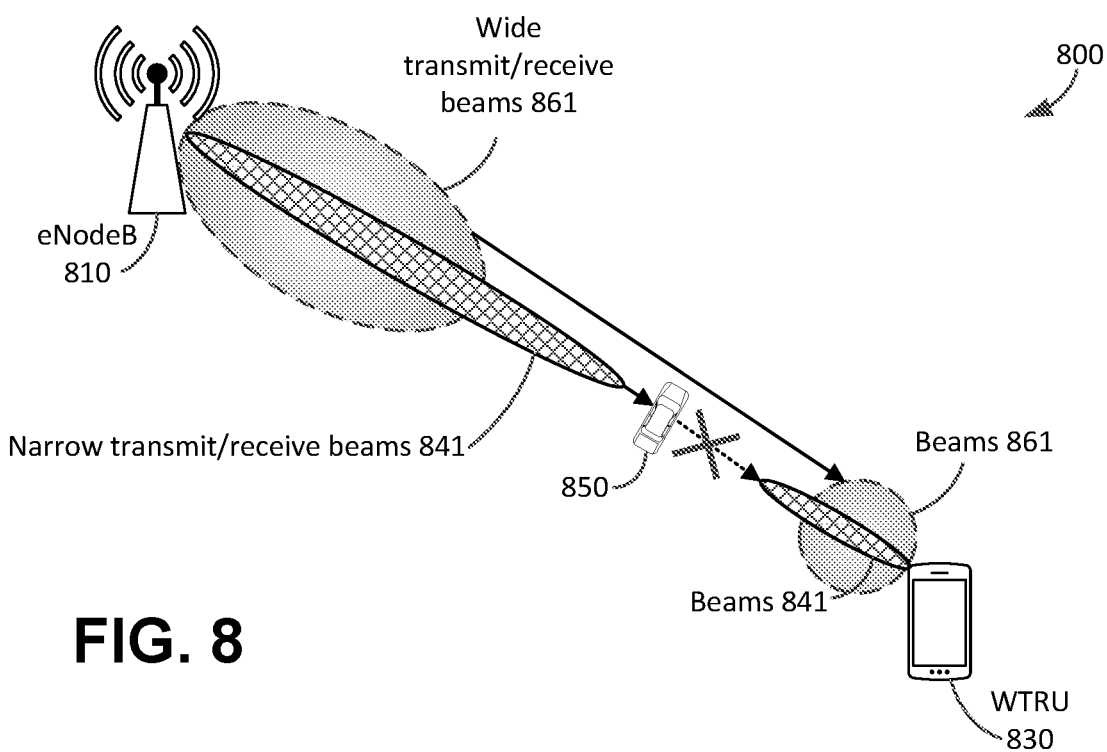
FIG. 8 illustrates a block diagram of an exemplary scenario in which dynamic blockage may occur and may be addressed by a beam width switch according to an example.

FIG. 8 illustrates example scenario 800 showing an exemplary method and system for addressing dynamic blockage using beam width adaptation and/or switching. Beam width adaption and/or switching implementations may have low latency, for example, when a beam direction may not be tuned. Beam width adaption and/or switching implementations may not measure and/or store secondary (e.g., backup) beam information.

Antenna gain and/or data throughput resulting from beam width adaption and/or switching may be reduced as compared to gain and/or data throughput provided by one or more original (e.g., prior to using beam width adaption and/or switching), more narrow beams. Beam width adaption may provide a larger antenna gain than an antenna gain that may be provided by beam switching, for example, due to reduced path loss in an original beam direction.

As shown in FIG. 8, eNodeB 810 and WTRU 830 may be communicating using one or more narrow transmit and/or receive beams 841. Beams 841 may be blocked by object 850, which may be, for example, a passing vehicle. Such a dynamic blockage (e.g., a blockage that may be caused by object 850) may be addressed using beam width adaption and/or switching. Such beam width adaption and/or switching may occur when eNodeB 810 and/or WTRU 830 may adjust a beam width of one or more narrow beams 841 to generate one or more wide transmit and/or receive beams 861. Such a beam width adaption and/or switching may make use of signaling between eNodeB 810 and WTRU 830, for example, to synchronize on a beam width adjustment and/or switch. One or more delays may apply in such a beam width adjustment and/or switch.

A dynamic blocker, such as object 850, may only partially block wide transmit and/or receive beams 861, as shown in FIG. 8. Another beam width adaption and/or switching may be employed (e.g., when dynamic blocker 750 stops blocking), for example, to recover or return to an original beam width that may, for example, provide increased link quality.

Beam width adaption and/or switching implementations may use one or more levels of beam widths. An RF chain may support each such beam width level. A narrow beam may be associated with a greater number of antenna elements as compared to a wide beam that may be associated with fewer antenna elements.

Beam width adaption and/or switching implementations may be implemented by both an eNodeB and a WTRU or by one of eNodeB and a WTRU. Beam width adaption and/or switching implementations may be based on other events and/or criteria than blockage, such as link maintenance for due to WTRU movement moment and/or rotation. Other events and/or criteria are contemplated for initiation of beam width adaption and/or switching implementations.

Figure 9:
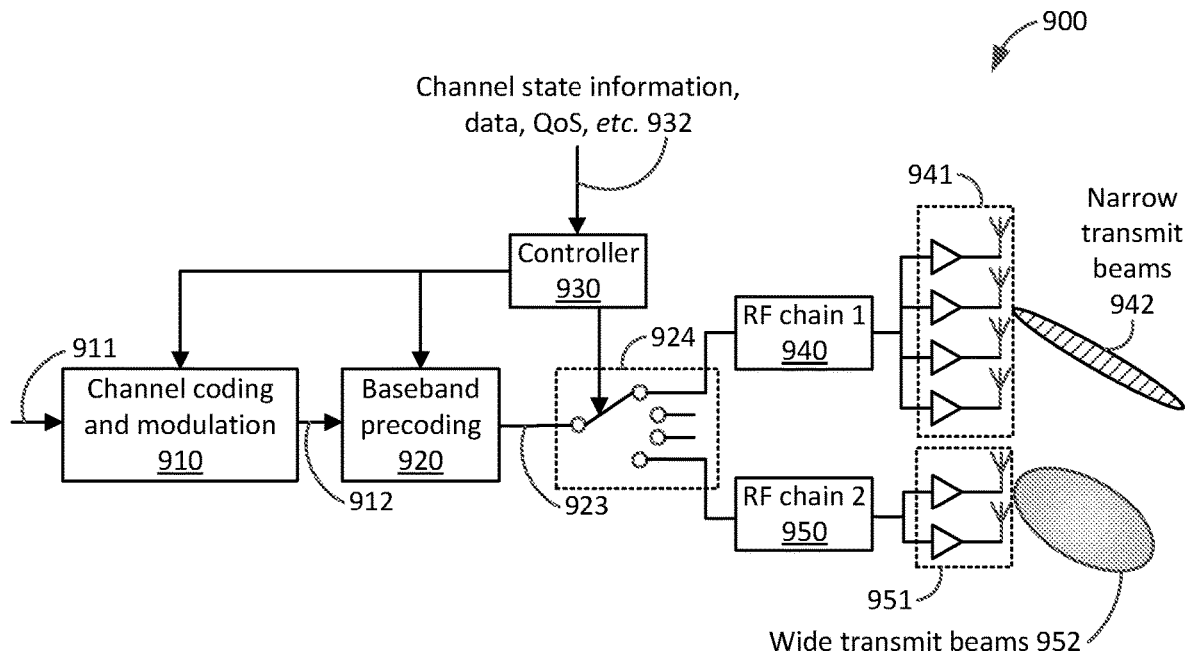
FIG. 9 illustrates an exemplary beam management system employing beam width adaptation according to an example.

FIG. 9 illustrates block diagram 900 of an example transmitter system architecture that may support beam width adaption and/or switching implementations. Received data 911 may be channel coded and/or modulated at channel coding and modulation component 910. Resulting data 912 may be processed by baseband precoding component 920. Resulting precoded data 923 may be sent to switcher 924 that may select an RF chain, such as one of RF chain 1 940 or RF chain 2 950. Each of exemplary RF chains 940 and 950 may be associated with a number of antenna elements, such as antenna elements 941 and 951, respectively. One or more analog beamforming components may process data and/or a signal received from one or both of RF chain 1 940 and/or RF chain 2 950 before each of antenna elements 941 and 951, respectively, process and transmit such data and/or a signal. Antenna element 941 may transmit one or more narrow transmit beams 942. Antenna element 951 may transmit one or more wide transmit beams 952.

Controller 930 may receive information 932 that may include, but is not limited to, channel state information, data information, quality of service (QoS) information, etc. Controller 932 may determine (e.g., based on received information 932) whether to switch an RF chain for precoded data 923 that may be provided to switcher 924. Controller 930 may control digital and/or analog beamforming in an effort to achieve one or more desired and/or required data transmissions. For example, controller 930 may adjust a channel coding and/or modulation block such that a resulting MCS may match a beam width. For example, a wide beam may have a smaller beam forming gain. An MCS value may be reduced, for example, when a wide beam (e.g., one or more of wide transmit beams 952) may be used. An MCS value may be increased, for example, when a narrow beam (e.g., one or more of narrow transmit beams 952) may be used.

Beam width adaption and/or switching implementations may be triggered, for example, by one or more predefined and/or specified events. Such events may include determining and/or receiving an indication that one or more of SINR, RSSI, RSRP, RSRQ, and/or CQI for a serving beam or beam pair link may be below a predefined and/or configured threshold.

Such events may also, or instead, include determining and/or receiving an indication that one or more of SINR, RSSI, RSRP, RSRQ, and/or CQI for an alternate beam or beam pair link may be above a predefined and/or configured threshold and/or may be "better" (e.g., based on a predefined and/or configured offset) than a serving beam or beam pair link.

Such events may also, or instead, include determining and/or receiving an indication that a number of NACKs received may be above a predefined and/or configured threshold within a predefined and/or configured time window.

Such events may also, or instead, include determining and/or receiving an indication that a number of ARQ NACKs received at an RLC layer may be above a predefined and/or configured threshold.

Such events may also, or instead, include determining and/or receiving an indication that a number of OUT OF SYNC indications may be above a predefined and/or configured threshold within a predefined and/or configured time window.

Beam direction switching and beam width adaptation and/or switching implementations may be used together (e.g., merged or used jointly), for example, to provide beam management under one or more conditions. For example, a large blocker and/or a closely proximate blocker may block a range (e.g., a large range) of arrival angles for a WTRU. A beam width adaptation and/or switch may not overcome such blocking while a beam direction switch scheme may overcome such blocking. Implementations that may make decisions and/or transitions among multiple approaches may be used.

Figure 10:
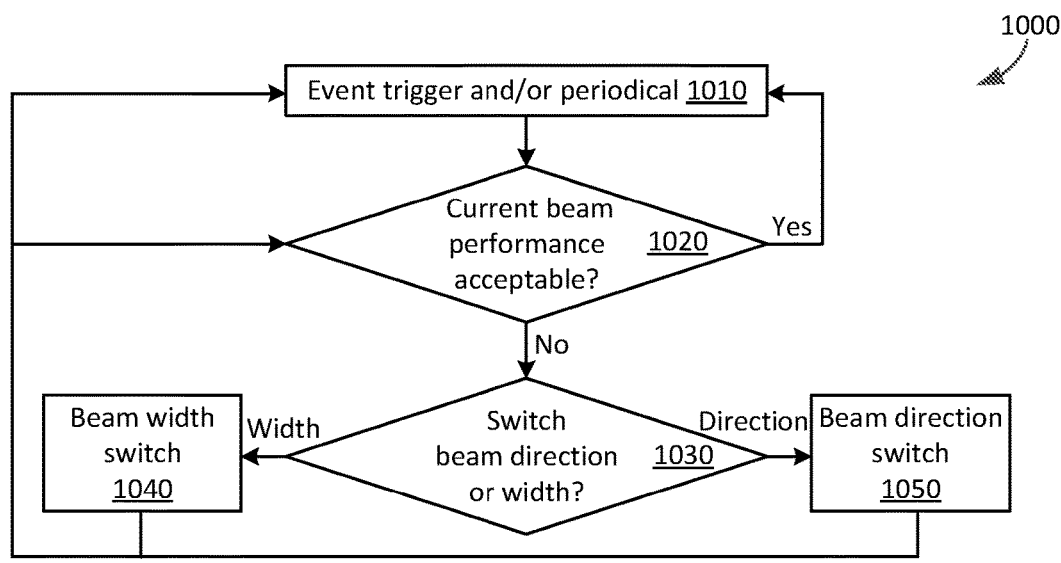
FIG. 10 illustrates an example associated with beam width switch operations and/or beam direction switch operations according to an example.

FIG. 10 illustrates a block diagram of an exemplary method 1000 that may be employed by implementations that may select and/or determine whether to use one or both of beam direction switching and beam width adaptation and/or switching.

At block 1010, an event and/or a period-related criterion (e.g., an expiration of a period) may be detected and/or determined, for example, by an eNodeB and/or a WTRU. Upon such detection and/or determination, at block 1020 a determination may be made (e.g., by an eNodeB and/or a WTRU) as to whether a performance and/or any other characteristic of one or more beams that may currently be in use may be "acceptable" and/or a may have one or more quality values that may satisfy one or more thresholds. For example, any of the criteria set forth herein, and any other criteria, that may be used for triggering a switch of beam width and/or a switch of beam direction may be evaluated at block 1020. Some or all such criteria are contemplated. Such an evaluation may result in a determination that current beam performance may be "acceptable" and/or may have one or more quality values that may satisfy one or more thresholds and method 1000 may return to block 1010 for detection of a next event and/or period-related criterion.

At block 1020, a determination may be made (e.g., by an eNodeB and/or a WTRU) that a performance and/or any other characteristic of one or more beams that may currently be in use may not be "acceptable" and/or may not have one or more quality values that may satisfy one or more thresholds. For example, any of the criteria set forth herein, and any other criteria, that may be used for triggering a switch of beam width and/or a switch of beam direction may be evaluated at block 1020. Some or all such criteria are contemplated. Such an evaluation may result in a determination that current beam performance is not "acceptable" and/or may not have one or more quality values that may satisfy one or more thresholds and method 1000 may proceed to block 1030 for determination of whether a beam direction switch or a beam width switch may be warranted.

At block 1030, a determination may be made (e.g., by an eNodeB and/or a WTRU) that a beam width switch may be a preferred response to current beam performance that may not be "acceptable" and/or may not have one or more quality values that may satisfy one or more thresholds (e.g., as opposed to a response of a beam direction switch). Method 1000 may proceed to block 1040 where a beam width switch may be implemented. Following such a beam width switch, method 1000 may proceed to block 1010 to determine whether a next event and/or period-related criterion may be detected. Following such a beam width switch, method 1000 may also, or instead, determine whether current beam performance may be "acceptable" and/or may have one or more quality values that may satisfy one or more thresholds at block 1020. It is contemplated that implementations set forth herein may use either or both aspects of block 1010 and/or 1020 for determining whether to implement a beam width switch, a beam direction switch, or both (e.g., in combination).

At block 1030, a determination may be made (e.g., by an eNodeB and/or a WTRU) that a beam direction switch may be a preferred response to current beam performance not being "acceptable" and/or may not have one or more quality values that may satisfy one or more thresholds (e.g., as opposed to a response of a beam width switch). Method 1000 may proceed to block 1050 where a beam direction switch may be implemented. Following such a beam direction switch, method 1000 may proceed to block 1010 to determine whether a next event and/or period-related criterion may be detected. Following such a beam direction switch, method 1000 may also, or instead, determine whether current beam performance may be "acceptable" and/or may have one or more quality values that may satisfy one or more thresholds at block 1020. It is contemplated that implementations set forth herein may use either or both aspects of block 1010 and/or 1020 for determining whether to implement a beam width switch, a beam direction switch, or both (e.g., in combination).

Figure 11:
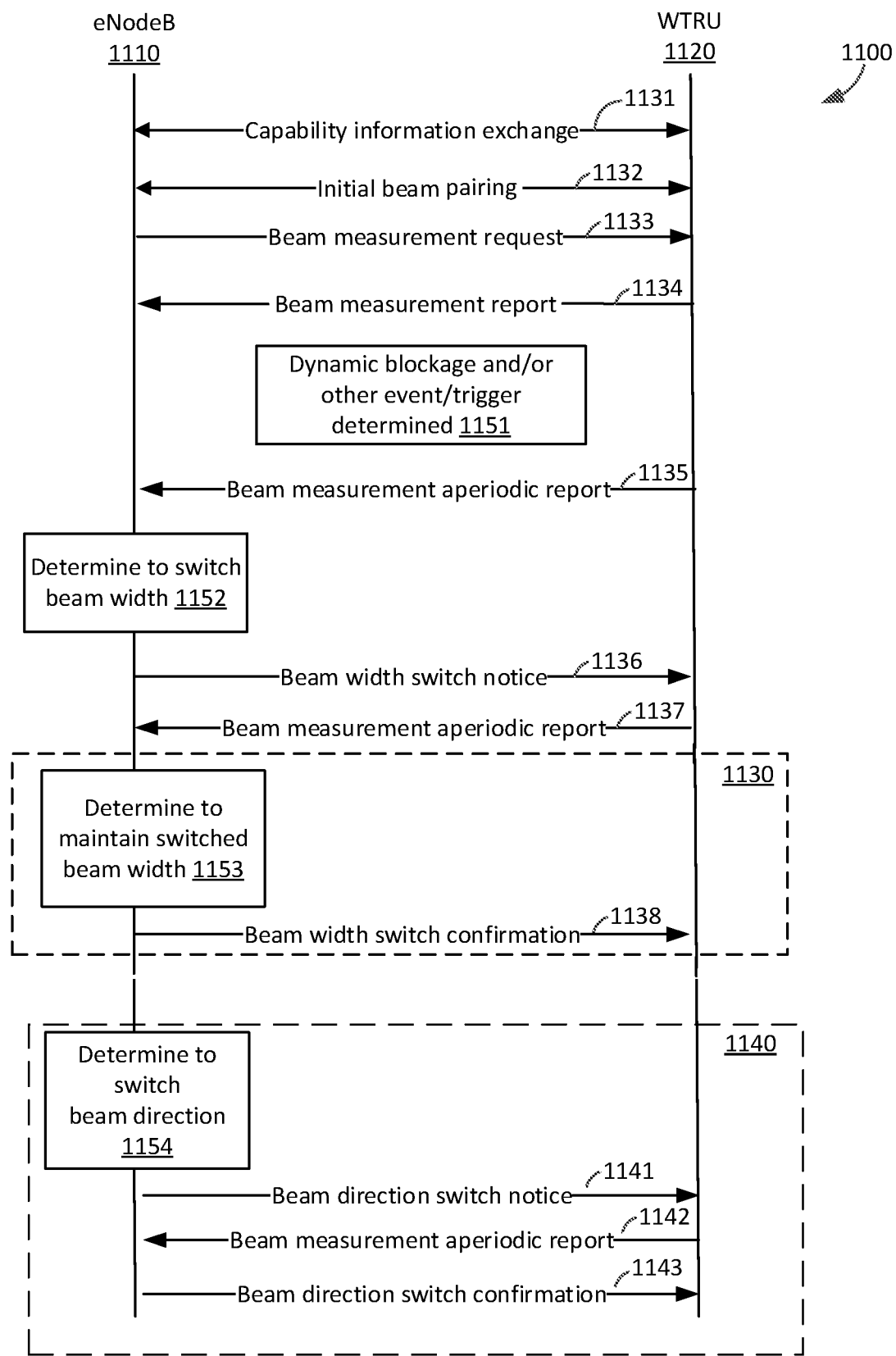
FIG. 11 illustrates an exemplary message flow according to an example.

FIG. 11 illustrates exemplary message flow 1100 that may represent an exchange of messages between an eNodeB and a WTRU, such as example eNodeB 1110 and example WTRU 1120 of FIG. 11, respectively. Exemplary message flow 1100 may represent an exchange of messages that may facilitate beam direction switching and/or beam width switching, where such an exchange of messages may be initiated by an eNodeB (e.g., eNodeB 1110).

At message exchange 1131, capability information may be exchanged between eNodeB 1110 and WTRU 1120. At message exchange 1131, WTRU 1120 may acquire eNodeB 1110 beam forming capability information while WTRU 1120 may inform eNodeB 1110 of WTRU 1120 beam forming capabilities. Such information may be exchanged when WTRU 1120 may register with eNodeB 1110.

Initial beam pairing between eNodeB 1110 and WTRU 1120 may occur at message exchange 1132. At message exchange 1133, eNodeB 1110 may request that WTRU 1120 perform beam measurement (e.g., in a periodic manner, an aperiodic manner, or both). WTRU 1120 may report one or more beam measurements at message exchange 1134 (e.g., periodically, aperiodically, or both). An event, trigger, and/or dynamic blockage may occur and/or be detected and/or determined at block 1151. WTRU 1120 may report a beam measurement (e.g., aperiodically based on the detected and/or determined event and/or blockage) at message exchange 1135. [0203] eNodeB 1110 may determine, at block 1152, to switch beam width, for example, based on the aperiodic beam measurement report provided at message exchange 1135. eNodeB 1110 may inform or otherwise notify WTRU 1120 of such a beam width switch determination at message exchange 1136. Such a beam width switch may be performed at eNodeB 1110, WTRU 1120, or at both eNodeB 1110 and WTRU 1120. WTRU 1120 may measure and/or report a beam measurement (e.g., aperiodically) to eNodeB 1110 at message exchange 1137, for example, following the beam width switch.

At beam width switch determination operations 1130, eNodeB 1110 may determine at block 1153 to maintain a beam width that may have resulted from the performed beam width switch. eNodeB 1110 may send a beam width switch confirmation to WTRU 1120 at message exchange 1138, for example, when a new beam measurement report may indicate that beam quality may be "acceptable" and/or may have one or more quality values that may satisfy one or more thresholds. In such an example, eNodeB 1110 and WTRU 1120 may maintain their respective configurations reflecting the performed beam width switch. eNodeB 1110 may determine that a new beam measurement report may indicate that beam quality may not be "acceptable" and/or may not have one or more quality values that may satisfy one or more thresholds, and may send a message to WTRU 1120 indicating such.

At beam direction switch determination operations 1140, eNodeB 1110 may determine, at block 1154, to switch beam direction, for example, based on the aperiodic beam measurement report provided at message exchange 1135. eNodeB 1110 may inform or otherwise notify WTRU 1120 of such a beam direction switch determination at message exchange 1141. Such a beam direction switch may be performed at eNodeB 1110, WTRU 1120, or at both eNodeB 1110 and WTRU 1120. WTRU 1120 may measure and/or report a beam measurement (e.g., aperiodically) to eNodeB 1110 at message exchange 1142, for example, following the beam direction switch. [0206] eNodeB 1110 may send a beam direction switch confirmation to WTRU 1120 at message exchange 1143, for example, when a new beam measurement report may indicate that beam quality may be "acceptable" and/or may have one or more quality values that may satisfy one or more thresholds. In such an example, eNodeB 1110 and WTRU 1120 may maintain their respective configurations reflecting the performed beam direction switch. eNodeB 1110 may determine that a new beam measurement report may indicate that beam quality may not be "acceptable" and/or may not have one or more quality values that may satisfy one or more thresholds, and may send a message to WTRU 1120 indicating such information.

Figure 12:
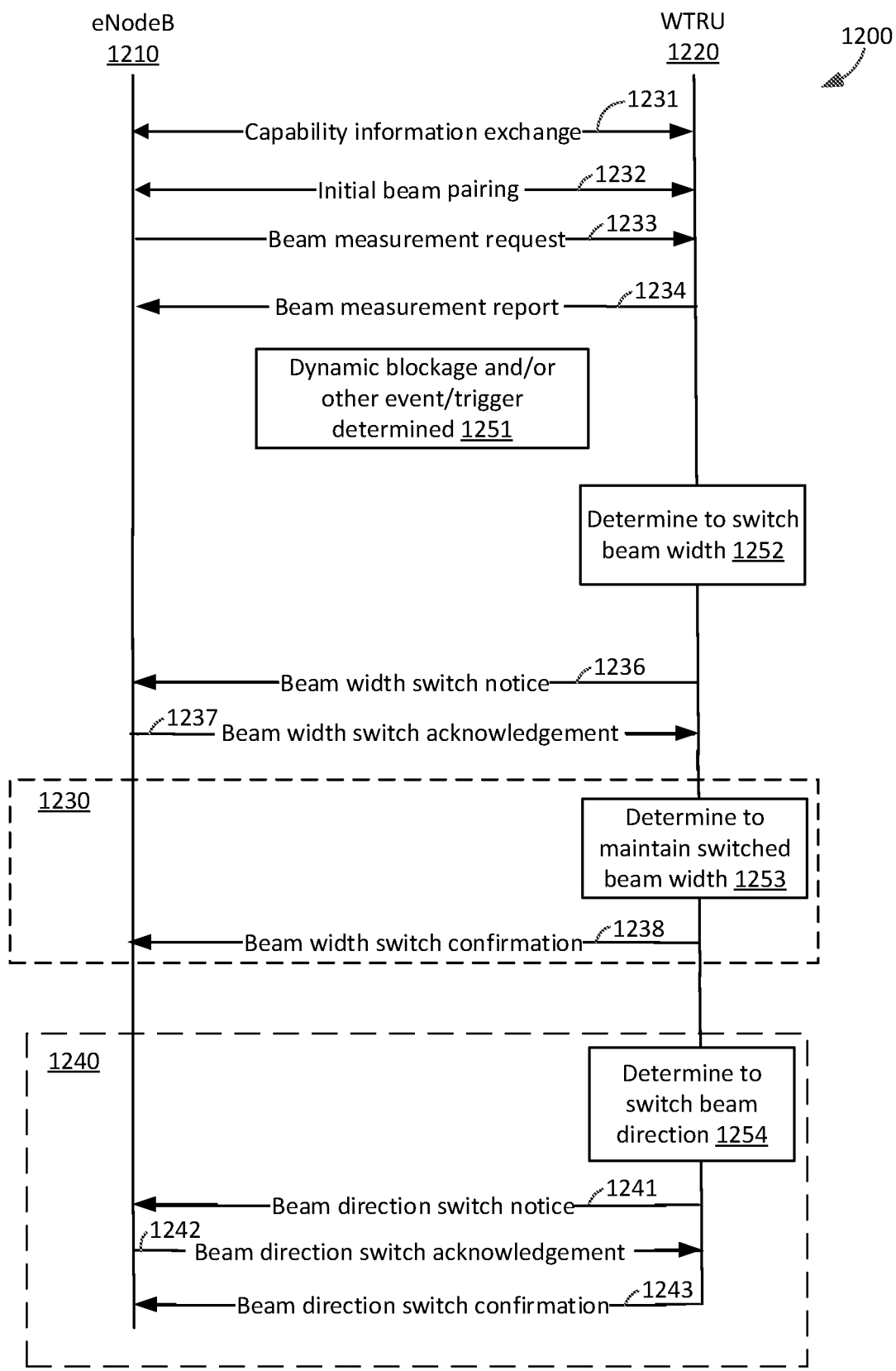
FIG. 12 illustrates an exemplary message flow according to an example.

FIG. 12 illustrates exemplary message flow 1200 that may represent an exchange of messages between an eNodeB and a WTRU, such as example eNodeB 1210 and example WTRU 1220 of FIG. 12, respectively. Exemplary message flow 1200 may represent an exchange of messages that may facilitate beam direction switching and/or beam width switching, where such an exchange of messages may be initiated by a WTRU (e.g., WTRU 1220).

At message exchange 1231, capability information may be exchanged between eNodeB 1210 and WTRU 1220. At message exchange 1231, WTRU 1220 may acquire eNodeB 1210 beam forming capability information while WTRU 1220 may inform eNodeB 1210 of WTRU 1220 beam forming capabilities. Such information may be exchanged when WTRU 1220 may register with eNodeB 1210.

Initial beam pairing between eNodeB 1210 and WTRU 1220 may occur at message exchange 1232. At message exchange 1233, eNodeB 1210 may request that WTRU 1220 perform beam measurement (e.g., in a periodic manner, an aperiodic manner, or both). WTRU 1220 may report one or more beam measurements at message exchange 1234 (e.g., periodically, aperiodically, or both).

An event, trigger, and/or dynamic blockage may occur and/or be detected and/or determined at block 1251. WTRU 1220 may determine, at block 1252, to switch beam width, for example, based on one or more beam measurements and/or a detected and/or determined event, trigger, and/or dynamic blockage.

WTRU 1220 may inform or otherwise notify eNodeB 1210 of such a beam width switch determination at message exchange 1236. Such a beam width switch may be performed at WTRU 1220, eNodeB 1210, or at both eNodeB 1210 and WTRU 1220. WTRU 1220 may acknowledge such a beam width switch and/or measure, and/or report a beam measurement (e.g., aperiodically) to eNodeB 1210 at message exchange 1237, for example, following the beam width switch. At message exchange 1237, eNodeB 1210 may provide a beam width switch acknowledgement to WTRU 1220.

At beam width switch determination process 1230, WTRU 1220 may determine at block 1253 to maintain a beam width that may have resulted from the performed beam width switch. WTRU 1220 may send a beam width switch confirmation to eNodeB 1210 at message exchange 1238, for example, when a new beam measurement report may indicate that beam quality may be "acceptable" and/or may have one or more quality values that may satisfy one or more thresholds. In such an example, eNodeB 1210 and WTRU 1220 may maintain their respective configurations reflecting the performed beam width switch. WTRU 1220 may determine that a new beam measurement report may indicate that beam quality may not be "acceptable" and/or may not have one or more quality values that may satisfy one or more thresholds, and may send a message to eNodeB 1210 indicating such information.

At beam direction switch determination process 1240, WTRU 1220 may determine, at block 1254, to switch beam direction, for example, based on one or more beam measurements. WTRU 1220 may inform or otherwise notify eNodeB 1210 of such a beam direction switch determination at message exchange 1241. Such a beam direction switch may be performed at WTRU 1220, eNodeB 1210, or at both eNodeB 1210 and WTRU 1220. eNodeB 1210 may provide a beam direction switch acknowledgement to WTRU 1220 at message exchange 1242, for example, following the beam direction switch.

WTRU 1220 may send a beam direction switch confirmation to eNodeB 1210 at message exchange 1243, for example, when a new beam measurement report may indicate that beam quality may be "acceptable" and/or may have one or more quality values that may satisfy one or more thresholds. In such an example, WTRU 1220 and eNodeB 1210 may maintain their respective configurations reflecting the performed beam direction switch. WTRU 1220 may determine that a new beam measurement report may indicate that a beam quality may not be "acceptable" and/or may not have one or more quality values that may satisfy one or more thresholds (e.g., that a beam may not have one or more quality values that may satisfy one or more thresholds) and may send a message to eNodeB 1210 indicating such information.

Beam-based semi-open loop implementations may be used according to examples set forth herein. CSI feedback may not capture the impact of WTRU rotation, movement, and/or blockage. This may be due to the rapidity of such rotation, movement, and/or blockage. CSI feedback may not be fast enough to capture the impact of such WTRU conditions. Performance of closed loop MIMO may be affected as a result.

Open loop MIMO (e.g., that may use space frequency block coding (SFBC), frequency switched transmit diversity (FSTD), large delay cyclic delay diversity (CDD) operation, etc.) may be based on CQI or a combination of CQI and rank indicator (RI). Open loop MIMO may not require precoding matrix indicator (PMI) feedback. Precoder (e.g., beam) cycling may be used with open loop MIMO (e.g., to enhance diversity). Precoder and/or beam cycling in open loop MIMO may provide decreased performance as such precoder and/or beam cycling may be performed over a wide range of directions.

Semi-open loop MIMO implementations may be used to, for example, address WTRU rotation, movement, and/or blockage. With semi-open loop MIMO implementations, a precoder may be expressed as $W=W_1 \cdot W_2$ (e.g., where W equals the product of $W_1$ and $W_2$), where $W_1$ may represent a wideband precoding matrix and/or may reflect long-term statistics. $W_2$ may represent a narrow band precoding matrix and/or may reflect instantaneous channel conditions.

Precoding matrix $W_1$ may be provided (e.g., fed back) by a receiver to a transmitter. Matrix $W_1$ may define a set of one or more discrete Fourier transform (DFT) beams that may be used for such a receiver and/or may imply an approximate direction of such a receiver. Such a transmitter may cycle (e.g., apply repeatedly) narrow band precoding matrix $W_2$ to determine a precoder.

When WTRU rotation, movement, and/or blockage may occur, an approximate direction of a receiver may remain unchanged while instantaneous channel conditions may vary (e.g., significantly).

WTRU rotation, movement, and/or blockage may trigger one or more events, including events that may be described herein. A transmitter may switch from closed-loop MIMO to semi-open loop MIMO (e.g., when instantaneous channel conditions change faster than CSI reporting).

Semi-open loop MIMO may outperform closed-loop MIMO (e.g., when instantaneous channel conditions change faster than CSI reporting) and/or may result in a reduction of signaling (e.g., as an approximate direction of a WTRU may remain unchanged and transmissions may be focused in that direction).

Semi-open loop MIMO implementations may be employed jointly with a beam diversity solution, such as one or more of any beam diversity solution set forth herein. Where beam blockage may occur due to WTRU rotation, WTRU movement, and/or WTRU blockage, semi-open loop MIMO may be applied to resolve a problem (e.g., beam blockage). Where such a problem may persist, beam direction may be switched and/or beam width may be broadened (e.g., as described herein).

Where beam blockage may occur due to WTRU rotation, WTRU movement, and/or WTRU blockage, fast beam adaptation and/or recovery implementations (e.g., as described herein) may be applied together with a switch to a semi-open loop MIMO scheme.

Where beam blockage may occur due to WTRU rotation, WTRU movement, and/or WTRU blockage, fast beam adaptation and/or recovery implementations (e.g., as described herein) may be applied to resolve such a problem. Where such a problem may persist, semi-open loop MIMO may be applied.

A TRP may inform (e.g., dynamically inform) a WTRU about a switch from open loop MIMO or closed loop MIMO to semi-open loop MIMO. For example, an indication of such a switch may be sent, e.g., via a transmission mode change.

Implementations set forth herein may support multiple TRPs. A beam may be switched from a first TRP to a second TRP that may not have blockage (e.g., where the first TRP may have blockage) and/or that may have improved link quality (e.g., where link quality associated with the first TRP may be degraded due to WTRU rotation, movement, and/or blockage). TRP switching may be performed, for example, in a dynamic or semi-static fashion.

Figure 13:
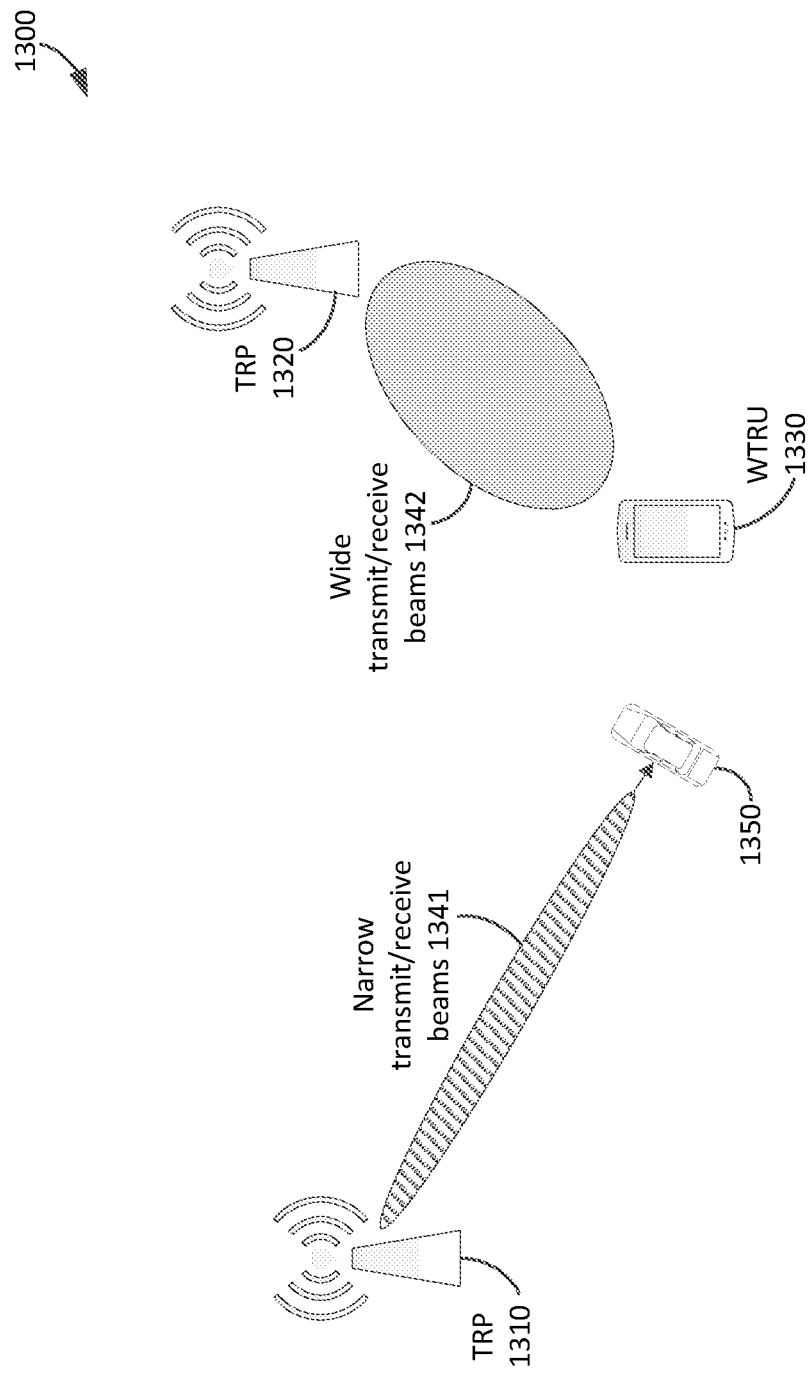
FIG. 13 illustrates a block diagram of an exemplary scenario that may include support for multiple transmission and reception points (TRPs) according to an example.

FIG. 13 illustrates exemplary scenario 1300 in which implementations that may provide support for multiple TRPs may be implemented. Exemplary scenario 1300 may include multiple (e.g., two) TRPs, such as TRP 1310 and TRP 1320. TRPs 1310 and 1320 may each belong to a same cell and may have a same cell ID. WTRU 1330 may initially be camped on TRP 1310. WTRU 1330 may initially receive data from TRP 1310 via one or more narrow transmit/receive beams 1341.

Narrow transmit/receive beams 1341 from TRP 1310 may not be well received, for example, due to channel conditions (e.g., a change in channel conditions, blockage, WTRU rotation, and/or WTRU movement). Such channel conditions may include a blockage caused by an object, such as object 1350.

A neighbor TRP, such as TRP 1320, may assist with data transmissions. TRP 1320 may use one or more narrow beams or one or more wide beams for data transmissions, such as wide transmit/receive beams 1342. Data transmissions may be made by one or both of TRP 1310 and/or TRP 1320 (e.g., by TRP 1320 alone or by joint transmissions from both TRP 1310 and TRP 1320).

Figure 14:
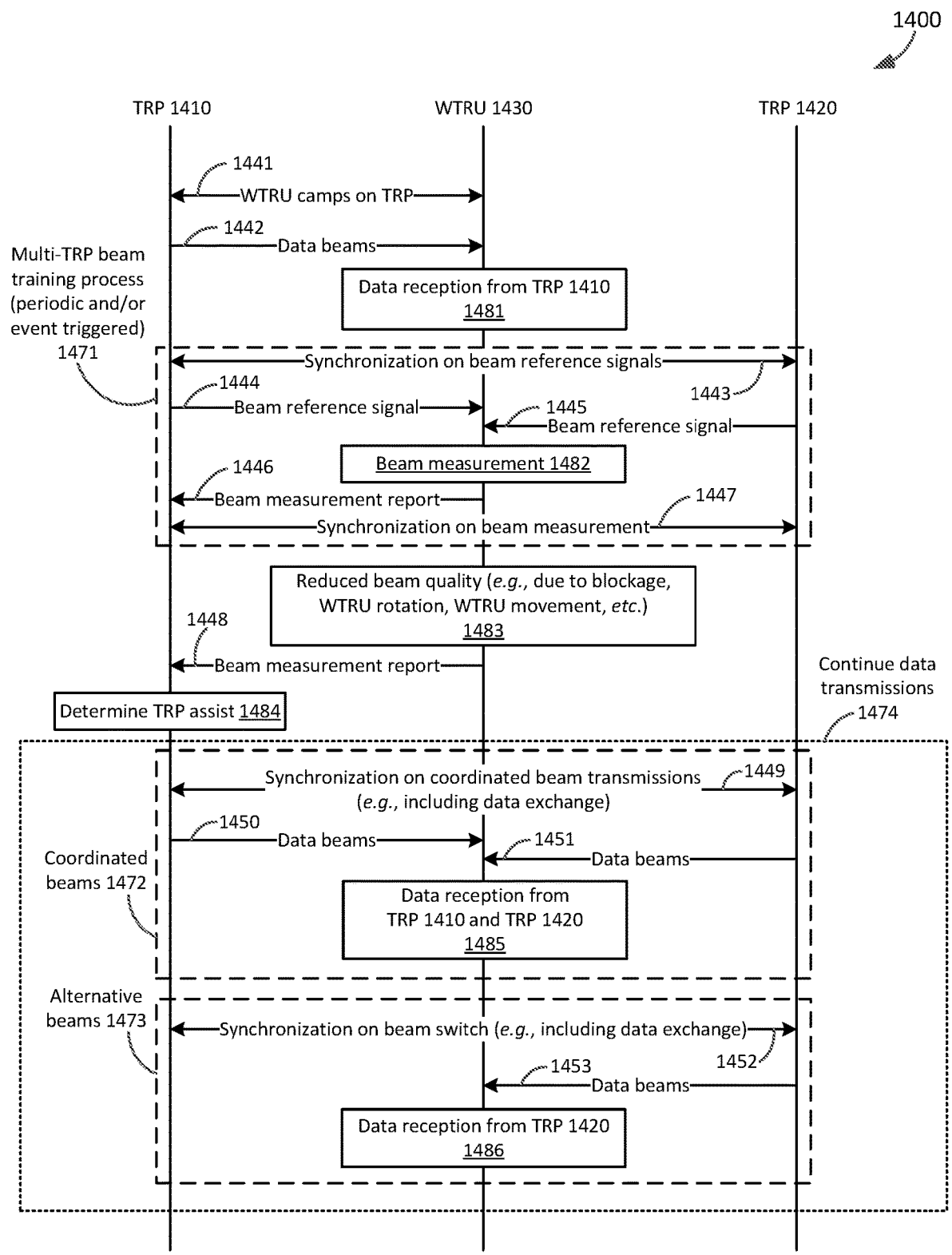
FIG. 14 illustrates an exemplary message flow according to an example.

FIG. 14 illustrates exemplary message flow 1400 that may represent an exchange of one or more messages and/or performance of one or more functions, any of which may be performed in examples implementing beam switching between multiple TRPs. In FIG. 14, exemplary WTRU measurement-based beam switching between multiple TRPs may be illustrated.

WTRU 1430 may (e.g., initially) camp on TRP 1410 using, at least in part, message exchange 1441. At message exchange 1442, WTRU 1430 may receive one or more data beams from TRP 1410. Such data beam(s) from TRP 1410 to WTRU 1410 may be one or more narrow beams and/or wide beams. Data reception 1481 may commence and/or occur at WTRU 1430.

Multi-TRP beam training process 1471 may be implemented for a WTRU, such as WTRU 1430. Multi-TRP beam training process 1471 may be triggered and/or initiated, for example, periodically and/or aperiodically (e.g., in response to one or more events).

At multi-TRP beam training process 1471, neighbor TRPs 1410 and 1420 may synchronize on one or more joint beam reference signal transmissions using message exchange 1443. Message exchange 1443 may be implemented, for example, via an X2 or X2-like connection and/or using other means. Multiple TRPs, such as TRPs 1410 and 1420, may negotiate one or more beam reference signals that may be used, transmission time for such one or more beam reference signals, etc.

At multi-TRP beam training process 1471, participating TRP 1410 may send one or more beam reference signals to WTRU 1430 at message exchange 1444, for example, when TRPs 1410 and 1420 may coordinate and/or agree on a format and/or timing of beam reference signals. Similarly, at multi-TRP beam training process 1471, participating TRP 1420 may send one or more beam reference signals to WTRU 1430 at message exchange 1445, for example, when TRPs 1410 and 1420 may coordinate and/or agree on a format and/or timing of beam reference signals. At 1482, WTRU 1430 may measure such beam reference signals that may have been received via message exchanges 1444 and/or 1445 (e.g., from some or all directions and/or from any participating TRPs, such as TRPs 1410 and 1420).

At message exchange 1446, WTRU 1430 may report beam measurement results to, for example, TRP 1410. Such measurement results may also, or instead, be reported to TRP 1420 and/or any other TRP. TRP 1410 may serve as a serving TRP, which may reduce a load of TRP 1420, which may not be actively serving WTRU 1430, or vice versa.

TRP 1410 may report beam measurement results (e.g., summarized beam measurement results) that may have been received from WTRU 1430 and/or may provide information to TRP 1420 at message exchange 1447 to, for example, facilitate synchronization of TRP 1410 and 1420 on such beam measurement(s). Such beam measurement results (e.g., summarized beam measurement results) and/or information may include an indication of one or more beams from TRP 1420 that may successfully contact WTRU 1430 and/or any other information. Further at multi-TRP beam training process 1471, neighbor TRPs 1410 and 1420 may synchronize on one or more beam measurements using message exchange 1447.

At 1483, a reduction of a quality of beam(s) used between TRP 1410 and WTRU 1430 may occur and may be detected by, for example, WTRU 1430. Such a reduction of beam quality may be due to a change in one or more channel conditions, such as blockage, WTRU rotation, WTRU movement, etc. WTRU 1430 may report such a reduction in beam quality to TRP 1410 (e.g., in a beam measurement report) at message exchange 1448.

At 1484, TRP 1410 may analyze one or more previous beam measurement reports that may have been received and/or resulted from multi-TRP beam training process 1471. TRP 1410 may determine, at 1484, whether TRP 1410 may request assistance from a neighbor TRP, such as TRP 1420. TRP 1410 may determine, at 1484, one or more types of help that TRP 1410 may request from a neighbor TRP, such as TRP 1420.

TRP 1410 may determine, at 1484, to make an effort to continue data transmissions to WTRU 1430 via TRP 1410, TRP 1420, or both TRP 1410 and TRP 1420 (e.g., as compared to determining to cease efforts to transmit data to WTRU 1430.) Either or both of exemplary processes 1472 and 1473 may be employed in effort to continue data transmissions 1474. Note that other processes may be also, or instead, be employed in an effort to continue data transmissions to WTRU 1430.

Coordinated beams process 1472 may include functions and messages that may facilitate multi-TRP coordinated transmissions. At message exchange 1449, TRP 1410 may provide to TRP 1420 information associated with coordination based on beam transmissions (e.g., beam direction, beam width) that TRP 1420 may use for such data transmissions. Message exchange 1449 may be used for synchronization of TRP 1410 and TRP 1420 based on such coordinated beam transmissions. Further at message exchange 1449, TRP 1410 may provide data to, or exchange data with, TRP 1420, where such data may be transmitted to WTRU 1430, for example, via X2 or X2-like connections (e.g., via an X2 or X2-like connection that may provide communication between one or more TRPs, gNBs, and/or eNodeBs that may be in common with such X2 or X2-like connections).

At message exchange 1450, TRP 1410 may send data to WTRU 1430. At message exchange 1451, TRP 1420 may send data to WTRU 1430. Transmissions from TRP 1410 and TRP 1420 may be coordinated. WTRU 1430 may receive data transmissions from both TRP 1410 and TRP 1420 at 1485. Symbols transmitted in TRP 1410's beam(s) may be the same (e.g., exactly the same) as symbols transmitted in TRP 1420's beam(s). Symbols transmitted in TRP 1410's beam(s) may be a subset of symbols (e.g., duplicates of some, but not all, symbols) transmitted in TRP 1420's beam(s), or vice versa. For example, TRP 1410 and TRP 1420 may each use distinct (e.g., different) constellation mapping(s) on same input data. Beam transmissions from TRP 1410 and TRP 1420 may be simultaneous (e.g., to enhance reception at WTRU 1430), for example, when TRP 1410 and TRP 1420 may transmit the same (e.g., exactly the same) set of symbols to WTRU 1430. TRP 1410 may transmit one or more beams at a different time than a time at which TRP 1420 may transmit one or more beams. WTRU 1430 may combine data received from TRP 1410 and TRP 1420 at such different times.

Beams process 1473 may include functions and messages that may facilitate alternative beam transmissions. At message exchange 1452, TRP 1410 may provide to TRP 1420 information indicating that TRP 1420 may (e.g., need to) serve WTRU 1430 without assistance from TRP 1410. At message exchange 1452, TRP 1410 may inform TRP 1420 of one or more beam IDs, beam directions, and/or beam widths that TRP 1420 may use to facilitate service to WTRU 1430. At message exchange 1452, TRP 1410 may provide data to, or exchange data with, TRP 1420 (e.g., via X2 or X2-like connections) that may be transmitted to WTRU 1430. At message exchange 1453, TRP 1420 may send data to WTRU 1430. WTRU 1430 may receive data transmissions from TRP 1420 at 1486.

Note that a WTRU, such as WTRU 1430, may execute, initiate, perform, or otherwise participate in a multi-TRP beam training process, where any TRP, such as TRP 1420, may serve as a serving TRP.

A decision as to whether to switch a beam direction or a beam width (or both, or neither) may be determined by, for example, a TRP's (e.g., TRP 1410, TRP 1420) internal decision making procedure. Such decision making operations may consider a beam width switch and/or a beam direction switch at a single TRP. For example, one or more processes and/or functions of FIG. 10 as described herein may be extended to multiple TRP implementations such as those illustrated and described herein in regard to FIG. 15.

Figure 15:
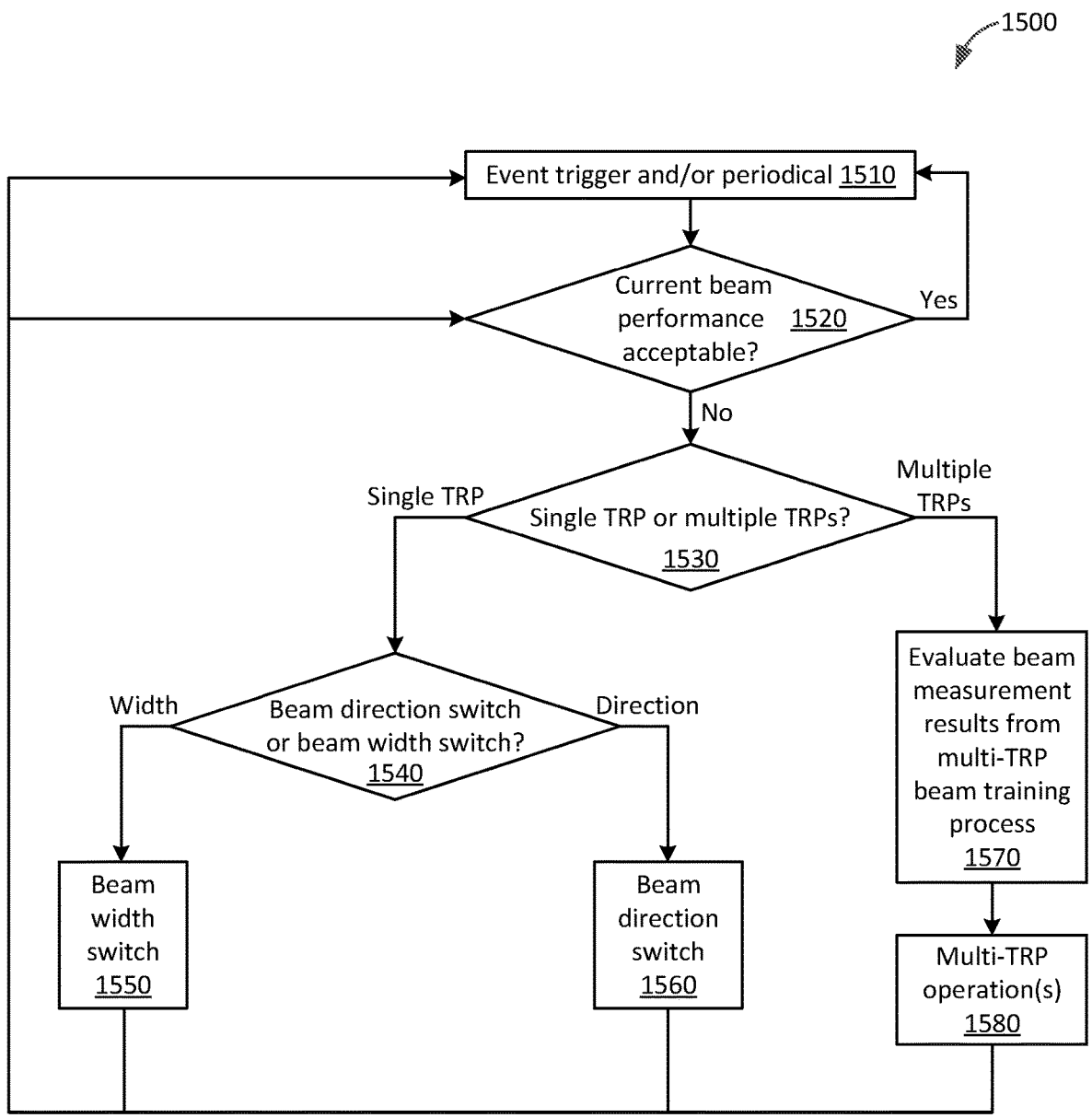
FIG. 15 illustrates an example associated with single and/or multiple TRP operations according to an example.

FIG. 15 illustrates exemplary method 1500 that may be used for determining whether to employ single TRP operations or multiple TRP operations. At block 1510, an event and/or a period-related criterion (e.g., an expiration of a period) may be detected and/or determined, for example, by an eNodeB and/or a TRP. Upon such detection and/or determination, at block 1520 a determination may be made (e.g., by an eNodeB and/or a TRP) as to whether a performance and/or any other characteristic of one or more beams that may currently be in use may be "acceptable" and/or may have one or more quality values that may satisfy one or more thresholds. For example, any of the criteria set forth herein, and any other criteria, that may be used for triggering a switch of beam width and/or a switch of beam direction may be evaluated at block 1520. Some or all such criteria are contemplated. Such an evaluation may result in a determination that current beam performance is "acceptable" and/or may have one or more quality values that may satisfy one or more thresholds, and method 1500 may return to block 1510 for detection of a next event and/or period-related criterion.

At block 1520, a determination may be made (e.g., by an eNodeB and/or a TRP) that a performance and/or any other characteristic of one or more beams that may currently be in use may not be "acceptable" and/or may not have one or more quality values that may satisfy one or more thresholds. For example, any of the criteria set forth herein, and any other criteria, that may be used for triggering a switch of beam width and/or a switch of beam direction may be evaluated at block 1520. Some or all such criteria are contemplated. Method 1500 may proceed to block 1530 where a determination may be made as to whether a single TRP or multiple TRPs may be in use and/or available.

At block 1530, it may be determined that a single TRP may be in use or otherwise available. At block 1540, it may be determined whether a beam direction switch operation or a beam width switch operation may be performed. If, at block 1540, it is determined that a beam width switch operation may be performed, at block 1550, a beam width switch may be performed. If, at block 1540, it is determined that a beam direction switch operation may be performed, at block 1560, a beam direction switch may be performed.

Upon performing either beam direction switch 1560 or beam width switch 1550, method 1500 may proceed to block 1510 to determine whether a next event and/or period-related criterion may be detected. Method 1500 may proceed to block 1520 to determine whether current beam performance may be "acceptable" and/or may have one or more quality values that may satisfy one or more thresholds. It is contemplated that implementations set forth herein may use either or both aspects of block 1510 and 1520 upon performing either beam direction switch 1560 or beam width switch 1550. Note that any one or more of beam width switch operations and beam direction switch operations set forth herein and/or any beam width switch operations and beam direction switch operations are contemplated.

At block 1530, it may be determined that multiple TRPs may be in use or otherwise available. Method 1530 may proceed to block 1570 where beam measurement results, such as those resulting from a multi-TRP training process, may be evaluated and a multi-TRP operation may be determined. At block 1580, a determined multi-TRP operation may be performed. Upon performing a determined multi-TRP operation, method 1500 may proceed to block 1510 to determine whether a next event and/or period-related criterion may be detected. Method 1500 may proceed to block 1520 to determine whether current beam performance may be "acceptable" and/or may not have one or more quality values that may satisfy one or more thresholds. It is contemplated that implementations set forth herein may use either or both aspects of block 1510 and 1520 upon a determined multi-TRP operation at block 1580. Note that any one or more of multi-TRP operations set forth herein and/or any other multi-TRP operations are contemplated.

Figure 16:
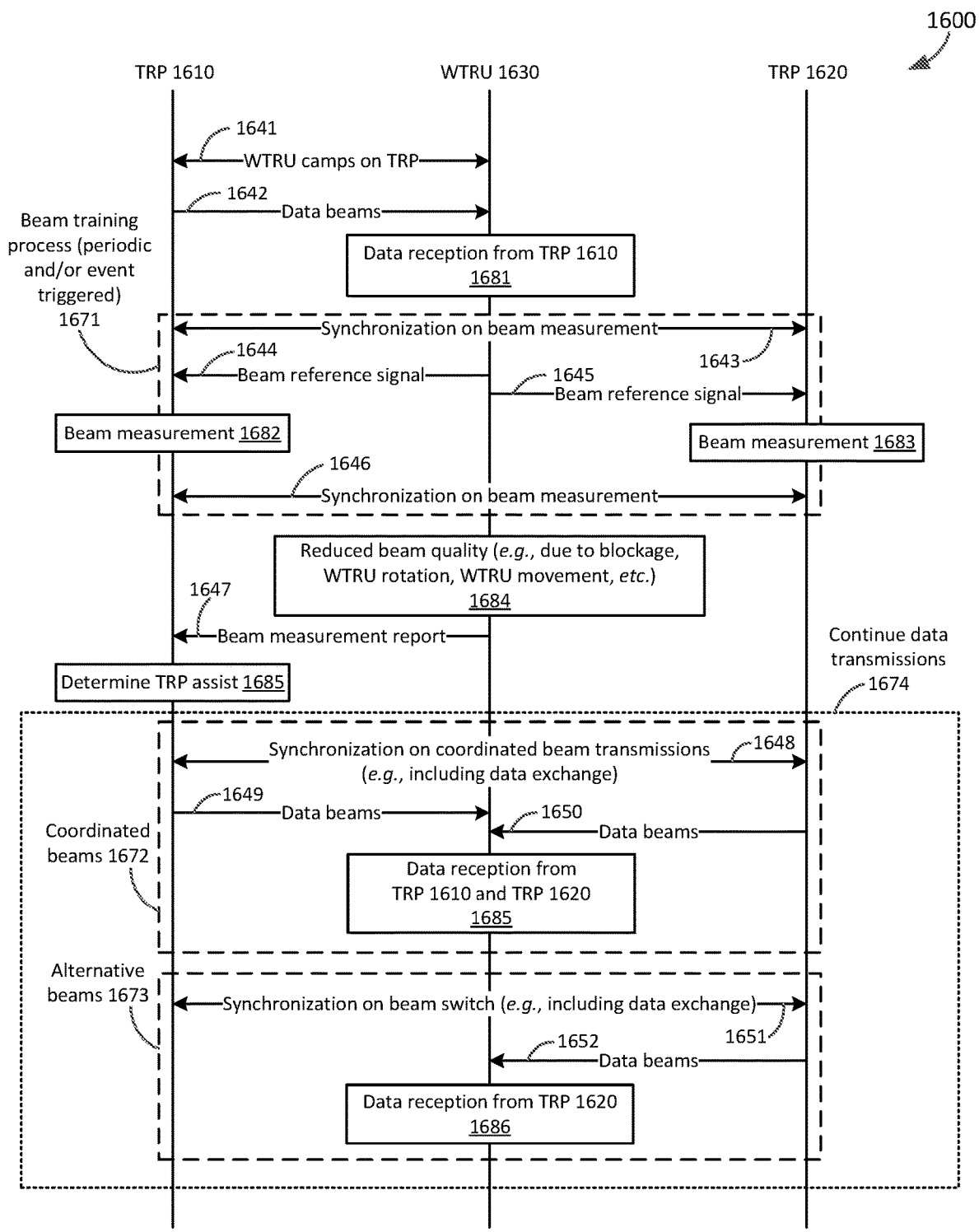
FIG. 16 illustrates an exemplary message flow according to an example.

FIG. 16 illustrates exemplary message flow 1600 that may represent an exchange of one or more messages and/or performance of one or more functions, any of which may be performed in examples implementing beam training processes based on one or both of WTRU measurements and/or TRP measurements.

WTRU 1630 may (e.g., initially) camp on TRP 1610 using, at least in part, message exchange 1641. At message exchange 1642, WTRU 1630 may receive one or more data beams from TRP 1610. Such data beam(s) from TRP 1610 to WTRU 1630 may be one or more narrow beams and/or wide beams. Data reception 1681 may commence and/or occur at WTRU 1630.

Beam training process 1671 may be implemented for a WTRU, such as WTRU 1630. Beam training process 1671 may be triggered and/or initiated, for example, periodically and/or aperiodically (e.g., in response to one or more events).

TRP 1610 may serve as a serving TRP that may instruct TRP 1620 to measure one or more beams from WTRU 1630 to determine, for example, characteristics such as one or more beam types and beam measurement timing. WTRU 1630 may send a beamformed sounding reference signal (SRS) that may be used by one or more TRPs, such as one or both of TRP 1610 and TRP 1620, to perform one or more measurements. TRP 1610 may inform TRP 1620 of SRS details, such as timing, RE mappings, etc. and/or vice versa. Such communication may be implemented, for example, via an X2 or X2-like connection and/or using other means. Such communication may be performed at message exchange 1643.

At beam training process 1671, neighbor TRPs 1610 and 1620 may synchronize on one or more beam measurements using message exchange 1643. As noted, message exchange 1643 may be implemented, for example, via an X2 or X2-like connection and/or using other means. TRPs, such as TRPs 1610 and 1620, may negotiate one or more beam reference signals that may be used, transmission time for such one or more beam reference signals, etc.

At beam training process 1671, TRP 1610 may receive one or more beam reference signals from WTRU 1630 at message exchange 1644, for example, when TRPs 1610 and 1620 may coordinate and/or agree on a format and/or timing of beam reference signals. Similarly, at beam training process 1671, TRP 1620 may receive one or more beam reference signals from WTRU 1630 at message exchange 1645, for example, when TRPs 1610 and 1620 may coordinate and/or agree on a format and/or timing of beam reference signals. Either or both beam references signals provided at message exchange 1644 and 1645 may be provided using one or more SRSs.

At 1682, TRP 1610 may perform beam measurement(s). At 1683, TRP 1620 may perform beam measurement(s). Each such beam measurements may be based on one or more beam reference signals received at each such TRP.

At message exchange 1646, TRP 1610 may report beam measurement results to, for example, TRP 1620. Further at message exchange 1646, TRP 1620 may report beam measurement results to, for example, TRP 1610. Either or both of TRP 1610 and TRP 1620 may report beam measurement results as summarized beam measurement results. TRPs 1610 and 1620 may synchronize on one or more beam measurements using message exchange 1646.

At 1684, a reduction of a quality of beam(s) used between TRP 1610 and WTRU 1630 may occur and may be detected by, for example, WTRU 1630. Such a reduction of beam quality may be due to a change in one or more channel conditions, such as blockage, WTRU rotation, WTRU movement, etc. WTRU 1630 may report such a reduction in beam quality to TRP 1610 (e.g., in a beam measurement report) at message exchange 1647

At 1685, TRP 1610 may analyze one or more previous beam measurement reports that may have been received and/or resulted from beam training process 1671. TRP 1640 may determine, at 1685, whether TRP 1610 may request assistance from a neighbor TRP, such as TRP 1620. TRP 1610 may determine, at 1685, one or more types of help that TRP 1610 may request from a neighbor TRP, such as TRP 1620.

TRP 1610 may determine, at 1685, to make an effort to continue data transmissions to WTRU 1630 via TRP 1610, TRP 1620, or both TRP 1610 and TRP 1620 (e.g., as compared to determining to cease efforts to transmit data to WTRU 1630.) Either or both of exemplary processes 1672 and 1673 may be employed in effort to continue data transmissions 1674. Note that other processes may be also, or instead, be employed in an effort to continue data transmissions to WTRU 1630.

Coordinated beams process 1672 may include functions and messages that may facilitate coordinated transmissions. At message exchange 1648, TRP 1610 may provide to TRP 1620 information associated with coordination based on beam transmissions (e.g., beam direction, beam width) that TRP 1620 may use for such data transmissions. Message exchange 1648 may be used for synchronization of TRP 1610 and TRP 1620 based on such coordinated beam transmissions. Further at message exchange 1648, TRP 1610 may provide data to, or exchange data with, TRP 1620, where such data may be transmitted to WTRU 1630, for example, via X2 or X2-like connections (e.g., via an X2 or X2-like connection that may provide communication between one or more TRPs, gNBs, and/or eNodeBs that may be in common with such X2 or X2-like connections).

At message exchange 1649, TRP 1610 may send data to WTRU 1630. At message exchange 1650, TRP 1620 may send data to WTRU 1630. Transmissions from TRP 1610 and TRP 1620 may be coordinated. WTRU 1630 may receive data transmissions from both TRP 1610 and TRP 1620 at 1685. Symbols transmitted in TRP 1610's beam(s) may be the same (e.g., exactly the same) as symbols transmitted in TRP 1620's beam(s). Symbols transmitted in TRP 1610's beam(s) may be a subset of symbols (e.g., duplicates of some, but not all, symbols) transmitted in TRP 1620's beam(s), or vice versa. For example, TRP 1610 and TRP 1620 may each use distinct (e.g., different) constellation mapping(s) on same input data. Beam transmissions from TRP 1610 and TRP 1620 may be simultaneous (e.g., to enhance reception at WTRU 1630), for example, when TRP 1610 and TRP 1620 may transmit the same (e.g., exactly the same) set of symbols to WTRU 1630. TRP 1610 may transmit one or more beams at a different time than a time at which TRP 1620 may transmit one or more beams. WTRU 1630 may combine data received from TRP 1610 and TRP 1620 at such different times.

Beams process 1673 may include functions and messages that may facilitate alternative beam transmissions. At message exchange 1651, TRP 1610 may provide to TRP 1620 information indicating that TRP 1620 may (e.g., need to) serve WTRU 1630 without assistance from TRP 1610. At message exchange 1651, TRP 1610 may inform TRP 1620 of one or more beam IDs, beam directions, and/or beam widths that TRP 1620 may use to facilitate service to WTRU 1630. At message exchange 1651, TRP 1610 may provide data to, or exchange data with, TRP 1620 (e.g., via X2 or X2-like connections) that may be transmitted to WTRU 1630. At message exchange 1652, TRP 1620 may send data to WTRU 1630. WTRU 1630 may receive data transmissions from TRP 1620 at 1686.

Note that a WTRU, such as WTRU 1620, may execute, initiate, perform, or otherwise participate in a beam training process where any TRP, such as TRP 1620, may serve as a serving TRP.

A decision as to whether to switch a beam direction or a beam width (or both, or neither) may be determined by, for example, a TRP's (e.g., TRP 1610, TRP 1620) internal decision making procedure. Such decision making operations may consider a beam width switch and/or a beam direction switch at a single TRP. Any of the processes and/or functions described herein may be extended to multiple TRP implementations. Note that, while some examples set forth herein describe scenarios that include use of two TRPs, any of the implementations set forth herein may be applied to any scenario that may include more than two TRPs.

Figure 17:
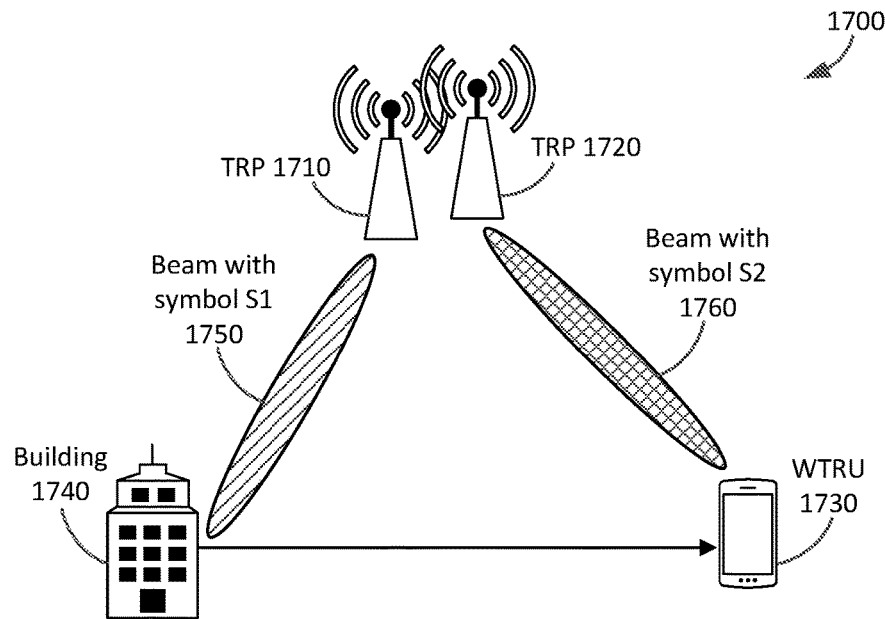
FIG. 17 illustrates a block diagram of an example scenario that may include support for colocated TRPs according to an example.

FIG. 17 illustrates example scenario 1700 that may implement colocated TRPs and MBM and/or DBM transmissions. Scenario 1700 may include TRP 1710 and TRP 1720 that may be colocated. TRP 1710 and TRP 1720 may be synchronized. In such an implementation, multiple TRPs, such as TRPs 1710 and 1720 may be used for coverage of multiple (e.g., distinct) directions. Such multiple TRPs (e.g., based on different RF chains) may apply multi-beam modulation to serve one or more (e.g., a single) WTRU, such as WTRU 1730. For example, TRP 1710 may transmit beam 1750 having symbol S1 in a first direction (e.g., towards building 1740) while TRP 1720 may transmit beam 1760 having symbol $s_2$ in a second direction (e.g., toward WTRU 1730). In the event of a blockage or some other disruption of beam quality of beam 1760, beam 1750 from TRP 1710 may be received by WTRU 1730, for example, upon reflection by building 1740. Multi-TRP beam switch operations, including, but not limited to, operations set forth herein, may be used. Such operations may be implemented with simplifications, such as disregarding synchronization between TRPs due to a colocation of such TRPs.

As set forth herein, multi-beam modulation (MBM) based beam management implementations may use duplicated symbols for the same source information. Such duplicated symbols may be sent through different, separate beams, which may improve robustness of transmission. For example, a WTRU may recover source information from one or more beams to which it is connected when there may be a problem with one or more other beams to which it may have lost connection. Such duplicated symbols may be transmitted through different RF chains for different beams.

Where two or more TRPs may be collocated, such as in the example illustrated in FIG. 17, such TRPs may be synchronized. Such TRPs may be used for coverage of different directions. Such TRPs may apply multi-beam modulation to serve a single WTRU, for example, when they may be based on different RF chains. Multi-TRP beam switch operations, such as those described in regard to FIG. 14 and/or FIG. 15, may be applied, e.g., with one or more simplifications. Such one or more simplifications may include ignoring synchronization between TRPs due to colocation of such TRPs.

MBM and multi-carrier modulation (MCM) may be employed together (including employing DBM and/or DCM together). For example, an MBM scheme, including, but not limited to, any MBM scheme described herein, may be used together with any MCM scheme, including, but not limited to, any MCM scheme described herein. While one or more jointly implemented MBM and/or DBM and MCM and/or DCM schemes may be described herein, it is contemplated that any joint MBM and/or DBM and MCM and/or DCM scheme (e.g., any scheme that may include more than two beams and/or more than two carriers) may be implemented in accordance with the instant disclosure.

Figure 18:
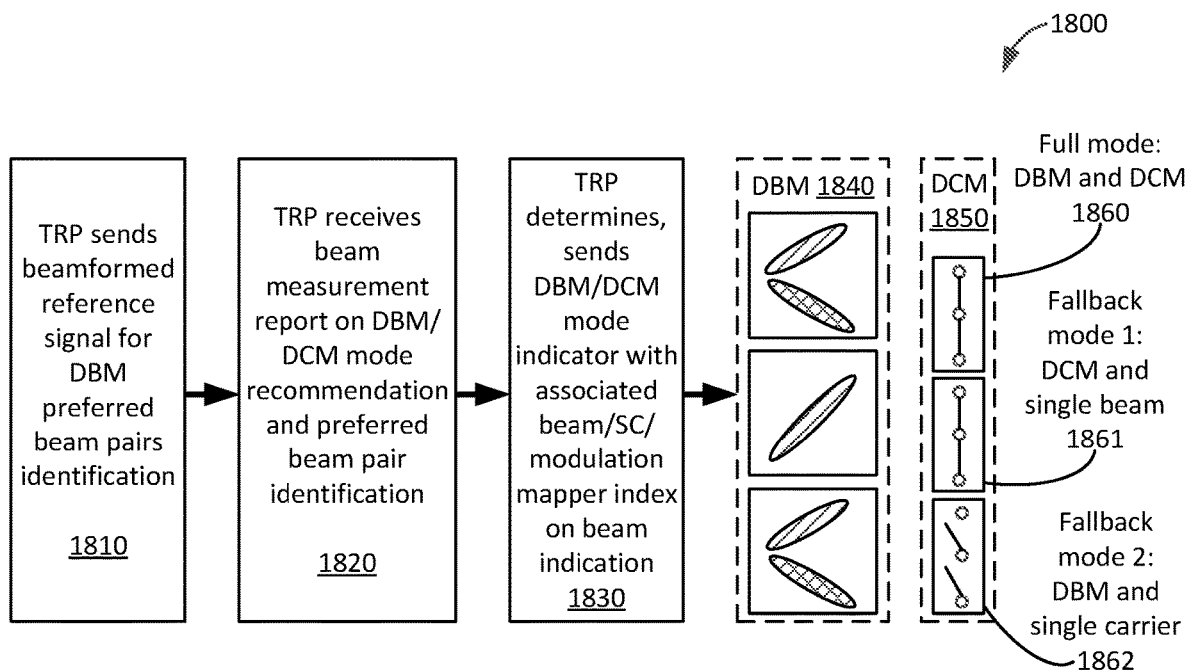
FIG. 18 illustrates an example associated with joint dual-beam modulation (DBM)/dual-carrier modulation (DCM) operations according to an example.

FIG. 18 illustrates a diagram representing example process 1800 that may include MBM and/or DBM and MCM and/or DCM, for example, in a DL. Closed loop operations may be performed in such a process. At block 1810, a TRP may transmit a beamformed reference signal (e.g., a CSI-RS) for MBM and/or DBM and/or MCM and/or DCM beam pair identification (e.g., for preferred beam pair identification and/or optimal beam pair identification). At block 1810, configuration of CSI-RS resource setting, CSI-RS resource set, CSI-RS resource, antenna ports, and/or time-domain behavior may be performed. Exemplary configurations are set forth herein, including in the descriptions of FIGS. 19, 20, and 21.

At block 1810, configuration of one or more measurement settings and/or reporting settings may be performed. Configuration of a report setting may be linked to a resource setting by a measurement setting. A report setting may contain one or more parameters, such as a time domain behavior parameter that may indicate as periodic, semi-persistent, or aperiodic, and a parameter indicating a number of reported beams and associated L1-RSRPs or CQI/CSI.

One reporting setting may be linked with one or more resource settings. Multiple reporting settings may be linked with a same resource setting.

A beam sweep period may have T time units (TUs). Each such TU may correspond to, and/or be associated with, a separate, distinct beam direction.

Multiple beam-resource settings (e.g., a list of beam-resource settings) may be pre-determined and/or pre-defined. A TRP or gNB may configure a beam-resource setting for each T of such TUs from such beam-resource settings and/or a list of such beam-resource settings.

At block 1820, a TRP may receive a beam measurement report that may include information associated with an MBM and/or DBM mode and/or an MCM and/or DCM mode. Such a beam measurement report may include one or more mode recommendations, such as an MBM and/or DBM mode recommendation and/or an MCM and/or DCM mode recommendation. Such a beam measurement report may also, or instead, include identification of one or more beam pairs (e.g., one or more preferred beam pairs and/or one or more optimal beam pairs) for MBM and/or DBM.

At block 1830, a TRP may determine, for example, based on a beam measurement report received at block 1820, an MBM and/or DBM and/or an MCM and/or DCMmode. Such a TRP may transmit an indicator of such an MBM and/or DBM and/or such an MCM and/or DCM mode. Such an MBM and/or DBM and/or such an MCM and/or DCM mode indicator may be transmitted by such a TRP with an associated beam, SC, and/or modulation mapper index, for example, on a beam indication.

At block 1840, MBM and/or DBM may be performed based on the indicator provided at block 1830. Instead, or in addition, at block 1850, MCM and/or DCM may be performed based on the indicator provided at block 1830. At block 1850, full mode MBM and/or DBM and MCM and/or DCM 1860 may be implemented, fallback mode 1 MCM and/or DCM and single beam 1861 may be implemented, and/or fallback mode 2 MBM and/or DBM and single carrier 1862 may be implemented.

A CSI-RS resource setting (e.g., each of one or more CSI-RS resource settings as described herein) may correspond to one or more beam management operations. A CSI-RS resource setting may correspond to, for example, a DL beam management procedure P1, while another CSI-RS resource setting may correspond to, for example, a DL beam management procedure P2, etc. A configuration of one or more CSI-RS resource settings may be communicated via RRC signaling. Such a configuration may include, but is not limited to, one or more of a number of CSI-RS resource settings, one or more of a number of CSI-RS resource sets in one or more of the CSI-RS resource settings (e.g., in each of one or more CSI-RS resource settings), one or more of a number of CSI-RS resources in one or more of the CSI-RS resource sets (e.g., in each of one or more CSI-RS resource sets), one or more CSI-RS resource element mappings and/or an associated number of Tx antenna ports in each of one or more of the CSI-RS resource settings (e.g., in each of the CSI-RS resource settings), and/or time-domain behavior of one or more of the CSI-RS resource settings (e.g., of each of the CSI-RS resource settings). Multiple (e.g., two) Tx antenna ports may be supported. Such ports in a CSI-RS resource may be QCL-ed with each other. In this case, different ports within a CSI-RS resource may not be distinguished. A selection of CSI-RS resources, CSI-RS resource sets, CSI-RS reporting settings, and/or CSI-RS resource settings may be dynamically signaled by L1 and/or L2 signaling, for example, via DCI and/or MAC cyclic extension (CE).

A beam sweep period may have one or more T time units (TUs). One TU may correspond to a single beam direction. For one TU, a TRP may select a CSI-RS resource.

One or more resource elements may be allocated to one or more corresponding CSI-RS reference signals. For example, resource elements may be allocated to some or all CSI-RS reference signals over one or more antenna ports (e.g., some or all antenna ports). Such resource elements may form a resource element pool.

Figure 19:
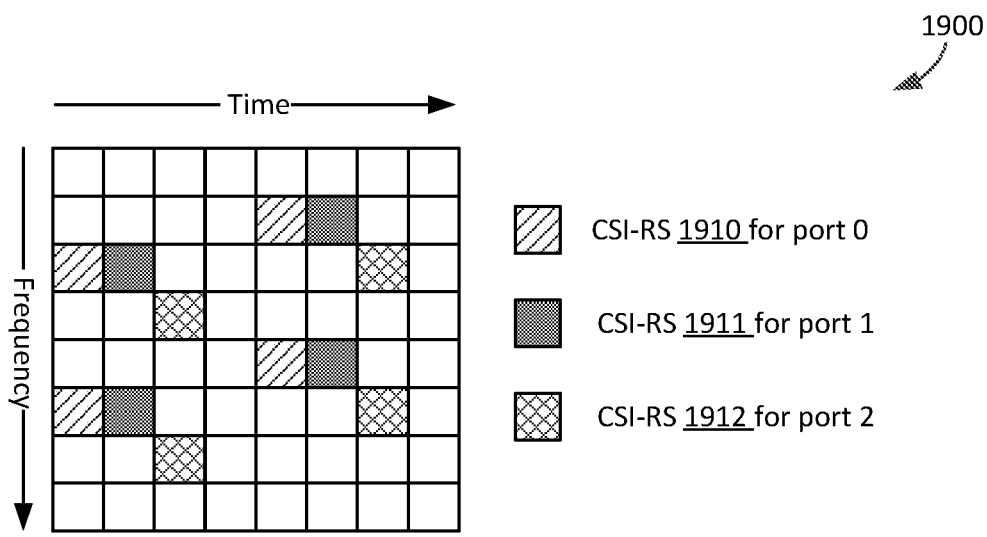
FIG. 19 illustrates an exemplary resource element allocation according to an example.

FIG. 19 illustrates graphical representation 1900 of an exemplary CSI-RS resource element allocation pool. As shown in FIG. 19, CSI-RS 1910 may be allocated to port 0, CSI-RS 1911 may be allocated to port 1, and/or CSI-RS 1912 may be allocated to port 2. Such resource element allocation may be, but need not be, based on an LTE system.

A CSI-RS resource may be formed by selecting a subset of CSI-RS resource elements from a resource element pool. An antenna port associated with one or more CSI-RS resource elements (e.g., associated with each CSI-RS resource element) may be recorded in a CSI-RS resource. Time-domain behaviors (e.g., periodic, semi-persistent, and/or aperiodic transmission) and/or frequency granularity information may also, or instead, be included in a CSI-RS resource.

Figure 20:
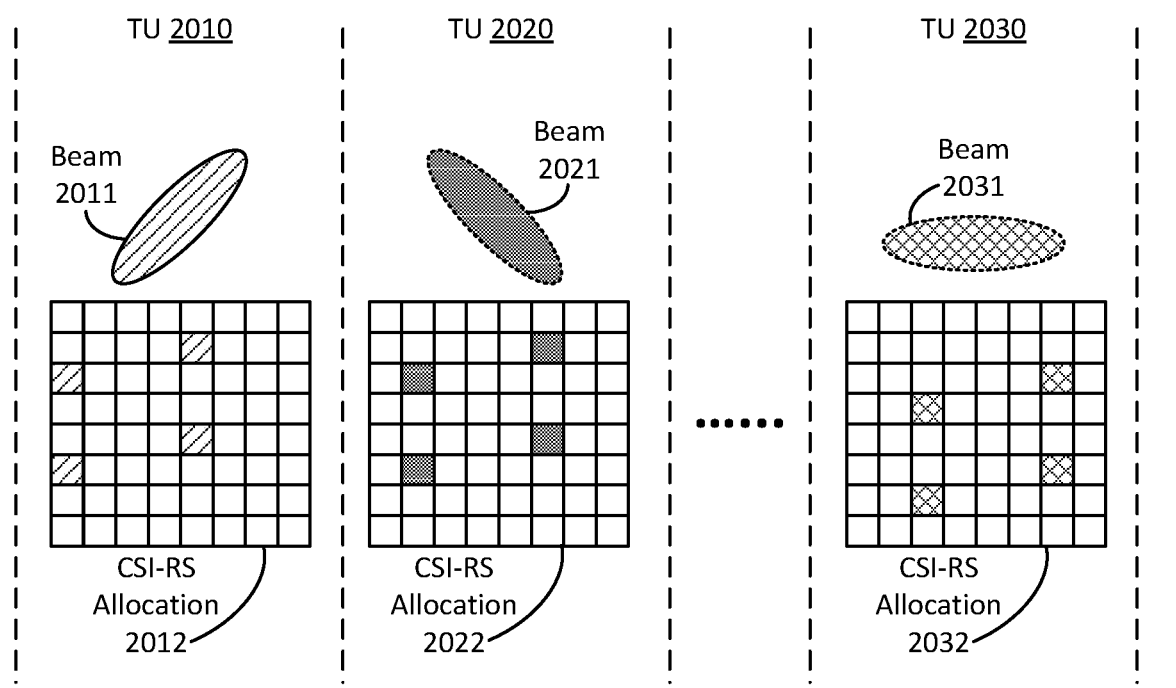
FIG. 20 illustrates exemplary beamformed CSI-RS transmissions that may be associated with one or more time units (TUs) according to an example.

FIG. 20 illustrates graphical representation 2000 of exemplary CSI-RS beamformed transmissions in and/or associated with a time unit (TU) that may utilize a CSI-RS resource element allocation pool. At TU 2010, CSI-RS allocation 2012 may be used to allocate resource elements to beam 2011 for transmission of beam 2011 as shown in FIG. 20. At TU 2020, CSI-RS allocation 2022 may be used to allocate resource elements for transmission of beam 2021 as shown in FIG. 20. At TU 2030, CSI-RS allocation 2032 may be used to allocate resource elements for transmission of beam 2031 as shown in FIG. 20. Note that TU 2030 may be any TU subsequent to TU 2020, and any other TUs that may occur between TU 2020 and TU 2030, and any other TUs that may occur before, between, and/or after the illustrated TUs are contemplated.

Figure 21:
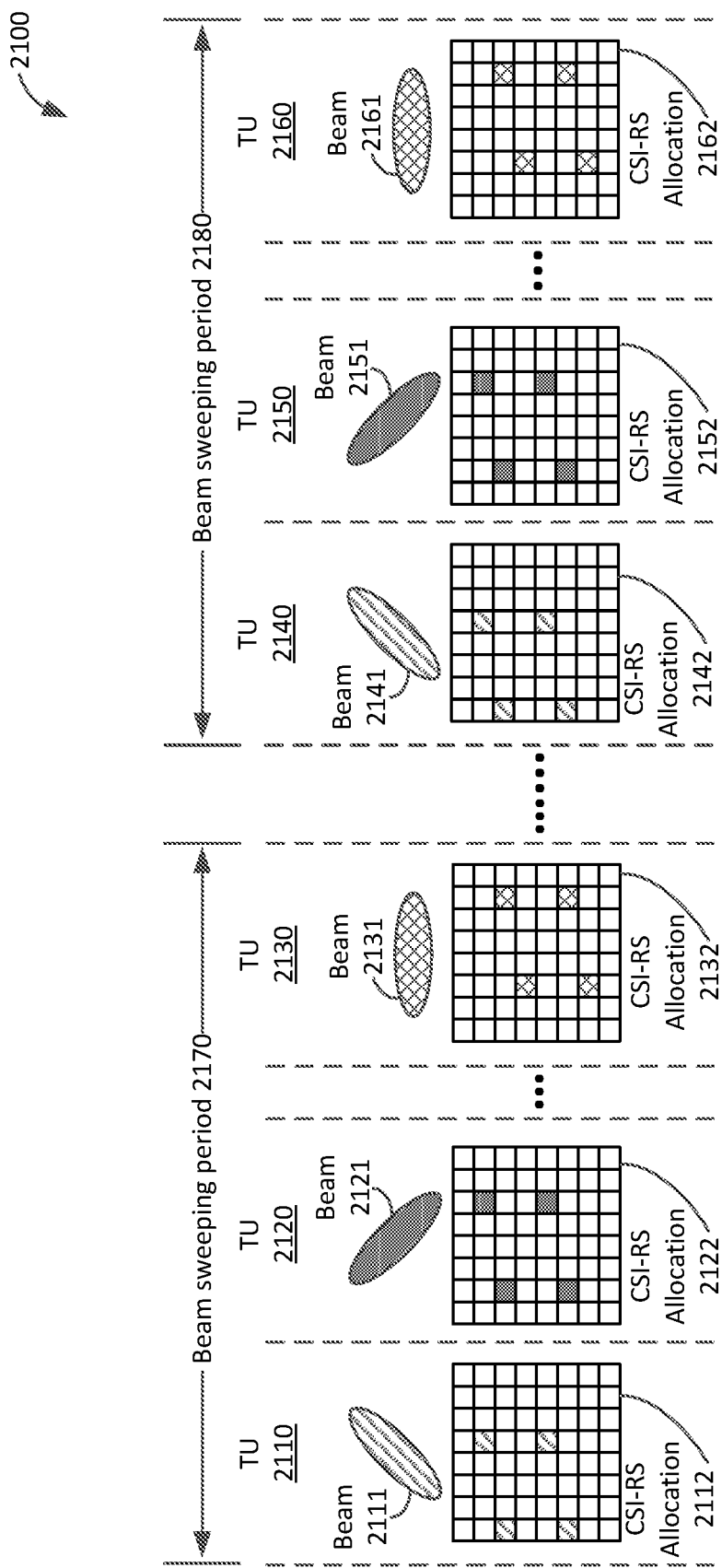
FIG. 21 illustrates exemplary periodic beamformed CSI-RS transmissions that may be associated with one or more TUs according to an example.

FIG. 21 illustrates graphical representation 2100 of exemplary periodic CSI-RS beamformed transmissions in and/or associated with a time unit (TU) that may utilize a CSI-RS resource element allocation pool. During beam sweeping period 2170, at TU 2110, CSI-RS allocation 2112 may be used to allocate resource elements for transmission of beam 2111 as shown in FIG. 21. During beam sweeping period 2170, at TU 2120, CSI-RS allocation 2122 may be used to allocate resource elements for transmission of beam 2121 as shown in FIG. 21. During beam sweeping period 2170, at TU 2130, CSI-RS allocation 2132 may be used to allocate resource elements to beam 2131 for transmission of beam 2131 as shown in FIG. 21. Note that TU 2130 may be any TU subsequent to TU 2120, and any other TUs that may occur between TU 2120 and TU 2130, and any other TUs that may occur before, between, and/or after the illustrated TUs are contemplated.

At a another beam sweeping period that may occur periodically, such as beam sweeping period 2180, at TU 2140, CSI-RS allocation 2142 may be used to allocate resource elements to beam 2141 for transmission of beam 2141 as shown in FIG. 21. During beam sweeping period 2180, at TU 2150, CSI-RS allocation 2152 may be used to allocate resource elements for transmission of beam 2151 as shown in FIG. 21. During beam sweeping period 2180, at TU 2160, CSI-RS allocation 2162 may be used to allocate resource elements for transmission of beam 2161 as shown in FIG. 21. Note that TU 2160 may be any TU subsequent to TU 2150, and any other TUs that may occur between TU 2150 and TU 2160, and any other TUs that may occur before, between, and/or after the illustrated TUs are contemplated.

Semi-persistent and/or aperiodic CSI-RS transmissions may be used for beam measurement. A resource setting (e.g., a resource setting that may correspond to a beam management procedure that may be referred to herein as beam management procedure P1) may be periodic. Another resource setting (e.g., a resource setting that may correspond to a beam management procedure that may be referred to herein as beam management procedure P2) may be semi-persistent. Yet another resource setting (e.g., a resource setting that may correspond to a beam management procedure that may be referred to herein as beam management procedure P3) may be aperiodic.

For aperiodic CSI-RS for beam management, a TRP or gNB may provide a beam procedure information element for each CSI-RS resource of a CSI-RS resource set. Two CSI-RS resources may have the same beam procedure information element contents. A WTRU may assume that a TRP or gNB uses the same Tx beam and the WTRU may sweep its Rx beams.

A resource set (e.g., a CSI-RS resource set) may correspond to, or may otherwise be associated with, a single Tx beam. A Tx beam ID associated with such a Tx beam may be indicated by such a resource set. For example, a beam management procedure (e.g., an aperiodic beam management procedure that may be referred to herein as beam management procedure P3) may correspond to a CSI-RS resource setting. Such a CSI-RS resource setting may include one or more CSI-RS resource sets. One or more of such CSI-RS resource sets may include a single CSI-RS resource, for example, when a single Tx beam may be sent at a particular time. A CSI-RS resource set index (e.g., that may be within a particular CSI-RS resource setting) may be used to indicate such a single Tx beam.

A Tx beam may be indicated by a CSI-RS resource that may be in a resource set. A CSI-RS resource set index and/or a CSI-RS resource index within a CSI-RS resource set may (e.g., both) be used to indicate such a Tx beam.

A CSI-RS resource set may contain more than one CSI-RS resource, where such CSI-RS resources may be FDM-ed and/or TDM-ed. Such a CSI-RS resource set may correspond to multiple beams that may be contained in one or more TUs. Multiple CSI-RS resource sets may be configured within a CSI-RS resource setting corresponding to a beam management procedure. Each resource set within a resource setting may be configured such that a WTRU may know whether or not to feedback CRI and/or may know a range of CRI feedback. For example, for time domain repetition configured for P1 or joint P2 and P3 procedures, multiple resource sets of CSI-RS may be configured in a resource setting. A WTRU may report CSI-RS resource set indicators for CRI feedback via either local set ID within the resource setting or global set ID across all resource settings. For a P2 procedure, one resource set may be configured in a resource setting without repetition and a WTRU may report a local CSI-RS resource indicator with this resource set for CRI feedback. For a P3 procedure, one resource set may be configured in a resource setting with repetition and a WTRU may not report CRI feedback.

Selection of a method and/or process for presenting one or more Tx beams (e.g., such as any of the methods and/or processes set forth herein) may be determined (e.g., selected) based on characteristics of one or more CSI-RS resource settings. Such a determination may be agreed (e.g., implicitly agreed) upon by a TRP and a WTRU that may be involved. Such a determination may be specified in an RRC message (e.g., an RRC message that may configure one or more CSI-RS resource settings).

Configuration of one or more CSI-RS resource settings may be included in an RRC connection setup, in an RRC connection reconfiguration, in an RRC connection reestablishment message, and/or the like. The following items may be added to an RRCConnectionReconfiguration IE.

```
RRCConnectionReconfiguration ::= SEQUENCE {
    ......
    bmresourcesettingnumber     INTEGER (1..4)
    bmreportingsettingnumber     INTEGER (1..4)
    bmmeasurementlinknumber    INTEGER (1..4)
    ......
}
```

A WTRU may measure a beamformed CSI-RS. For example, in block 1820 of FIG. 18, a TRP may receive a measurement report reflecting a WTRU measurement of a beamformed CSI-RS. Such a measurement may be an AOA, a zenith angle of Arrival (ZOA), an L1-RSRP, and/or any other measurement, such as a SNR, CQI, or CSI, for example. Based on such a measurement, a WTRU may determine whether to apply an MBM and/or DBM and/or an MCM and/or DCM mode. For example, when each of, e.g., two beams, may have a strong signal, such a WTRU may include use of an MBM and/or DBM mode in such a determination. Use of an MBM and/or DBM mode may indicate that one or more dual and/or mulitple modulation mappers may be used on such beams.

Where a WTRU may determine that one beam has a relatively strong signal, the WTRU may include use of a single beam mode in such a determination.

Where a WTRU may determine that, e.g., two sub-carriers may have uncorrelated channel conditions, the WTRU may include use of an MCM and/or DCM mode in such a determination. Use of an MCM and/or DCM mode may indicate that a dual carrier modulation scheme may be used on such sub-carriers.

If none of the criteria above apply, and/or any criteria set forth herein apply, the WTRU may perform single carrier operations (e.g., using legacy methods).

Table 2 shows four example DBM/DCM modes. DBM/DCM modes may be signaled via an L1 control signaling message, such as DCI and/or UCI. Note that any or all such modes shown in Table 2 may also be used in MBM/MCM, MBM/DCM, and/or DBM/MCM implementations, and any such implementations are contemplated herein.

In a full DBM/DCM mode, same information may transmitted on distinct, separate symbols. Such symbols may be carried in distinct, separate sub-carriers of multiple beams.

In a first fallback DBM/DCM mode (may be referred to as fallback DBM/DCM mode 1 and/or as DCM and single beam mode), same information may transmitted on distinct, separate symbols where such symbols may be carried in distinct, separate sub-carriers of a same beam.

In a second fallback DBM/DCM mode (may be referred to as fallback DBM/DCM mode 2 and/or as DBM and single carrier mode), same information may be transmitted on distinct, separate symbols where such symbols may be carried on a same subcarrier of multiple beams.

In a third fallback DBM/DCM mode (may be referred to as fallback DBM/DCM mode 3) information may be transmitted on a symbol carried by a single sub-carrier of a single beam.

TABLE 2

Example DBM/DCM mode definitions

| DBM/DCM mode ID | DBM/DCM name | Beam Number | Modulation mapper number | Sub-carrier number |
|---|---|---|---|---|
| 1 | Full DBM/DCM mode | Multiple | Multiple | Multiple |
| 2 | Fallback DBM/DCM mode 1 | Single | Multiple | Multiple |
| 3 | Fallback DBM/DCM mode 2 | Multiple | Multiple | Single |
| 4 | Fallback DBM/DCM mode 3 | Single | Single | Single |

A WTRU may send a recommendation of a DBM/DCM mode, an MBM/MCM mode, or any combination mode, to a TRP, for example, in a beam reporting message. Such a beam reporting message may include a list of one or more beam IDs and/or information associated with such one or more beam IDs. Such information that may be associated with one or more beam IDs may include L1-RSRP and/or L1-SNR, angle information (e.g., AOA and/or ZOA), and/or CSI-RS resource information. CSI-RS resource information may include a resource set index, a resource element index within a resource set, and/or a transmit antenna port number. An example of a beam report message is shown in Table 3.

TABLE 3

Example beam reporting message

| Beam ID | AOA (degree) | ZOA (degree) | L1-RSRP (dBm) | CSI-RS resource information | DBM/DCM mode recommendation |
|---|---|---|---|---|---|
| 1 | 90 | 30 | −60 | Associated CSI-RS information | Full DBM/DCM mode |
| 2 | 68 | 45 | −85 | Associated CSI-RS information | |

A TRP may receive beam reporting (e.g., that may include beam information and/or one or more MBM/MCM, DBM/DCM, MBM/DCM, and/or DBM/MCM mode recommendations) from a WTRU (e.g., such as operation 1820 of FIG. 18). Such a TRP may determine an MBM/MCM, DBM/DCM, MBM/DCM, and/or DBM/MCM mode to employ based on such beam reporting (e.g., such as operation 1830 of FIG. 18). The TRP may also, or instead, determine one or more parameter selections for one or more MBM/MCM, DBM/DCM, MBM/DCM, and/or DBM/MCM modes (e.g., an MBM/MCM, DBM/DCM, MBM/DCM, and/or DBM/MCM mode that may be determined based on beam reporting).

When implementing a mode, such as full DBM/DCM mode and/or fallback DBM/DCM mode 2 (and/or full MBM/MCM mode, full DBM/MCM mode, full MBM/DCM mode, fallback MBM/MCM mode 2, fallback MBM/DCM mode 2, and/or fallback DBM/MCM mode 2) as described herein, a TRP may determine one or more modulation mappers that may be used for separate, distinct beams.

Figure 22:
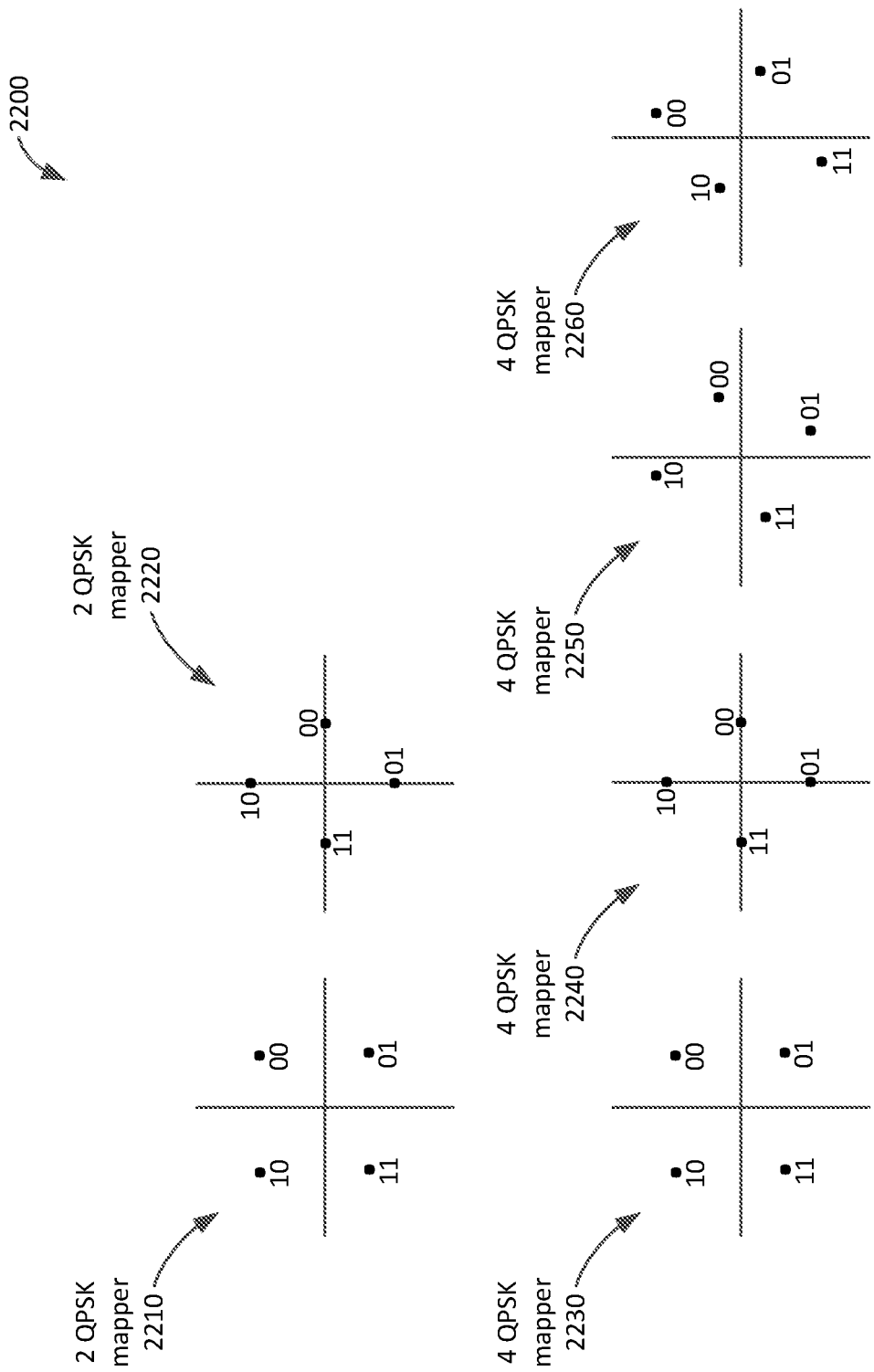
FIG. 22 illustrates exemplary QPSK mappers according to an example.

FIG. 22 illustrates exemplary quadrature phase shift keying (QPSK) mappers 2200. Mappers, QPSK or otherwise, may be phase-shifted relative to other mappers. Two (2) QPSK mappers may be used, such as 2 QPSK mapper 2210 and/or 2 QPSK mapper 2220 shown in FIG. 22. Such 2 QPSK mappers may be indexed by one (1) and/or by two (2).

Four (4) QPSK mappers may also, or instead, be used, such as 4 QPSK mapper 2230, 4 QPSK mapper 2240, 4 QPSK 2250, and/or 4 QPSK mapper 2260 shown in FIG. 22. Such 4 QPSK mappers may be indexed by 1, 2, 3, and/or 4.

Mappers may be phase-shifted versions of each other (e.g., of one or more other mappers). Mappers may be pre-defined and/or pre-specified. A TRP may pick one mapper for each beam. Modulations for separate, distinct beams may have a same modulation order. Mapper indices and/or mapper shift sizes (e.g., from a base mapper) may be signaled.

Modulations for separate, distinct beams may have different modulation orders. A TRP may determine and/or select a 16QAM modulation mapper for a first beam (may be referred to as beam 1) and a QPSK modulation mapper for a second beam (may be referred to as beam 2). One or more 16QAM modulated symbols (e.g., each 16QAM modulated symbol) may carry four (4) bits of information. One or more QPSK modulated symbols (e.g., each QPSK modulated symbol) may carry two (2) bits of information. The two bits of information carried by a QPSK modulated symbol may be a subset of four bit information that may be carried in a 16QAM symbol. In such an example, a second beam (e.g., beam 2) may serve as an additional beam to assist with the information delivery of a first beam (e.g., beam 1). Demodulated symbols may be combined at a receiver.

A TRP may determine one or more sub-carrier mappers that may be used for each beam, such as when full DBM/DCM mode and/or fallback DBM/DCM mode 1 (and/or full MBM/MCM mode, full DBM/MCM mode, full MBM/DCM mode, fallback MBM/MCM mode 1, fallback MBM/DCM mode 1, and/or fallback DBM/MCM mode 1) may be in use. Such a determination may be based on a beam reporting message received from a WTRU. Such a beam reporting message may include measurement information that may be based on one or more CSI-RSs of one or more sub-carriers.

Figure 23:
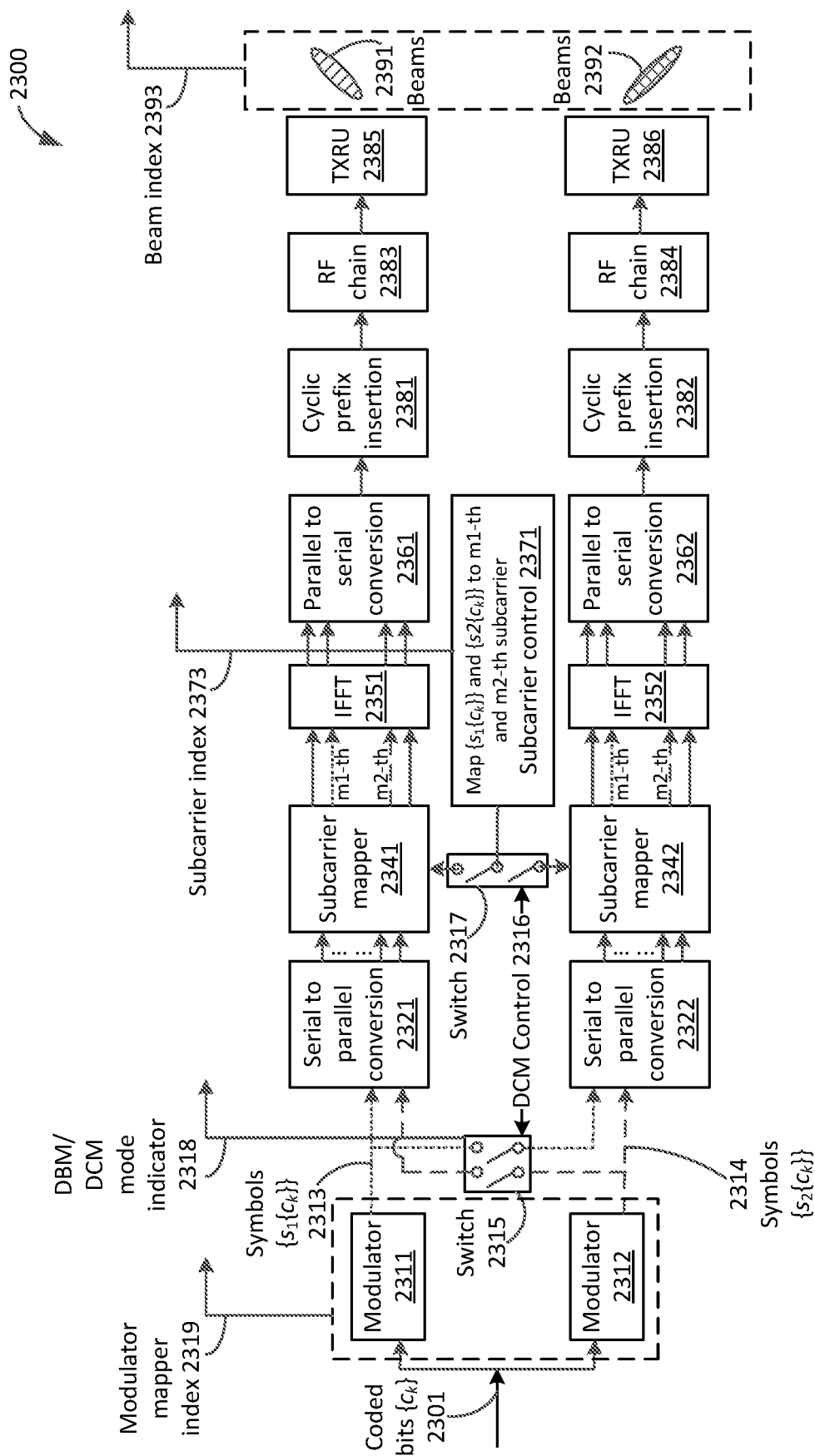
FIG. 23 illustrates an exemplary system that may employ DBM/DCM modulation based beam management according to an example.

FIG. 23 illustrates exemplary system 2300 that may employ beam management, for example, in a system employing OFDM, based on a joint DBM/DCM, MBM/MCM, MBM/DCM, and/or DBM/MCM mode scheme. A stream of information bits may be encoded by a channel code encoder and may output a coded bit stream having coded bits $\{c_k\}$ 2301. Coded bits $\{c_k\}$ 2301 may be provided to modulators 2311 and 2312. Modulators 2311 and 2312 may generate modulated serial symbol stream $\{s_1\{c_k\}\}$ 2313 and modulated serial symbol stream $\{s_2\{c_k\}\}$ 2314, respectively. Modulator mapper index 2319 may be provided by, or determined from, one or both of modulators 2311 and 2312. Modulator mapper index 2319 may be used as set forth herein, such as for configuration of one or more of a MBM/MCM, DBM/DCM, MBM/DCM, and/or DBM/MCM configuration, and may also, or instead, be signaled to a WTRU (e.g., in a beam indication message sent from a TRP to a WTRU).

Switches that may be used for DCM control may be communicatively connected. For example, switch 2315 may be communicatively connected to switch 2317 via DCM control 2316. DBM/DCM mode indicator 2318 (which may also, or instead, serve as an MBM/MCM, MBM/DCM, and/or DBM/MCM mode indicator) may indicate a DBM/DCM mode (and/or an MBM/MCM, MBM/DCM, and/or DBM/MCM mode) that may be used by, or associated with, switch 2315 and/or switch 2317. DBM/DCM mode indicator 2318 may be provided by, or determined from, switch 2315, switch 2317, and or DCM control 2316. DBM/DCM mode indicator 2318 may be used, for example, to facilitate demodulation (e.g., by a WTRU).

Serial symbol stream $\{s_1\{c_k\}\}$ 2313 may include a modulated symbol S1. Streams carrying symbol S1 may be shown by small dashed lines in FIG. 23. Serial symbol stream $\{s_1\{c_k\}\}$ 2313 may be transformed into parallel symbol streams of $\{s_1\{c_k\}\}$ at serial to parallel conversion component or function 2321. For example, for stream 2313, a value of $N_{FFT}$ (e.g., where $N_{FFT}$ may be an IFFT size) serial symbols may be transformed (e.g., at conversion component or function 2321) into parallel symbol streams.

Serial symbol stream $\{s_2\{c_k\}\}$ 2314 may include a modulated symbol $s_2$. Streams carrying symbol S2 may be shown by large dashed lines in FIG. 23. Serial symbol stream $\{s_2\{c_k\}\}$ 2314 may be transformed into parallel symbol streams of $\{s_2\{c_k\}\}$ at serial to parallel conversion component or function 2322. For example, for stream 2314, a value of $N_{FFT}$ (e.g., where $N_{FFT}$ may be an IFFT size) serial symbols may be transformed (e.g., at conversion component or function 2322) into parallel symbol streams.

Parallel symbols, such as those generated by components or functions 2321 and 2322, may each have a same or a different subcarrier mapping at their respective subcarrier mappers, such as subcarrier mapper 2341 and subcarrier mapper 2342, respectively. Subcarrier mapper 2341 may map symbol S1 to a m1-th subcarrier (indicated by the small dashed lines in FIG. 23) and symbol S2 to a m2-th subcarrier (indicated by the small dashed lines in FIG. 23). Subcarrier mapper 2342 may map symbol S1 to a m1-th subcarrier (indicated by the small dashed lines in FIG. 23) and symbol S2 to a m2-th subcarrier (indicated by the small dashed lines in FIG. 23). Control information that may instruct subcarrier mappers 2321 and 2322 may be provided by, or determined from, subcarrier control 2317, for example, via switch 2317. Subcarrier index information 2373 may be provided by, or determined from, subcarrier control 2317. Subcarrier index information 2373 may be used, for example, to facilitate demodulation (e.g., by a WTRU).

Parallel symbol streams that may include symbols S1 and S2, carried by an m1-th subcarrier and an m2-th subcarrier, respectively, may be provided to IFFT components and/or operators 2351 and 2352, respectively. Resulting IFFT transformed parallel symbol may be transformed to serial symbol streams by parallel to serial conversion component 2361 and/or serial conversion component 2362.

Resulting serial symbol streams may each have a cyclic prefix inserted by cyclic prefix insertion component 2381 and/or cyclic prefix insertion component 2382. Cyclic prefix insertion component 2381 and cyclic prefix insertion component 2382 may generate serial symbol streams with CP and provide such streams to RF chain component 2383 and RF chain component 2384, respectively. Each of RF chain component 2383 and RF chain component 2384 may be associated with different RF chains. Output of RF chain component 2383 and RF chain component 2374 may be provided to transmit components or functions 2385 and 2386, respectively, for transmission by distinct beams, such as beams 2391 and 2392, respectively. Beam index 2393 associated with such beams may be provided by, or determined from, beams 2391 and/or 2392.

A TRP may inform a WTRU of an MBM/MCM, DBM/DCM, MBM/DCM, and/or DBM/MCM mode decision, a detailed modulation mapper index (e.g., where an MBM and/or DBMmode may be determined), a sub-carrier index (e.g., where an MCM and/or DCM mode may be determined), and/or one or more associated beam indices. Such information may be sent as a beam indication message from the TRP to the WTRU.

Table 4 illustrates an example of contents of a beam indication message. In this example, full DBM/DCM mode (or any of full MBM/MCM mode, full DBM/MCM mode, and/or full MBM/DCM mode) may be applied and beams that may be used may be Tx beam 1 and Tx beam 4. Modulation mappers that may be used in such an example may be QPSK mapper 1 and QPSK mapper 3. For beam 1, sub-carriers m1 and m2 may be used for MCM and/or DCM. For beam 2, sub-carriers m3 and m4 may be used for MCM and/or DCM, etc.

TABLE 4

Example beam indication message content

| DBM/DCM mode | Beam index | Modulation mapper index | Sub-carrier index |
|---|---|---|---|
| Full mode | Beam 1 | QPSK mapper 1 | (m1, m2) |
|  | Beam 4 | QPSK mapper 3 | (m3, m4) |

A beam indication may be included in DCI. A number of bits used for such a beam indication in DCI may be reduced (e.g., to a number of bits less than a threshold value). Such a reduced number of bits used for a beam indication may, for example, lower signal overhead.

When a multiple beam modulation mode may be in use, such as when a full DBM/DCM mode (or any of full MBM/MCM mode, full DBM/MCM mode, and/or full MBM/DCM mode) and/or a fallback DBM/DCM mode 2 (or any of fallback MBM/MCM mode 2, fallback DBM/MCM mode 2, and/or fallback MBM/DCM mode 2) may be in use, two or more beams that may be in use may be spatially separated (e.g., largely spatially separated). When two or more beams may be received from separate, distinct TRPs, such two or more beams may be separated by spatial (e.g., large spatial) spaces. DCI signaling may be reduced by indicating a subset (e.g., one or more and/or one or more parts) of beams used, for example, as opposed to indicating both (or all) of the used beams explicitly. Indicating a subset (e.g., one or more and/or one or more parts) of beams used may be used where one or more beams may have a spatial offset (e.g., a fixed spatial offset) with respect to an explicitly signaled beam. Also, or instead, indicating a subset (e.g., one or more and/or one or more parts) of beams used may be used where one or more beams may have a spatial correlation (e.g., a fixed spatial correlation).

An indication message may indicate a spatial quasi-colocation (QCL) assumption between DL RS antenna port(s) and DMRS antenna port(s) of a DL data channel. A beam index, such as the example beam index shown in Table 4, may be based on CSI-RS port(s) that may have been used for a previous measurement. Such a beam index may be referred to as a tag-based beam index.

A beam index may also be based on a beam pair link (BPL). A BPL-based beam index may be based on an association of a beam index with a previously established one or more beam pair links. A beam pair link may include a Tx beam configuration and/or an Rx beam configuration. A WTRU may acquire Rx beam information based on a BPL (e.g., by checking a BPL). An implicit beam indication may be provided as shown in Table 5 below. A number of BPLs may be less than a number of Tx beams that may be used for DL transmission (e.g., as indicated by a number of CSI-RS resources).

TABLE 5

Example beam indication contents with implicit indication

| DBM/DCM mode | BPL index | Modulation mapper index | Sub-carrier index |
|---|---|---|---|
| Full mode | 1 | QPSK mapper 1 | (m1, m2) |
|  | 3 | QPSK mapper 3 | (m3, m4) |

Beam indication contents may include a parameter that may indicate a duration of a setting (e.g., a CSI-RS resource setting). An indication provided by such a parameter may be assumed (e.g., assumed only) for a scheduled NR-PDSCH channel. An indication provided by such a parameter may be valid until a next beam indication message. Table 6 shows example beam indication contents that may include an implicit indication and/or duration information. A duration index of 0 may imply that an indication may be valid (e.g., valid only) for a currently scheduled NR-PDSCH channel. A duration index of 1 may imply that an indication may be valid until a next beam indication message.

TABLE 6

Example beam indication contents with implicit indication and duration information

| DBM/DCM mode | Duration index (1 or 0) | BPL index | Modulation mapper index | Sub-carrier index |
|---|---|---|---|---|
| Full mode | 0 | 1 | QPSK mapper 1 | (m1, m2) |
|  |  | 3 | QPSK mapper 3 | (m3, m4) |

Beam indication contents may include a parameter that may indicate a starting time of a transmission that may be associated with indicated beam information. Such a starting time may be a same sub-frame, slot, and/or mini-slot as the sub-frame, slot, and/or mini-slot in which the beam indication may be transmitted. Such a starting time may be a later sub-frame, slot, and/or mini-slot than the sub-frame, slot, and/or mini-slot in which the beam indication may be transmitted.

A starting time may be represented by an offset value X, where $X \in \{0, X_{max}\}$. An offset value may indicate that a starting time of a Tx beam may be X sub-frames or slots after the sub-frame or slot in which the beam indication may be transmitted. For example, X=0 may indicate that a Tx beam may start at a current sub-frame. In such an example, a control channel may be decoded successfully before a data channel may be received in a same sub-frame.

A selection of X=0 may be based on a WTRU's capabilities, such as the WTRU's beam switching speed and/or other factors. When a maximum value of X, $X_{max}$, may be set to 1, a single bit may be used to indicate whether an effective time of a Tx beam may be in a current sub-frame or in a later sub-frame. Table 7 shows an example beam indication that may indicate a starting time of a Tx beam. As shown in Table 7, a Tx beam may start at a same sub-frame as a sub-frame that may include a beam indication.

TABLE 7

Example beam indication contents with implicit indication, duration information, and starting time information

| DBM/DCM mode | Starting time index $\{0, X_{max}\}$ | Duration index | BPL index | Modulation mapper index | Sub-carrier index |
|---|---|---|---|---|---|
| Full mode | 0 | 0 | 1 | QPSK mapper 1 | (m1, m2) |
|  |  |  | 3 | QPSK mapper 3 | (m3, m4) |

Beam indication contents may include one or more other parameters. For example, a TRP may learn or otherwise determine, based on one or more beam report messages, that there may not be a "good" beam for a WTRU (e.g., a beam that may not be acceptable and/or a beam that may not have one or more quality values that may satisfy one or more thresholds). Such a TRP may fall back to legacy (e.g., LTE like) PDSCH transmissions. An indication of such a determination may be included in a beam indication message. For example, a bit '0' in a beam indication message may indicate that a TRP may continue to perform multi-beam operations, while a bit '1' may indicate that a TRP may fall back to legacy PDSCH transmissions.

A joint DBM/MCM implementation may be used by a single TRP. A TRP may perform multi-beam operations with different modulation mappers and sub-carriers for different beams.

Such a joint DBM/MCM implementation may be applied to multiple TRPs, for example, as described herein. Two or more TRPs may synchronize on CSI-RS resources that may be used so that a WTRU may perform one or more measurements. Such TRPs may synchronize on a beam reporting message from the WTRU. Such TRPs may share beam indication information that may include a modulation mapper and/or a sub-carrier to use for multiple MBM/MCM, DBM/DCM, MBM/DCM, and/or DBM/MCM transmissions. Such TRPs may cooperate on a data processing chain, where one or more of such TRPs (e.g., each one of such TRPs) may focus on one or more transmissions using a single beam. In an example, such TRPs may have an ideal backhaul link.

A joint MBM/MCM implementation may be implemented for uplink transmission. A TRP may control a joint MBM/implementation. Where a joint dual-beam modulation (DBM) and a dual-carrier modulation (DCM) implementation may be employed, a WTRU may send a beamformed reference signal (e.g., an SRS) to a TRP. Such a TRP may measure the received beamformed reference signal (e.g., a received SRS). Based on such a measurement, the TRP may determine whether to use a DBM/DCM mode. The TRP may inform the WTRU of the DBM/DCM mode determination. The TRP may also, or instead, inform the WTRU of a detailed modulation mapper index (e.g., in DBM implementations), a sub-carrier index (e.g., in DCM implementations), and/or one or more associated beam indices. Such information may be sent as a beam indication message from the TRP to the WTRU. The WTRU, e.g., upon receiving the beam indication message, may apply a corresponding method and/or process for UL data transmissions.

A joint MBM/MCM implementation may be controlled by a WTRU. A WTRU may send an uplink beam reference signal, such as an SRS, that may facilitate one or more TRP measurements. An associated TRP may measure such an uplink beam reference signal, such as an SRS. One or more measurements may be AOA, ZOA, L1-RSRP, and/or any other measurement, such as SNR. Based on an associated one or more measurements, the TRP may determine whether to use an MBM/MCM, DBM/DCM, MBM/DCM, and/or DBM/MCM mode. Such a TRP may send an MBM/MCM, DBM/DCM, MBM/DCM, and/or DBM/MCM mode recommendation to the WTRU, e.g., in a beam reporting message.

A WTRU may receive a beam reporting message (e.g., that may include beam information and/or one or more MBM/MCM, DBM/DCM, MBM/DCM, and/or DBM/MCM mode recommendations from a TRP). Such a WTRU may determine a MBM/MCM, DBM/DCM, MBM/DCM, and/or DBM/MCM mode that may be used. Such a WTRU may determine one or more detailed parameter selections for an MBM/MCM, DBM/DCM, MBM/DCM, and/or DBM/MCM mode.

A WTRU may inform a TRP of the WTRU's MBM/MCM, DBM/DCM, MBM/DCM, and/or DBM/MCM mode determination, a detailed modulation mapper index (e.g., when MBM and/or DBM may be used), a sub-carrier index (e.g., when MCM and/or DCM may be used), and/or one or more associated beam indices. Such information may be signaled in a UCI field via NR-PUCCH and/or NR-PUSCH, for example. Such a WTRU may transmit one or more MBM/MCM, DBM/DCM, MBM/DCM, and/or DBM/MCM symbols via selected beam pairs or beam pair links.

Although features and elements of the present disclosure may be described in particular combinations, features or elements may be used alone without other features and elements of the description or in various combinations with or without other features and elements. Although the features described herein may consider New Radio (NR), 3G, 4G, 5G, LTE, LTE-A, and/or other examples, it is understood that the features described herein are not restricted to these technologies and may be applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed is:

1. A wireless transmit/receive unit (WTRU) comprising:
a processor configured to:
receive a first beamformed reference signal from a first transmission and reception point (TRP) and a second beamformed reference signal from a second TRP;
perform a first beam measurement on the first beamformed reference signal and a second beam measurement on the second beamformed reference signal;
send a beam measurement report based on the first and second beam measurements, wherein the beam measurement report comprises a recommendation to utilize a multi beam modulation (MBM) mode, and wherein the MBM mode indicates a manner to map a same set of information bits to multiple constellation symbols and transmit the same set of information bits mapped to multiple constellation symbols over associated multiple beams;
receive an indication from a TRP that indicates the MBM mode; and
receive a first data transmission from the first TRP that utilizes a first modulation and a second data transmission from the second TRP that utilizes a second modulation, wherein the first modulation is different than the second modulation.

2. The WTRU of claim 1, wherein the first modulation and the second modulation utilize at least one of: a different constellation mapping or a different modulation order.

3. The WTRU of claim 1, wherein the processor is further configured to receive information comprising: an indication of a first modulation mapper index, an indication of a first modulation order, an indication of a second modulation mapper index, an indication of a second modulation order, an indication of a first beam index and an indication of a second beam index, and wherein the first modulation mapper index is associated with the first beam index, and the second modulation mapper index is associated with the second beam index.

4. The WTRU of claim 3, wherein the information is received in a downlink control information (DCI) via a control channel.

5. The WTRU of claim 1, wherein the MBM mode comprises a multi beam modulation/multi carrier modulation (MBM/MCM) mode and is one of a full MBM/MCM mode, a fallback MBM/MCM mode 16, a fallback MBM/MCM mode 2, or a fallback MBM/MCM mode 3.

6. The WTRU of claim 1, wherein the processor is further configured to receive an indication that the WTRU will be served by a single TRP, and wherein the single TRP is the first TRP or the second TRP.

7. The WTRU of claim 1, wherein a first beam index indicates a transmit beam from the first TRP, and a second beam index indicates a transmit beam from the second TRP.

8. The WTRU of claim 1, wherein the beam measurement report further comprises a list of respective reference signal receive powers (RSRPs) for each measured beam.

9. A method implemented in a wireless transmit/receive unit (WTRU) comprising:
receiving a first beamformed reference signal from a first transmission and reception point (TRP) and a second beamformed reference signal from a second TRP;
performing a first beam measurement on the first beamformed reference signal and a second beam measurement on the second beamformed reference signal;
sending a beam measurement report based on the first and second beam measurements, wherein the beam measurement report comprises a recommendation to utilize a multi beam modulation (MBM) mode, and wherein the MBM mode indicates a manner to map a same set of information bits to multiple constellation symbols and transmit the same set of information bits mapped to multiple constellation symbols over associated multiple beams;
receiving an indication from a TRP that indicates the MBM mode; and
receiving a first data transmission from the first TRP that utilizes a first modulation and a second data transmission from the second TRP that utilizes a second modulation, wherein the first modulation is different than the second modulation.

10. The method of claim 9, wherein the first modulation and the second modulation utilizes at least one of: a different constellation mapping or a different modulation order.

11. The method of claim 9, further comprising receiving information comprising: an indication of a first modulation mapper index, an indication of a first modulation order, an indication of a second modulation mapper index, an indication of a second modulation order, an indication of a first beam index and an indication of a second beam index, and wherein the first modulation mapper index is associated with the first beam index, and the second modulation mapper index is associated with the second beam index.

12. The method of claim 11, wherein the information is received in a downlink control information (DCI) via a control channel.

13. The method of claim 9, wherein the MBM mode comprises a multi beam modulation/multi carrier modulation (MBM/MCM) mode and is one of a full MBM/MCM mode, a fallback MBM/MCM mode 1, a fallback MBM/MCM mode 2, or a fallback MBM/MCM mode 3.

14. The method of claim 9, further comprising receiving an indication that the WTRU will be served by a single TRP, and wherein the single TRP is the first TRP or the second TRP.

15. The method of claim 9, wherein the beam measurement report further comprises a list of respective reference signal receive powers (RSRPs) for each measured beam.

\* \* \* \* \*